(12) United States Patent
Wright et al.

(10) Patent No.: US 7,526,800 B2
(45) Date of Patent: *Apr. 28, 2009

(54) ADMINISTRATION OF PROTECTION OF DATA ACCESSIBLE BY A MOBILE DEVICE

(75) Inventors: Michael Wright, Sandy, UT (US); Peter Boucher, Orem, UT (US); Gabe Nault, Draper, UT (US); Merrill Smith, Riverton, UT (US); Sterling K. Jacobson, Saratoga Springs, UT (US); Jonathan Wood, Orem, UT (US); Robert Mims, West Valley City, UT (US)

(73) Assignee: Novell, Inc., Provo, UT (US)

( * ) Notice: Subject to any disclaimer, the term of this patent is extended or adjusted under 35 U.S.C. 154(b) by 622 days.

This patent is subject to a terminal disclaimer.

(21) Appl. No.: 10/897,060

(22) Filed: Jul. 21, 2004

(65) Prior Publication Data

US 2005/0055578 A1 Mar. 10, 2005

Related U.S. Application Data

(63) Continuation-in-part of application No. 10/377,265, filed on Feb. 28, 2003, now Pat. No. 7,308,703, and a continuation-in-part of application No. 10/413,443, filed on Apr. 11, 2003.

(60) Provisional application No. 60/489,128, filed on Jul. 21, 2003, provisional application No. 60/531,054, filed on Dec. 18, 2003.

(51) Int. Cl.
*H04M 3/24* (2006.01)
*G06F 7/04* (2006.01)

(52) U.S. Cl. .............................. 726/11; 726/1; 713/153; 379/15.03; 379/29.01; 379/32.01; 379/201.12; 455/25

(58) Field of Classification Search ................. 713/153; 726/1, 11; 379/15.03, 29.01, 32.01, 201.12; 455/25
See application file for complete search history.

(56) References Cited

U.S. PATENT DOCUMENTS 5,724,487 A 3/1998 Streit (Continued)

FOREIGN PATENT DOCUMENTS

WO WO 02/19116 A2 3/2002
WO WO 02/067173 A1 8/2002

OTHER PUBLICATIONS

Stallings, W., "Network Security Essentials, Applications and Standards," 2000, Prentice-Hall, pp. 203-223.

(Continued)

*Primary Examiner*—Michael J Simitoski
(74) *Attorney, Agent, or Firm*—King & Schickli, PLLC

(57) ABSTRACT

The protection of data on a client mobile computing device by a server computer system such as within an enterprise network or on a separate mobile computing device is described. Security tools are described that provide different security policies to be enforced based on a location associated with a network environment in which a mobile device is operating. Methods for detecting the location of the mobile device are described. Additionally, the security tools may also provide for enforcing different policies based on security features. Examples of security features include the type of connection, wired or wireless, over which data is being transferred, the operation of anti-virus software, or the type of network adapter card. The different security policies provide enforcement mechanisms that may be tailored based upon the detected location and/or active security features associated with the mobile device. Examples of enforcement mechanisms are adaptive port blocking, file hiding and file encryption.

18 Claims, 24 Drawing Sheets

U.S. PATENT DOCUMENTS

| | | | |
|---|---|---|---|
| 5,930,810 | A | 7/1999 | Farros et al. |
| 5,987,611 | A | 11/1999 | Freund |
| 6,088,457 | A | 7/2000 | Parkinson et al. |
| 6,484,261 | B1 | 11/2002 | Wiegel |
| 6,577,274 | B1 | 6/2003 | Bajikar |
| 6,580,914 | B1 | 6/2003 | Smith |
| 6,609,196 | B1 | 8/2003 | Dickinson, III et al. |
| 6,681,107 | B2 | 1/2004 | Jenkins et al. |
| 6,728,885 | B1 | 4/2004 | Taylor et al. |
| 6,772,213 | B2 | 8/2004 | Glorikian |
| 6,778,837 | B2 | 8/2004 | Bade et al. |
| 6,873,988 | B2 | 3/2005 | Herrmann et al. |
| 7,069,581 | B2 | 6/2006 | Fu et al. |
| 7,093,283 | B1 | 8/2006 | Chen et al. |
| 2001/0038626 | A1 | 11/2001 | Dynarski et al. |
| 2001/0044849 | A1 | 11/2001 | Ndili et al. |
| 2002/0055817 | A1 | 5/2002 | Chou |
| 2002/0059078 | A1* | 5/2002 | Valdes et al. .................... 705/1 |
| 2002/0078361 | A1 | 6/2002 | Giroux et al. |
| 2002/0095486 | A1 | 7/2002 | Bahl |
| 2002/0112046 | A1 | 8/2002 | Kushwaha et al. |
| 2002/0152470 | A1* | 10/2002 | Hammond .................... 725/76 |
| 2002/0160745 | A1 | 10/2002 | Wang |
| 2002/0161905 | A1 | 10/2002 | Haverinen et al. |
| 2002/0166068 | A1 | 11/2002 | Kilgore |
| 2002/0186688 | A1 | 12/2002 | Inoue et al. |
| 2002/0191593 | A1 | 12/2002 | O'Neill et al. |
| 2003/0053475 | A1 | 3/2003 | Veeraraghavan et al. |
| 2003/0055962 | A1 | 3/2003 | Freund et al. |
| 2003/0065942 | A1 | 4/2003 | Lineman et al. |
| 2003/0070067 | A1 | 4/2003 | Saito |
| 2003/0081621 | A1 | 5/2003 | Godfrey et al. |
| 2003/0084323 | A1 | 5/2003 | Gales |
| 2003/0097590 | A1* | 5/2003 | Syvanne ..................... 713/201 |
| 2003/0112178 | A1 | 6/2003 | Bajikar |
| 2003/0135749 | A1 | 7/2003 | Gales et al. |
| 2003/0159060 | A1 | 8/2003 | Gales et al. |
| 2003/0167405 | A1 | 9/2003 | Freund et al. |
| 2003/0177389 | A1 | 9/2003 | Albert et al. |
| 2003/0184474 | A1 | 10/2003 | Bajikar |
| 2003/0194500 | A1 | 10/2003 | Masuda et al. |
| 2004/0003289 | A1 | 1/2004 | Bhogal et al. |
| 2004/0010579 | A1 | 1/2004 | Freese |
| 2004/0018844 | A1 | 1/2004 | Cheng |
| 2004/0052232 | A1 | 3/2004 | Ramaswamy et al. |
| 2004/0192339 | A1 | 9/2004 | Wilson et al. |
| 2004/0203718 | A1 | 10/2004 | Knauerhase et al. |
| 2004/0203902 | A1 | 10/2004 | Wilson et al. |
| 2004/0203903 | A1 | 10/2004 | Wilson et al. |
| 2004/0215956 | A1 | 10/2004 | Venkatachary et al. |

OTHER PUBLICATIONS

Blunk, L. et al., "PPP Extensible Authentication Protocol (EAP)," RFC2284, Mar. 1998, <ftp://ftp.rfc-editor.org/in-notes/rfc2284.txt>.

Aboba, Bernard, IEEE 802.1X Pre-Authentication, Jun. 17, 2002, Microsoft Corporation, Jun. 2002, pp. 1-47.

Ark, Wendy S., et al., A Look at Human Interaction With Pervasive Computers, IBM System Journal, vol. 38, No. 4, 1999, pp. 504-507.

Balakrishnan, Hari, Pervasive Location-Aware Computing, MIT Laboratory for Computer Science, Presentation for "Talk on the Cricket system and future challenges in location-aware computing" on Nov. 29, 2001 (Distinguished Lecture Series, Dept. of Computer Science, Univ. of Virgina).

Barton, John J., A Cooltown Demonstration at Mobicom 2000, Internet and Mobile Systems Labs, Hewlett Packard Laboratory, [online], [retrieved on May 29, 2003]. Retrieved from the Internet <URL: http://www.hpl.

Chakraborty, Anit, A Distributed Architecture for Mobile, Location-Dependent Applications, MIT, May 16, 2000, pp. 1-58.

Dey, Anid K., Building Context-Aware Applications, Aug. 13, 2002, [onine], [retrieved on Feb. 5, 2003] Retrieved from the Internet <URL: www.inf.ethz.ch/vs/events/dag2002/ program/lectures/dey_1.pdf.

Grimm, Robert, et al., Future Directions: System Support for Pervasive Applications, *Proceedings of the International Workshop on Future Directions in Distributed Computing*, pp. 58-59. Bertinoro, Italy, Jun. 2002.

Grimm, Robert, et al., Systems Directions for Pervasive Computing, *Proceedings of the 8th IEEE Workshop on Hot Topics in Operating Systems (HotOS-VIII)*, pp. 147-151, Elmau, Germany, May 2001.

Harter, Andy, et al., The Anatomy of a Context-Aware Application, 1999, Retrieved from the Internet <URL: http://citeseer.nj.nec.com/cache/papers/cs/10242/ftp:zSzzSzftp.uk.research.att.comzSzpubzSzdocszSzattzSztr.1999.7.pdf/harter99anatomy.pdf.

If Knows You're Out There, Feb. 11, 2002, [online], [retrieved on Jun. 5, 2003]. Retrieved from the Internet <URL: http//www.80211-planet/com/news/print.php/972541>.

Location/context—Sensitive Application Development Platform Revealed for 802.11 WLANs, Sep. 7, 2001, [online], [retrieved on Jun. 5, 2003]. Retrieved from the Internet <URL: http://www.80211-planet.com.news/print.php/880761>.

Lopez de Ipina, Diego and Lo, Sai-Lai, LocALE: a Location-Aware Lifescycle Environment for Ubiquitous Computing, *Proceedings of the 15th IEEE International Conference on Information Networking (ICOIN-15)*, Beppu City, Japan. Jan. 31-Feb. 2, 2001, [online], [retrieved on Dec. 4, 2003]. Retrieved from the Internet <URL: http://www-lce.eng.cam.ac.uk/publications/files/tr.2001.9.pdf.

Michalakis, Nikolaos, Pac: Location Aware Access Control for Pervasive Computing Environments, MIT Laboratory of Computer Science, Cambridge, MA, USA, Jul. 25, 2002, [online], retrieved on Feb. 5, 2003.

Miu, Allen Ka Lun, Design and Implementation of an Indoor Mobile Navigation System, MIT, Jan. 2002, pp. 1-60.

Network Location Awareness Service Provider (NLA), Microsoft Corporation [online], [retrieved on Aug. 12, 2003]. Retrieved from the Internet <URL: http//www.msdn.Microsoft.com/library/en-us/winsock/network_location_awareness_servi>.

Newbury Networks Powers Royal Sonesta Hotel's Modern Art Exhibit for Wireless Location-Enabled Guided Tours; Newbury Networks, Inc., [online], [retrieved on Jun. 5, 2003]. Retrieved from the Internet <URL: http//www.newburynetworks.com/newsroom/press/press,php?id=9>.

Newbury Networks Debuts First Location-Enabled Networks Solutions for 802-11B WLANS; Newbury Networks, Inc., [online], [retrieved on Jun. 5, 2003]. Retrieved from the Internet <URL: http//www.newburynetworks.com/newsroom/press/press.php?id=8>.

Newbury Networks Introduces First Breakthrough Solution for Building Location and Context-Aware Applications for 802.11b Networks; Sep. 6, 2001; Newbury Networks, Inc., [online], [retrieved on Jun. 5, 2003] Retrieved from the Internet <URL: http//www.newburynetworks.com/newsroom/press/press.php?id=7>.

Notification of Transmittal of International Search Report, PCT/US03/40546, Aug. 23, 2004, 10 pages.

Priyantha, Nissanka, et al., The Cricket Location-Support System. 2000. 6th ACM International Conference on Mobile Computing and Networking (ACM MOBICOM), pp. 32-43, Boston, MA, USA.

Priyantha. Nissanka B., et al., The Cricket Compass for Context-Aware Mobile Applications. 7th ACM Conference Mobile Computing and Networking (MOBICOM), Jul. 2001, pp. 1-14, Rome. Italy.

Priyantha, Nissanka B., et al., The Cricket Compass for Context-Aware Mobile Applications, Power Point Presentation, 7th ACM Conference Mobile Computing and Networking (MOBICOM), Jul. 2001, pp. 1-14, Rome, Italy.

Radar Scope, Mobile Internet Times, vol. 4, Issue 10, Oct. 2001, Pinestream Communications, Weston, MA, USA.

Ward, Any, et al., A New Location Technique for the Active Office, *IEEE Personal Communications*, vol. 4, No. 5, Oct. 1997, pp. 42-47, [online], [retrieved on Dec. 4, 2003]. Retrieved from the Internet <URL: http://www-lce.eng.cam.ac.uk/publications/files/tr.97.10.ps.Z.

Ziola, Brad, Label Based Access Control vs. Fine-Grained Access Control for Implementing a Virtual Private Database, Managed Ventures, LLC, Mar. 2002, pp. 1-6.

Moore, B. et al., Policy Core Information Model—Version 1 Specification, The Internet Society, 2001, pp. 1-101.

* cited by examiner

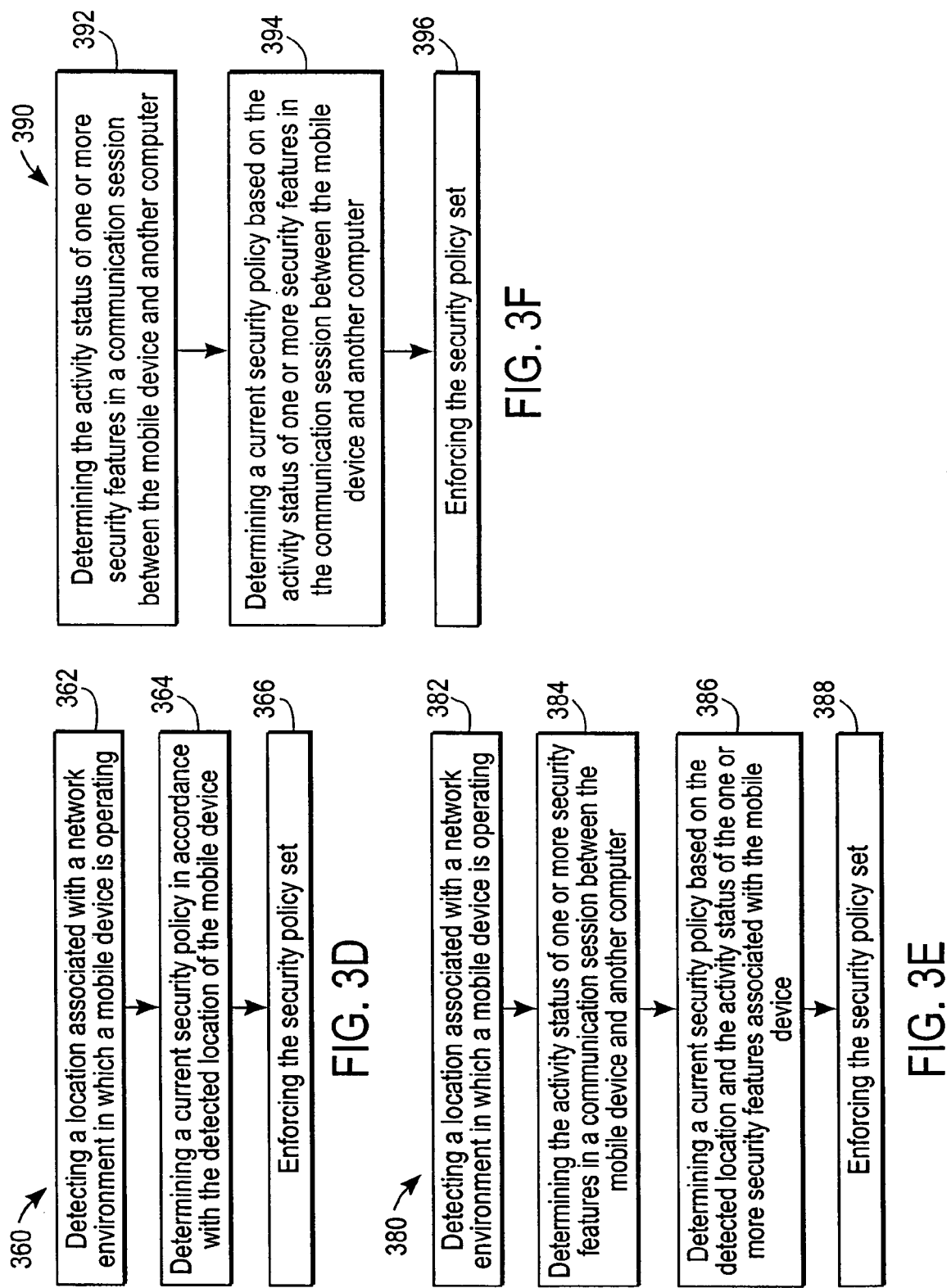

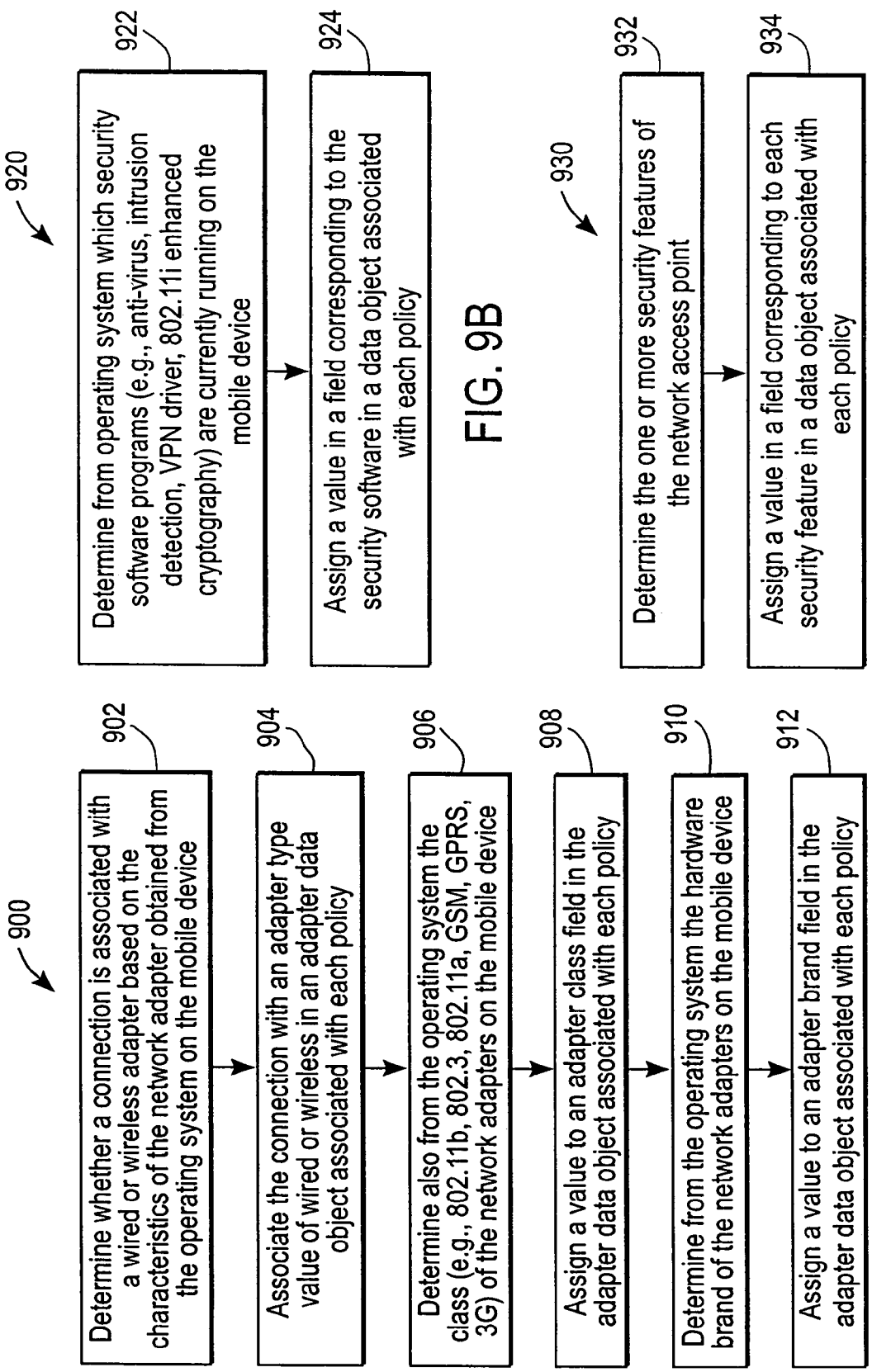

ADMINISTRATION OF PROTECTION OF DATA ACCESSIBLE BY A MOBILE DEVICE

CROSS-REFERENCE TO RELATED APPLICATIONS

This application claims priority under 35 U.S.C. § 120 as a continuation-in-part of U.S. patent application Ser. No. 10/377, 265 entitled "Protection of Data Accessible by a Mobile Device," filed on Feb. 28, 2003, now U.S. Pat. No. 7,308,703 having inventors Michael Wright, Peter Boucher, Gabe Nault, Merrill Smith, Sterling Jacobsen, Jonathan Wood and Robert Mims, which is hereby incorporated by reference.

This application claims priority under 35 U.S.C. § 120 as a continuation-in-part of U.S. patent application Ser. No. 10/413, 443 entitled "Administration of Protection of Data Accessible by a Mobile Device," filed on Apr. 11, 2003, having inventors Michael Wright, Peter Boucher, Gabe Nault, Merrill Smith, Sterling K. Jacobsen, Jonathan Wood and Robert Mims, which is hereby incorporated by reference.

This application claims the benefit of priority under 35 U.S.C. § 119(e) to U.S. provisional patent application No. 60/489,128, filed on Jul. 21, 2003, entitled "Administration of Protection of Data Accessible by a Mobile Device" having inventors Michael Wright, Peter Boucher, Gabe Nault, Merrill Smith, Sterling K. Jacobsen, Jonathan Wood, and Robert Mims which is hereby incorporated by reference.

This application claims the benefit of priority under 35 U.S.C. § 119(e) to U.S. provisional patent application No. 60/531,054, filed on Dec. 18, 2003, entitled "Administration of Protection of Data Accessible by a Mobile Device" having inventors Michael Wright, Peter Boucher, and Gabe Nault, which is hereby incorporated by reference.

BACKGROUND OF THE INVENTION

1. Field of Invention

This application relates to the field of security of data accessible by mobile devices. Mobile devices are using wired and wireless technologies to access networks at work, at home, or in public 'hot spots.' Those same mobile devices have documents, spreadsheets, e-mail, and other files with valuable company information if not valuable personal information in them.

2. Description of the Related Art

The availability of wired and wireless network access points (NAP) allow mobile devices like laptop computers and personal digital assistants (PDAS) to enable users today to be more mobile, providing access to corporate networks, e-mail, home networks and the Internet from anywhere. With the advent of the IEEE 802.11 standard for wireless communication, and other popular wireless technologies, software products that protect against unwanted access to information stored on mobile devices and corporate servers is highly desirable.

Traditional security architectures assume that the information assets being protected are 'tethered'—wired to a particular network infrastructure such as a company's network infrastructure. But mobile users can pick up valuable corporate information, such as that stored on their laptops, and walk away from the corporate network, and connect to other networks with different security policies. Users with laptops and mobile devices want to take advantage of wireless technologies, to connect wherever they are—at work, at home, in the conference room of another company, at the airport, a hotel, a highway or at the coffee shop on the corner. The mobile device's network environment is constantly changing as the user moves about. Each environment has different needs in terms of security. Each environment presents different challenges to protect the information on the mobile device while allowing access to e-mail, the Internet, and company Virtual Private Networks (VPNs).

Personal firewalls are designed to deal with static environments. A personal firewall could be ideally suited for mobile users if users knew how to adapt their configuration for their particular mobile application. Unfortunately, security settings for one situation can compromise data security in another. The configuration of popular personal firewalls typically requires a level of expertise on how the technology actually works that average users do not possess. Additionally, personal firewalls don't protect against all 802.11 intrusions. For example, when a user configures a personal firewall off to surf the Internet through their wireless device, their files may be vulnerable to unauthorized malicious wireless attacks on their computer.

Solutions which secure data in transit, for example a (VPN) connection, from a corporate server to a mobile client device do not protect the data once it is stored on the mobile device. For example, an executive could be retrieving sensitive files or emails from the corporate network, and the VPN will stop eavesdroppers from seeing the data in transit, but once the data is stored on the executive's remote device, hackers in the parking lot could break into the remote device and copy or maliciously alter the data. With the onset of new powerful mobile devices that can store corporate data, IT managers see their network perimeters having to extend to the new limits of these mobile wireless connections.

Simple to use, mobile-aware security tools providing different levels of security protection for different locations and/or security features are highly desirable. It is desirable to provide technology that automatically senses the network environment of the mobile device, associates the network environment with a location, and adjusts its security configuration and settings accordingly. It is also highly desirable to take security features in a particular network environment into account. For example, setting a security policy based on whether the data is being received over a wireless network adapter or over a wired one is highly desirable. This would allow unprecedented ease of use allowing users to move between different environments without needing to manually change security parameters, adjust difficult-to-configure firewalls, disable and enable network file sharing features, or worry about remembering what security protocols are currently set. Furthermore, enterprises seek a centralized approach to the administration of security policies used by the mobile devices storing company data and accessing company data stored on the enterprises' systems via network environments not under the control of the enterprise.

SUMMARY OF INVENTION

The present invention provides one or more embodiments of a system for providing administration of protection of data accessible by one or more mobile devices based upon criteria such as a location associated with a network environment in which each mobile device is operating and/or security features associated with each of the mobile devices. Furthermore, the present invention provides one or more embodiments of a method for providing administration of protection of data accessible by one or more mobile devices based upon criteria such as a location associated with a network environment and/or security features associated with each of the mobile devices. The one or more embodiments of the present invention may also be embodied as instructions stored in one or more computer usable mediums some examples of which are a memory, a disk, a compact disc, a field programmable gate array, a flash card or an integrated circuit.

The present invention also provides one or more embodiments of a system for remotely diagnosing one or more mobile devices, and a method for remotely diagnosing one or more mobile devices.

As discussed above, the present invention provides for the administration of the protection of data accessible by a mobile device. Mobile devices include portable computing devices that access a network or another computer. Mobile devices include devices that access a network or another computer through a wired connection as well as portable computing devices that access a network or another computer through a wireless connection. For example, a notebook computer accessing a network through a T1 line or phone line at an airport is a mobile device. The same notebook computer may also access a network through a wireless connection to a network access point (NAP). A portable computing device having a wireless connection capability is often referred to in this connection context as a wireless device which is a type of mobile device.

In one or more embodiments in accordance with the present invention, the protection of data is administered through one or more security policies. One function of a security policy is determining accessibility of data for the mobile device. For example, based on the current location associated with the mobile device, a file resident on the device may be encrypted or may be hidden as required or recommended by a security policy. Additionally, a security policy may not allow a particular network service or application or both to be used based upon either or both of a particular detected location or the activity status of a security feature.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3D illustrates a method for protecting data accessible by a mobile device based on a location associated with a network environment in which the mobile device is operating in accordance with an embodiment of the present invention.

FIG. 3E illustrates a method for protecting data accessible by a mobile device based on a location associated with a network environment in which the mobile device is operating and a security feature in accordance with another embodiment of the present invention.

FIG. 3F illustrates a method for protecting data accessible by-a mobile device based on a security feature in accordance with another embodiment of the present invention.

FIG. 9A illustrates an example of a method for determining whether the security feature of a connection type of wireless or wired is in effect for a communication session between the mobile device and another computer in accordance with an embodiment of the present invention.

FIG. 9B illustrates an example of a method for determining whether the security feature of a security software program is currently executing on a mobile device for a communication session between the mobile device and another computer in accordance with an embodiment of the present invention.

FIG. 9C illustrates an example of a method for determining one or more security features of a network access point with which the mobile device is communicating in accordance with an embodiment of the present invention.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION

Figure 1:
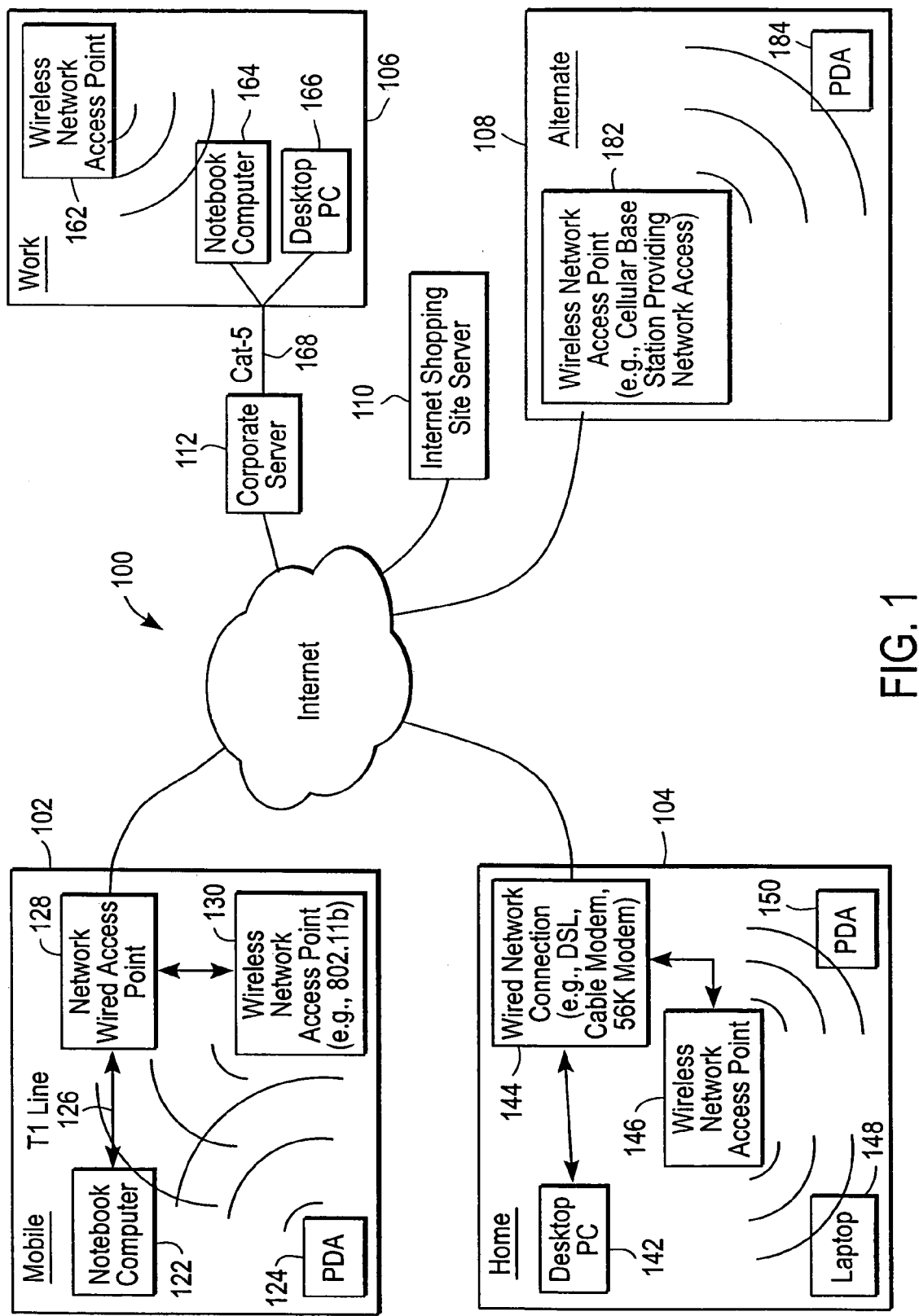
FIG. 1 illustrates one or more examples of location categories which may be assigned to a mobile device in accordance with an embodiment of the present invention.

FIG. 1 illustrates one or more examples of location categories 102, 104, 106, 108 which may be assigned based on the network environment in which a mobile device is operating in accordance with an embodiment of the present invention. One example of a location category is "Home" 104. The network environment in which each of the mobile devices 148, 150 communicates via a network connection at a user's home is detected. Upon detection of this home network environment, each of the mobile devices is assigned a location indicator or type of "Home" 104. In the illustrated example, each of the laptop 148 and the PDA 150 communicating with the illustrated wireless network access point will have its location set to "Home."

The location "Work" 106 is an example of a location associated with a network environment maintained by a user's employer. In the illustrated example, a notebook computer 164 has a wired CAT-5 Ethernet connection 168 to the corporate server of his or her employer. However, the notebook computer 164 may also communicate with the server 112 through a wireless NAP 162 as illustrated.

One example of a location category is "Mobile" 102. For example, at an airport, a mobile device such as the illustrated notebook computer 122 accesses a network environment respectively through a wired connection 126 (in this example a T1 line) to a wired network access point 128. This wired network access point 128 may provide access to an Internet shopping site server 110 because the user desires to browse the site while waiting for departure. The notebook computer 122 and the personal digital assistant (PDA) 124 have a wireless connection to a wireless NAP 130, in this example an 802.11b connection through which they may communicate at the airport. Additionally, as discussed below, the security policy associated with the "Mobile" location may take into account the connection type of wired or wireless. In this example, the network environment provided at the airport does not match with a defined environment associated with a location such as "Work" 106 or "Home" 104 so "Mobile" 102 is assigned or associated with the PDA 124 and the notebook computer 122 as a default location.

The last location example is "Alternate" 108. In one example, a specific environment (e.g. an environment associated with a university computer lab or an environment associated with a type of network class) may be associated with "Alternate." Similarly, a "Custom" or another named location may also be defined. In this example, the wireless network access point 182 is associated with a cellular base station providing network access through a General Packet Radio Services (GPRS) system, Global System for Mobile communication (GSM) system, third generation wireless 3G system or other kind of mobile wireless communication system.

Figure 2A:
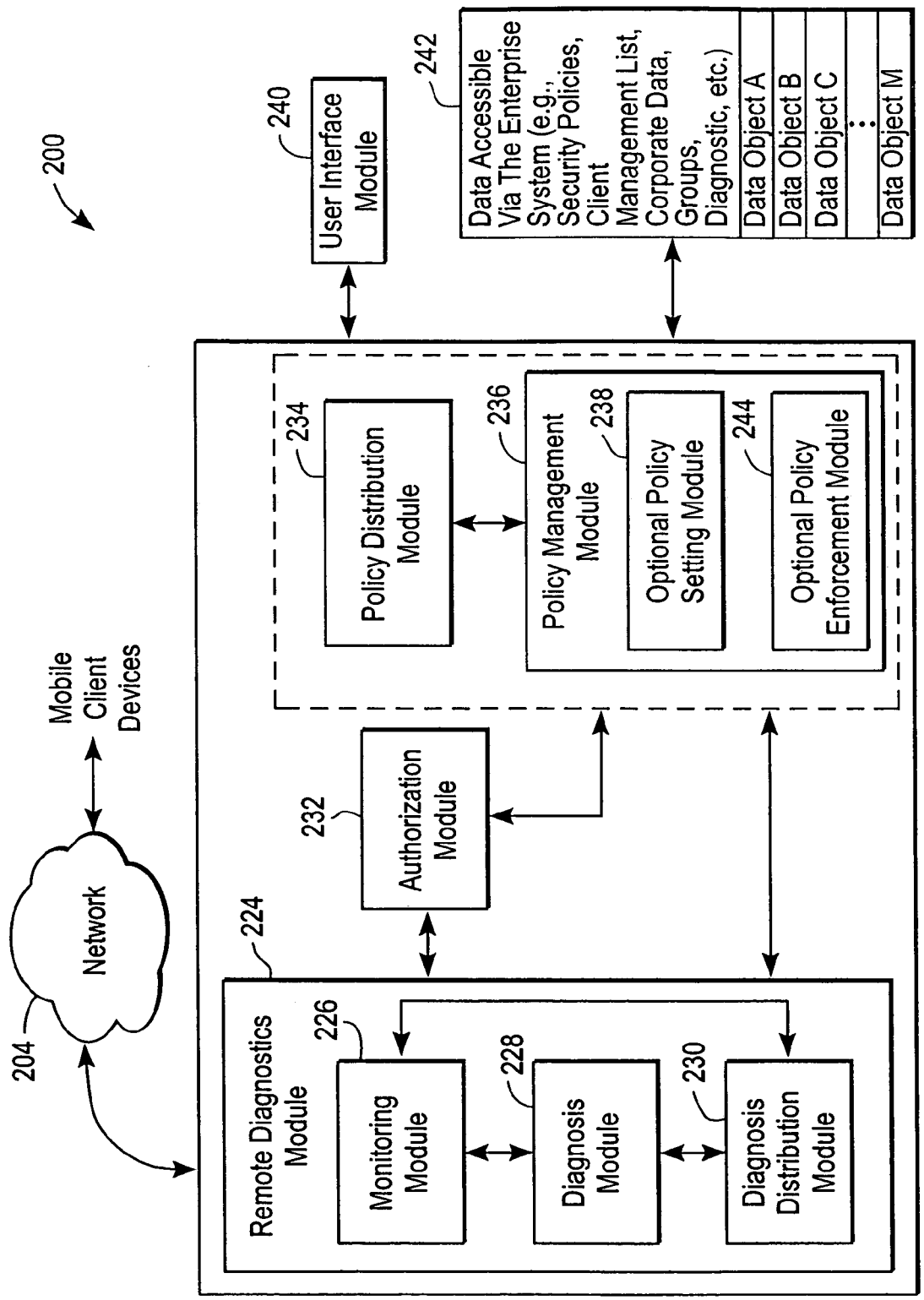
FIG. 2A illustrates a computer system for administering the protection of data accessible by one or more mobile devices based on either or both of a location associated with the mobile device or a security feature in accordance with an embodiment of the present invention.
Figure 2B:
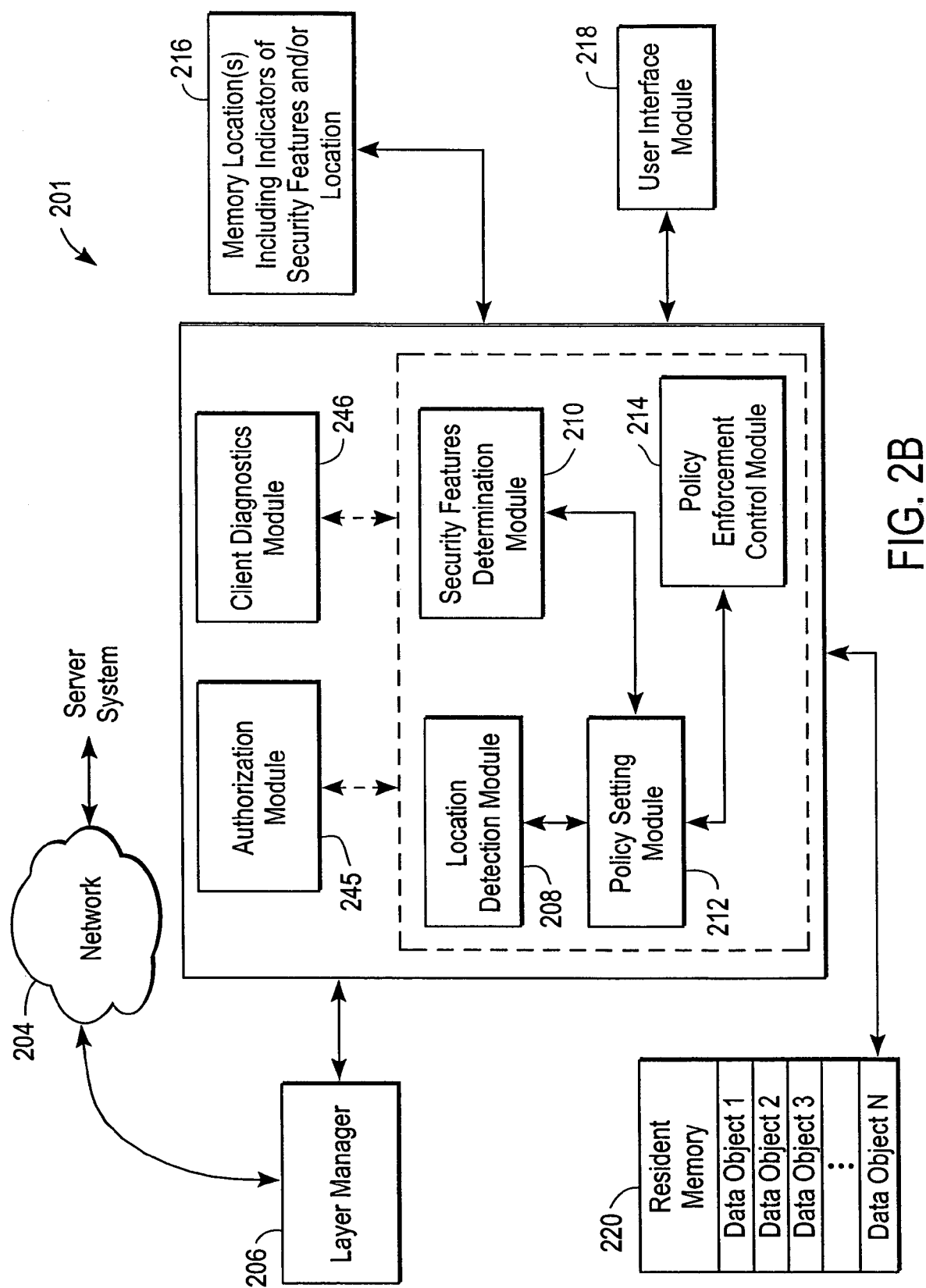
FIG. 2B illustrates a system in a client mobile device for protecting data accessible by the mobile device based on either or both of a location associated with the mobile device or a security feature in accordance with an embodiment of the present invention.

FIGS. 2A and 2B illustrate interaction between a computer system 200 (FIG. 2A) acting in a server role with respect to a mobile computer system 201 (FIG. 2B) acting in a client role for the purposes of managing security with respect to the client system in accordance with an embodiment of the invention. Similarly, FIGS. 2A and 2B also illustrate interaction between the server computer system 200 and the mobile client computer system 201 for the purpose of providing diagnostic assistance to the client computer system. The system 200 in FIG. 2A may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may typically be implemented by an enterprise. Additionally, the system 200 in FIG. 2A may also be implemented in another mobile computing device. The server or server-side system 200 allows an administrator to manage and distribute policies and software upgrades, analyze logs, and perform remote diagnostics. The client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 monitors the user's changes in location and/or security features and applies the appropriate policies automatically as the user moves about or different security features are activated or deactivated. The client 201 enforces the policies set up by the administrator, and performs diagnostics. The client 201 can also create and manage policies for the client mobile device when run in a self-managed mode. The server system 200 is discussed first.

FIG. 2A illustrates a system 200 for administering protection of data accessible by a mobile device based on either or both of a location associated with a network environment in which the mobile device is operating or an activity status of a security feature associated with the mobile device or the environment in which it is communicating in accordance with an embodiment of the present invention. The illustrated system embodiment 200 comprises an authorization module 232, a policy distribution module 234, a policy management module 236, illustrated here with an optional policy setting module 238 and an optional policy enforcement module 244, a remote diagnostics module 224 and a user interface module 240. The system embodiment 200 protects data accessible by the mobile device that may be resident (See FIG. 2B, 220) or data 242 that is accessible by the mobile device over a network 204. Examples of such data may include security policies, corporate data, group, files indicating the organization of personnel into various groups, client device management data, and diagnostic information related to the mobile devices or computers internal to the corporate network. As is apparent, these are examples of information valuable to a company. As illustrated, each of these modules has a communication interface or is communicatively coupled to each of the other modules and has access to data objects 242 stored in memory 242 of the server system 200 and also has access to a network 204 (e.g. Internet).

The policy management module 236 manages security policies. One aspect of managing security policies is defining the policies. In this example, the policy management module 236 comprises instructions for establishing this pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. There may be a base policy applicable to a group of entities. Examples of entities may be users or the mobile devices themselves. In these examples, the group may include one instance of an entity. The attributes of the base policy may be incorporated into other policies which add on additional attributes. For example, a base policy for the group including engineers in the user interface design department may be allowed access to files on a certain disk drive. Another policy based on location that incorporates the attributes of the base policy may only allow access to encrypted versions of the files if a mobile device through which a UI design engineer is logged in is operating in a "Home" network location. The optional policy setting module 238 is discussed below in the discussion of the client policy setting module 212 of FIG. 2B. The optional policy enforcement module 244 is discussed below in the discussion of the client policy enforcement control module 214 of FIG. 2B.

In one embodiment, the policy management module 236 is provided with an enterprise's existing group structures. The policy management module 236 compensates for a failing in the traditional makeup of groups. Since groups are not hierarchical, it is common for one person to be a member of several groups, and if each group has its own security policy, an issue arises as to how to determine which policy to apply to a particular user. The policy management module 236 inputs a prioritized list of groups from a memory location 242. The policy management module 236 searches the groups in priority order of the list. Thus, if a person is a member of "engineering" and "executive staff," that person will get the security policy for whichever of those two groups comes first in the prioritized list. There is a default policy for users who are not members of any of the groups on the prioritized list. Further, there is a highest priority group that always has the highest priority. An example of such a group is a "stolen mobile device" group that always has the highest priority, because it doesn't matter what other groups the device is associated with if the device is in the hands of a thief.

The policy distribution module 234 distributes security information to the one or more client mobile devices. The policy distribution module 234 has a communication interface or is communicatively coupled to the policy management module 236 for receiving notifications of updated security information. Examples of security information are versions of existing policies, policies, or software. An example of communication interface is a bus between a processor executing one or more of the modules and a memory controller responsible for memory reads/writes. Another example is one module reading a parameter stored in a memory location by another module. Of course, other communication interfaces known to those of ordinary skill in the art may also be used.

In this embodiment, the authorization module 232 authorizes a communication exchange between the client mobile device and the policy distribution or policy management modules. The authorization module 232 is a further safeguard against unauthorized or rogue mobile devices trying to hijack the security policies or corporate data. Various authorization protocols and techniques may be used. One example is a simple username and password verification scheme. Another example of a type of authorization protocol is a cryptographic authentication protocol. The authorization module 232 may also be used to authorize a communication exchange between the client system 201 and the remote diagnostics module 224.

The remote diagnostics module 224 is illustrated in the context of a server computer system embodiment 200 in FIG. 2A concerned with security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. The remote diagnostics module 224 has a communication interface or is communicatively coupled with the user interface module 240, the authorization module 232, the policy management module 236 and the policy distribution module 234. This allows a person using the mobile device to get the device repaired where they are as opposed to having to mail the device or wait until he or she is back in the office to get help.

The remote diagnostics module 224 comprises three modules or sub-modules: a monitoring module 226, a diagnosis module 228, and a diagnosis distribution module 230. The monitoring module 226 receives diagnostic information such as events or audit logs from a client device and stores the information in a data object (242) for the client device. In one embodiment, a client diagnostics module (e.g. FIG. 2B, 246) periodically and automatically initiates tests. Results including errors from these tests are reported over a network 204 (e.g. Internet) to the remote diagnostics module 224. Other examples of diagnostic information retrieved from the client are debug output files, examples of which include system event logs, crash dumps, and diagnostic outputs from a client diagnostics module (e.g. 246, FIG. 2B). This information may be received periodically over a network 204 from the client diagnostics module 246, or upon an initial network connection by the mobile device with the server, or because the client diagnostics module 246 requests diagnostic assistance.

The diagnosis module 228 analyzes diagnostic information stored for the mobile device. For example the diagnosis module 228 may perform analysis according to pre-stored diagnostic programs or according to an interactive user environment or a combination of the two. The diagnosis module 228 may provide a repair to a problem in the client device, determine that a trend is occurring for the device, or determine that preventive maintenance is to be scheduled for the client device. In one example, the diagnosis module 228 initiates requests to the client mobile device for additional information. The additional information may be based on input received via the user interface module 240 or according to a pre-stored diagnosis method. In one embodiment, the diagnosis module 228 provides requested information to the user interface module 240 responsive to user input. In another embodiment, the diagnosis module 228 may provide requested information transmitted via the diagnostics distribution module 230 over the network 204 to the client mobile device responsive to requests received at a user interface module on the client device (e.g. FIG. 2B, 218). Once a diagnosis has been made with respect to a problem, support information may be distributed to the mobile device under the control of the diagnosis distribution module 230. For example, support information may be in the form of instructions or code to the client device to repair a problem or perform maintenance. This provides an advantage of taking corrective or preventive actions without requiring user intervention or action. Another example of support information that may be forwarded are messages for display by the client device providing a diagnostic report or requesting specific input from a user of the device.

Either or both of the monitoring module 226 or the diagnosis module 228 may initiate tests and/or queries to determine the readiness or robustness-of the existing client device population. Trends may be noted. Again, these tests may be run during a connection with a device without requiring user intervention.

The remote diagnostics module 224 may also probe a particular client to verify its status. For example, client configuration information may be retrieved such as the current version of the security policy software components on the client device, the current policy settings on the device, and attributes in accordance with those settings, for example, which ports are blocked. This information may be stored for later assistance in a diagnostics situation or for use with a current diagnostics situation.

FIG. 2B illustrates a system 201 for protecting data accessible by a mobile device based on a location associated with a network environment in which the mobile device is operating in accordance with an embodiment of the present invention. Additionally, the system 201 in FIG. 2B illustrates a system for determining and enforcing security policies based upon the activity status of a security feature in a communication session between the mobile device and another computer. The illustrated system embodiment 201 comprises a location detection module 208, a policy setting module 212, security features determination module 210, a policy enforcement control module 214, a layer manager 206, a user interface module 218, memory location(s) 216, an authorization module 245, and a client diagnostics module 246. The system 201 protects data accessible by the mobile device that may be in resident memory 220 on the device or be data 242 accessible over a network 204. In this illustrated example, each of these modules has a communication interface or is communicatively coupled to each of the other modules. Resident memory 220 may be accessed by one or more of these modules.

The authorization module 245 provides authorization information to the authorization module 232 of the server system 200 to establish communication exchanges with the client mobile device for the exchange of security information or diagnostic information or both. The client diagnostics module 246 collects diagnostic information which is sent to the remote diagnostics module 224 of the server system embodiment 200.

The layer manager 206 has a communication interface to one or more modules 208, 210, 212, 214, 245, and 246. A layer manager 206 processes network traffic which may include inbound data (e.g. 242, FIG. 2A) accessible over a network and outbound copies of data objects from resident memory 220. In this embodiment, the layer manager 206 processes information in one or more layers of a model for communications between computers in a network. An example of such a model is the Open Systems Interconnection (OSI) data communications model. The seven layers of the OSI model are the physical layer, the data-link layer, the network layer, the transport layer, the session layer, the presentation layer, and the application layer. Another example is the layered Internet Protocol stack. It is represented as four layers including the subnetwork layer, the Internet layer, the transport layer, and the application layer.

In this embodiment, the layer manager 206 has a communication interface, for example a software interface or buffers for storing parameters, to a location detection module 208. The layer manager 206 forwards network parameters to the location detection module 208. The location detection module 208 detects or determines the location associated with the current network environment based upon criteria defined in a downloaded policy from the server system 200. In this example, the policy setting module 212 receives, installs and updates the security information including security policies and/or software updates received from the policy management module 236 via the policy distribution module 234 over the network connection 204. The policy setting module 212 may define criteria or if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218.

In this embodiment, memory locations 216, including indicators of security features and/or location indicators, have a communication interface (e.g. a bus between a processor executing one or more of the modules and a memory controller responsible for memory reads/writes) to the location detection module 208, the security features determination module 210, the policy setting module 212, the policy enforcement control module 214, the authorization module 245, and the client diagnostics module 246. The location detection module 208 has a communication interface to the policy setting module 212. In the embodiment, the policy setting module 212 determines a security policy based upon the location detected by the location detection module 208 and communicated via a communication interface. In one example of the communication interface, the policy setting module 212 may read a current location indicator 216 updated in a memory location 216 by the location detection module 208. The policy setting module 212 may then read the location indicator 216 periodically or responsive to a notification message from the location detection module 208. In another example, the location detection module 208 may pass the currently detected location to the policy setting module 212 as a parameter in a message. Of course, other communication interfaces known to those of ordinary skill in the art for use in notifying the policy setting module 212 of the current location may also be used.

In an alternate embodiment, an optional policy setting module 238 may operate on a server computer system such as the one illustrated in FIG. 2A that determines the selection of the current security policy for the mobile device based on criteria information received from the mobile device including location and activity status of one or more security features or based on network parameters forwarded by the layer manager 206. In this embodiment, a module on the client device such as the policy enforcement control module 214 receives commands from the policy setting module 238 and executes them on the mobile device.

The policy setting module 212 also has a communication interface to a policy enforcement module 214. The policy enforcement module 214 comprises instructions for enforcing the security policy currently set by the policy setting module 212. The enforcement module 214 comprises instructions for one or more enforcement mechanisms associated with a security policy. Again, in an alternate embodiment, an optional policy enforcement module 244 in a server computer system 200 with which the client device has a network connection 204 may send instructions to the mobile device for the enforcement of a security policy as determined by the optional policy setting module 238 for the local device on the server side.

In this embodiment, a user interface module 218 has a communication interface to one or more of these modules 208, 210, 212, 214, 245, and 246. In one embodiment, the user interface module 218 receives input from a user input device such as a keyboard, mouse, or touchpad, and causes user interfaces to be displayed for use by a user for establishing criteria for defining an aspect of a security policy as allowed by permissions associated with the policy or when operating in a standalone mode not under the control of the server system 200.

The illustrated system 201 in accordance with the present invention further comprises a security feature module 210 for determining whether one or more security features have an activity status of inactive or active in a communication session between the mobile device and another computer. An example of a security feature is a connection type of wired or wireless. In one example, this connection type may be indicated by the association of the port over which data is communicated with a wireless or wired network adapter or network interface card (NIC). In another example, this connection type may be indicated by the association of a local IP address with data communicated over a wireless or wired network adapter or network interface card (NIC). These classes or categories may be further subdivided into network classes subdivided further into types of wireless connections (e.g. 802.11, GPRS, GSM, 3G, etc.) and types of wired connections (e.g. modem, digital subscriber line (DSL); T1 line). In other embodiments, policies may be set based on particular features besides simply connection type. For example, a different security policy may be applied for different brands of NICs or particular classes (e.g. 802.3, 802.11a, 802.11b, GPRS, GSM) of NICs. In another example, a different security policy may be based on whether a Network Access Point (NAP) is of a certain type such as wired or wireless. An example of a wired network access point is an access point compliant with 802.1 or a switch or a bridge. An example of a wireless network access point is an access point compliant with one of the 802.11 standards. In another example, a different security policy may be applied for different brands (e.g. 3-Com) of NAPs or particular classes (e.g. 802.3, 802.11a, 802.11b, GPRS, GSM) of NAPs or particular protocols supported. In one example, the MAC address of the NAP provides information, (e.g. vendor sting) which may be a basis upon which a determination of the brand or class or type may be made. Furthermore, different security policies may be assigned based on the operating system employed or the version of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or antivirus software, or intrusion-detection software may be the basis for setting different policies on a particular port, network adapter or data.

As with the location detection module 208, the security features module 210 has a communication interface to the policy setting module 212 in this embodiment as well as the memory locations 216. In one example, the activity status of active or inactive for a security feature may be indicated by an activity status indicator field for the feature stored in the memory locations 216. The policy setting module 212 may be notified of the active features via the communication interface implemented in the same manner described in any one of the examples discussed above with respect to the location detection module 208 or in any manner known to those of ordinary skill in the art.

The policy setting module 212 communicates the current security policy to the policy enforcement control module 214 via a communication interface implemented in the same manner described in any one of the examples discussed above with respect to the location detection module 208 or in any manner known to those of ordinary skill in the art. The policy enforcement module 214 comprises one or more enforcement mechanism modules as specified by the policy. For example, in a communication session between the mobile device and another computer in which data is being transferred over a wireless connection, based on this connection type, in one example, the enforcement module 214 may prevent certain files from being transferred over the wireless connection as opposed to the cases in which the data is being transferred over a wired connection, or the case in which 802.11i cryptography is being used over the wireless connection. Again, in an alternate embodiment the policy enforcement control module 244 may operate as part of a separate computer system that transfers commands over a network to the mobile device. In the illustrated embodiment of FIG. 2B, a remote diagnostics module 246 processes events and performs audits relating to processing performed by one or more of the modules. The remote diagnostics module 246 transmits over a network 204 diagnostic information to the remote diagnostic module 224 on the server computer system. Examples of tasks that the diagnostics module 246 performs in order to obtain diagnostics information are as follows:

Verify that correct files are in correct locations.
Verify (e.g. checksum) all files to verify no corruption.
Verify time/date stamps for correct versions.
Check for outdated installation (INF, PNF) files.
Verify that all registry entries are correct and correct any errors found. For example, it is verified whether the indications of the installation of the network interface cards (NICs) is accurate.

Examples of other tasks that the client diagnostics module 246 may perform to provide diagnostic information to the remote diagnostics module 224 on the server computer system 200 include enabling and disabling advanced debugging and sending debugging output to the server computer system 200. For example, enabling and disabling advanced debugging includes turning on system event logging with options including which parameters to log, when to log, etc. and allowing a debug version of a system component to be installed. In this example, the system event log or portions of it and any special debug output files that debug components generate are sent to the remote diagnostics module 224 on the server.

Figure 11:
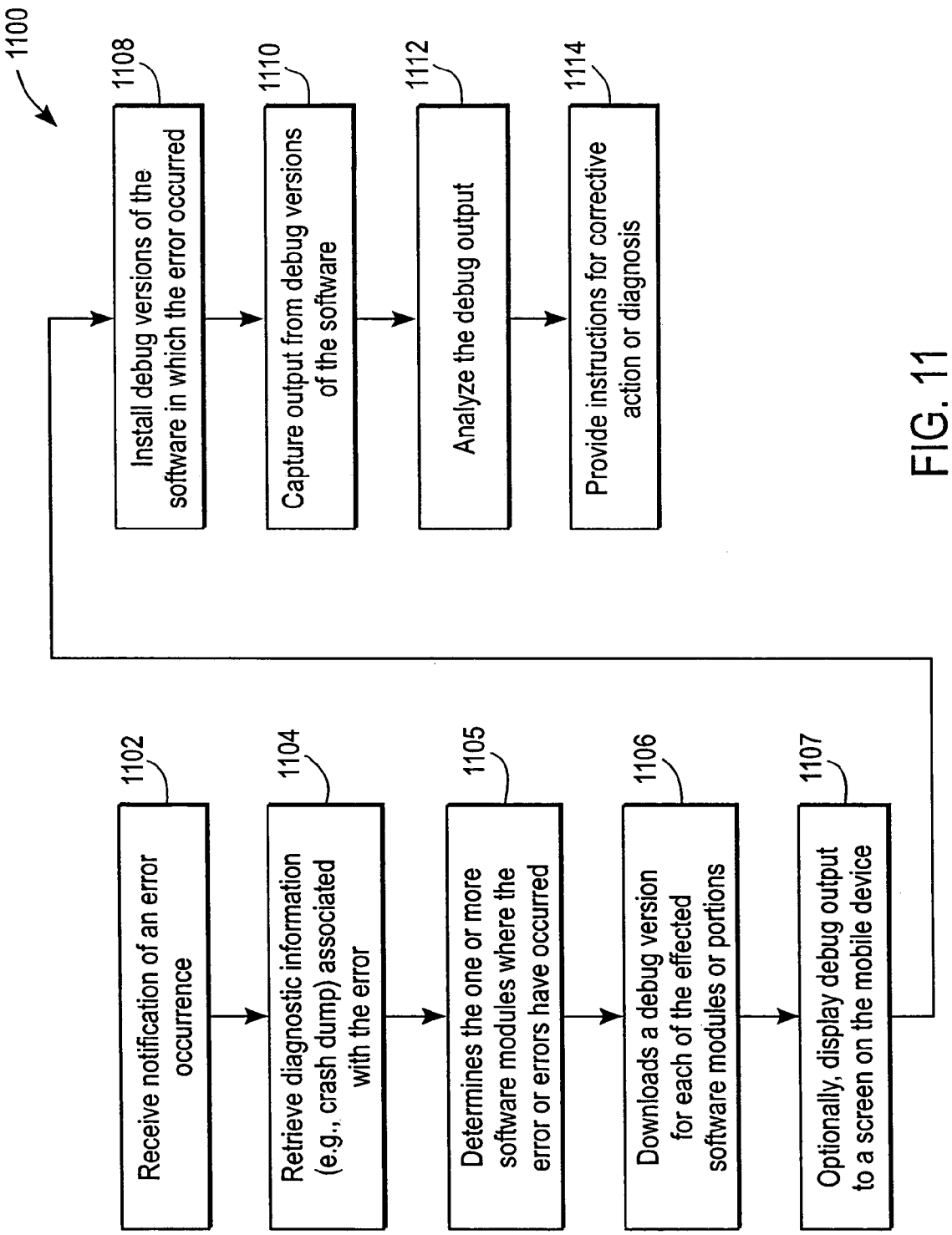
FIG. 11 illustrates an embodiment of a method for providing remote diagnostic support from a server computer system to a mobile client device in accordance with an embodiment of the invention.

FIG. 11 illustrates an embodiment of a method for providing remote diagnostic support from a server computer system to a mobile client device in accordance with an embodiment of the invention. In one embodiment, the method may be performed by a combination of diagnostic software modules in a server computer system (e.g. remote diagnostics module 224 in FIG. 2A) and by diagnostic software on the mobile client device such as the client diagnostics module 246 in the system embodiment of FIG. 2B. For illustrative purposes, the method will be discussed in the context of FIGS. 2A and 2B. The remote diagnostic module 224 receives 1102 a notification of an error occurrence on a client mobile device. The client diagnostics module 246 retrieves 1104 the diagnostic information such as a crash dump or system error log associated with the error and forwards it to the server computer system. The remote diagnostics module 224 determines the one or more software modules 1105 in which the error or errors have occurred, and downloads 1106 a debug version for each of the effected software modules or portions. Optionally, the client diagnostics module 246 may request that the user interface module 218 cause the debug output to be displayed 1107 on a screen of the mobile device. This feature allows the mobile device user to possibly assist in the diagnostic/debugging process. Debug versions of the software in which the error occurred are downloaded from the server system and installed 1108 on the client device. The output from these debug versions, for example time stamped values of parameters, are captured 1110 and sent to the remote diagnostics module 224. The diagnosis module 228 uses pre-stored diagnostic programs to analyze 1112 the output from the debug versions, or provides information as requested by user input from user interface module 240, or analyzes 1112 the data through a combination of stored programs and interactive directives. Once the diagnostic information is analyzed, support information is provided 1114 from the diagnosis distribution module 230 over the network 204 to the client diagnostics module 246. Some examples of support information are software instructions for corrective action or messages of an instructive or diagnostic nature which the client diagnostics module 246 sends to the client user interface module 218 to cause to be displayed on the screen of the mobile device.

The client diagnostics module 246 may also run tests with respect to the security policies. For example, tests may be run that attempt to communicate to the outside world on blocked ports or an IP address may be pinged. Output may be saved in a debug output file and sent to a screen on the mobile computing device and/or sent to the remote diagnostics module 224 on the server computer system.

Alternatively, in the embodiment of FIG. 2B, any one of the modules (e.g. 206, 208, 210, 212, 214, 218, 245) may have an event logging module and/or an auditing module which sends diagnostic information to the remote diagnostics module 224. In one example, each of the event logging module or the auditing module may record events pertinent to its respective module (e.g. location detection module 208). In another example, either or both of the event logging module or the auditing module may process events and perform audits relating to the processing performed by more than one of the modules.

Figures 3A, 3B:
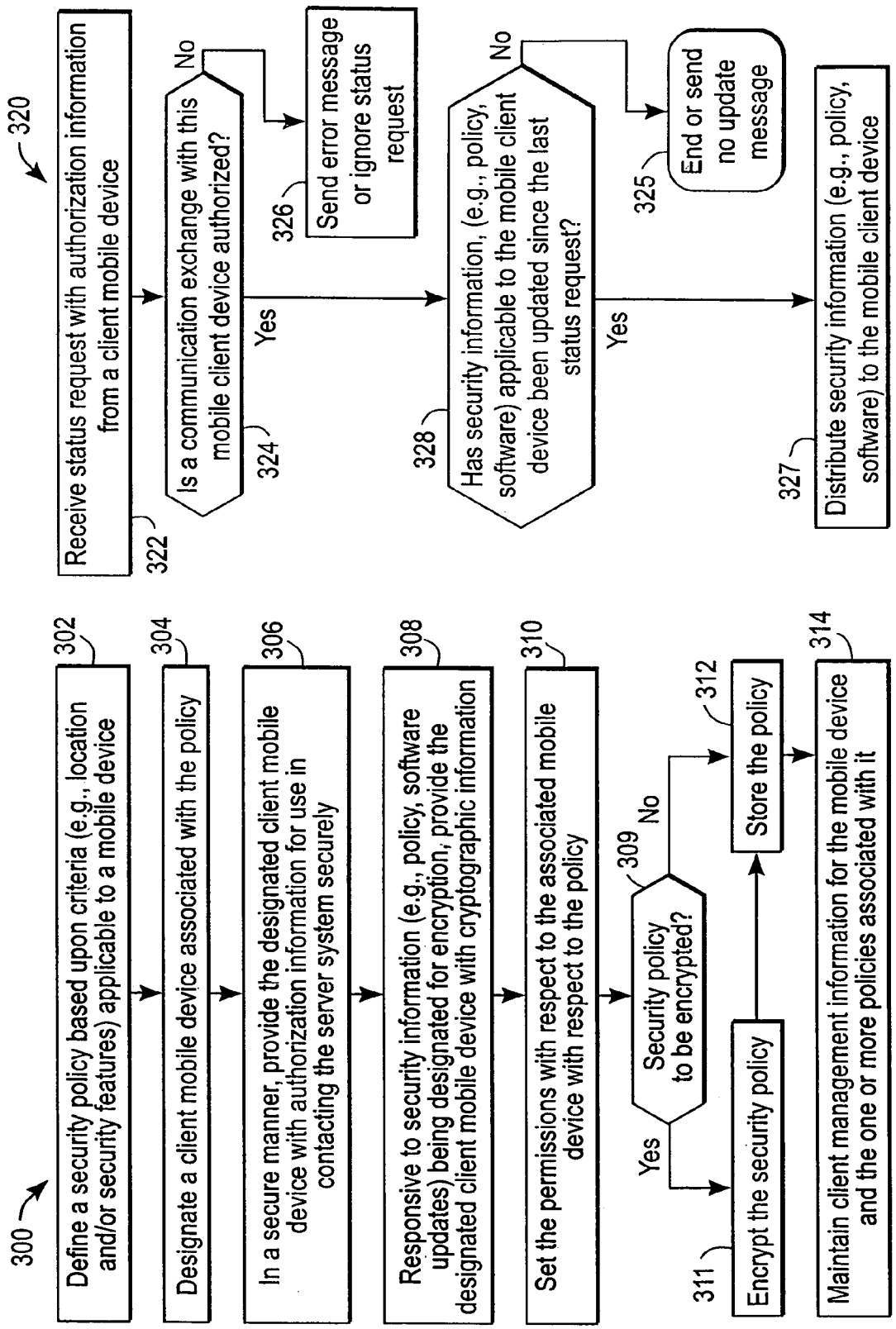
FIG. 3A illustrates a method for managing one or more security policies for the protection of data accessible by a mobile device based upon criteria in accordance with an embodiment of the present invention.
FIG. 3B illustrates a method for distributing a security policy by a server computer system for the protection of data accessible by a mobile device in accordance with an embodiment of the present invention.

For illustrative purposes only, the method embodiments illustrated in FIGS. 3A and 3B are discussed in the context of the system embodiment of FIG. 2A. FIG. 3A illustrates a method for managing one or more security policies for the protection of data accessible by a mobile device based upon criteria in accordance with an embodiment of the present invention. In the system embodiment of FIG. 2A, the policy management module 236 defines 302 a security policy applicable to a client mobile device based upon criteria. One example of criteria is the location associated with the network environment in which the mobile device is operating. Other examples of criteria are the presence or the activity status of one or more security features. Of course, a combination of location and one or more security features may also form a criteria basis for defining a security policy. The policy management module 236 designates 304 one or more client devices associated with the policy. In one example, this association may be based on an entity or class to which the security policy is applicable. An example of an entity is a group with one or more members. An example of a member may be a user of the client mobile device. A policy may be set that is applicable to the group of all engineers in the software development department. Another example of a member is the mobile device itself. For example, the capabilities of different mobile devices may be the basis for classifying them into different groups. In a secure manner, the policy management module 236 provides 306 the one or more designated client mobile devices with authorization information for use in contacting the server system securely. One example of authorization information is an encrypted token provided by the authorization module 232 to the mobile client device during a trusted connection between the two. An example of a trusted connection may be an internal connection behind the firewall of and within the internal network of the enterprise with which both the server system and the mobile client device system are associated. In one embodiment, an authority server within the firewall in the internal network provides the authorization information. When a client mobile device connects via the Internet, it interacts with one or more of the enterprise side servers external to the firewall. The client contacts the external servers to retrieve policies and instructions. The external servers also perform key/identity management, client disable methods (e.g. unmanaged mode) and policy persistence. The external servers communicate with the authority server through the firewall for client management information such as a key, a user, a group, and version information associated with a client mobile device system. In a similar manner, responsive to security information such as a policy or software being designated for encryption, the policy management module 236 provides 308 the designated client mobile device with cryptographic information which the client device can store and use to decrypt the security information. An example of cryptographic information is a key for use with a cryptographic authentication protocol. In one example, Microsoft® web keys may be used. The policy management module 236 sets 310 the permissions for the one or more associated mobile devices with respect to the one or more policies. In one aspect, permissions typically relate to the allowable modification that may be made to a downloaded policy or client software by the client mobile device. Permissions may be applied to various policies and to the criteria upon which policies are defined. For example, there may be permissions set for a policy, but permissions may also be set with respect to a location. Some examples of permissions specific to policies are as follows:

Ability to see the tray icon
Ability to shut down the service
Ability to go to unmanaged mode
Ability to go to self-managed mode
Ability to change to a different policy server, or get a policy from another server in the same enterprise
Ability to not pull down new policies when they are available
Ability to get software updates directly from a vendor
Ability to launch the settings application
Ability to modify visual settings
Ability to modify feedback levels
Ability to see/modify server-defined global objects (for each type of object)
Ability to create new global objects (for each type of object)
Ability to see/modify global objects in the policy (for each type of object)
Ability to change the global objects used in the policy (for each type of object)
Ability to remove adapters from the policy. Some examples of permissions specific to locations are as follows:
Ability to manually switch to a location
Ability to override a location.
Ability to manually switch to a different location
Ability to change enforcement mechanisms.

In one embodiment, in setting the permissions, for flexibility, a permission setting or a level of identification for each of the permissions may also be set. Some examples of these possible settings or levels are as follows:

Modifiable: The user has permission to modify the setting freely.
Recommended: The user has permission to modify the setting, but the application will recommend the policy's default.
Mandatory: The user does not have permission to modify the setting.
Hidden: The user does not have permission to view or modify the setting.

The policy management module 236 determines 309 whether the security information is to be encrypted. If not, the policy management module 236 stores 312 the security policy. If it is to be encrypted, the policy is encrypted 311. Similarly the policy management module 236 may also encrypted other types of security information such as software updates before they are stored. For example, the security policy may be stored as a data object in a memory 242 accessible via an internal enterprise network. In another example, security policies may be included in XML documents which may themselves be encrypted. In an alternate embodiment, the policy management module 236 may store the policy unencrypted, the policy distribution module 234 makes the determination of whether encryption applies to the policy or other security information, and the policy distribution module 234 encrypts the security information before distributing it. Additionally, in the embodiment of FIG. 2A, the policy management module 236 manages the one or more client devices for security purposes. One aspect of client management is that the policy management module 236 maintains 314 client management information for the mobile device and the one or more policies associated with it. The following list of information fields is an example of the types of information which may be included in client management information.

User Name
Group
Connection state, which is one of:
    Connected
    Last connected time
    Never connected
Policy for this user
Policy version for this user
Software version for this user
Current enforcement mechanisms
Diagnostic level, including diagnostic options available in the client settings
Diagnostic information
Auditing level
Auditing information
Locations Previously Detected
    The information may be organized in a data object stored in a memory 242 accessible to the server computer system.

Through a user interface, a system administrator provides input indicating actions to be taken with respect to managing clients. In the embodiment of FIG. 2A, the user interface module 240 provides the input to the policy management module 236. In one example, a graphical user interface (GUI) for managing mobile client devices provides a list of information identifying directly or indirectly all mobile client devices that have connected to the server system, and has controls for managing them. Information displayed may be based on information sent during client-server negotiation. Below are some examples of actions to be taken for one or more client devices selected in accordance with user input.

Remove this client device from the current list of connected client devices (although the client device is re-added the next time he connects).
Change auditing level (to one of the options described below).
Change the diagnostic level.
View the diagnostic or event log for this client device.
Reassign this client device to another group.
Define Properties (e.g. required hardware, required software, data accessibility rights, data visibility rights.)

FIG. 3B illustrates a method for distributing a security policy by a server computer system for the protection of data accessible by a mobile device in accordance with an embodiment of the present invention. In one embodiment, each of the client mobile devices sends a status request upon network access starting up to the server system. The status request provides information regarding the client mobile device, examples of which are authorization information, policies and their version numbers resident on the device, and diagnostic information. In the illustrative context of FIG. 2A, the authorization module 232 receives 322 the status request with authorization information from a client mobile device, and it determines 324 whether a communication exchange with this mobile device is authorized. If not, the status request is ignored 326 or an error message is sent 326. If the communication exchange is an authorized one, the policy distribution module 234 determines 328 if security information (e.g. a policy or software) applicable to the mobile client device has been updated since the last status request. If not, the status request is ignored 325 or a no update message is sent 325. Responsive to a new policy, a new version, or new software being available that is applicable to the requesting client device, the policy distribution module 234 distributes 327 the updated security information to the mobile device over the network (e.g. Internet) 204. In an alternate embodiment (not shown), the distribution module 234 determines if the information has been designated to be encrypted. If not, it distributes 327 the security information to the client device. If it is to be encrypted, the security information is encrypted and then distributed 327 to the client device.

Figure 3C:
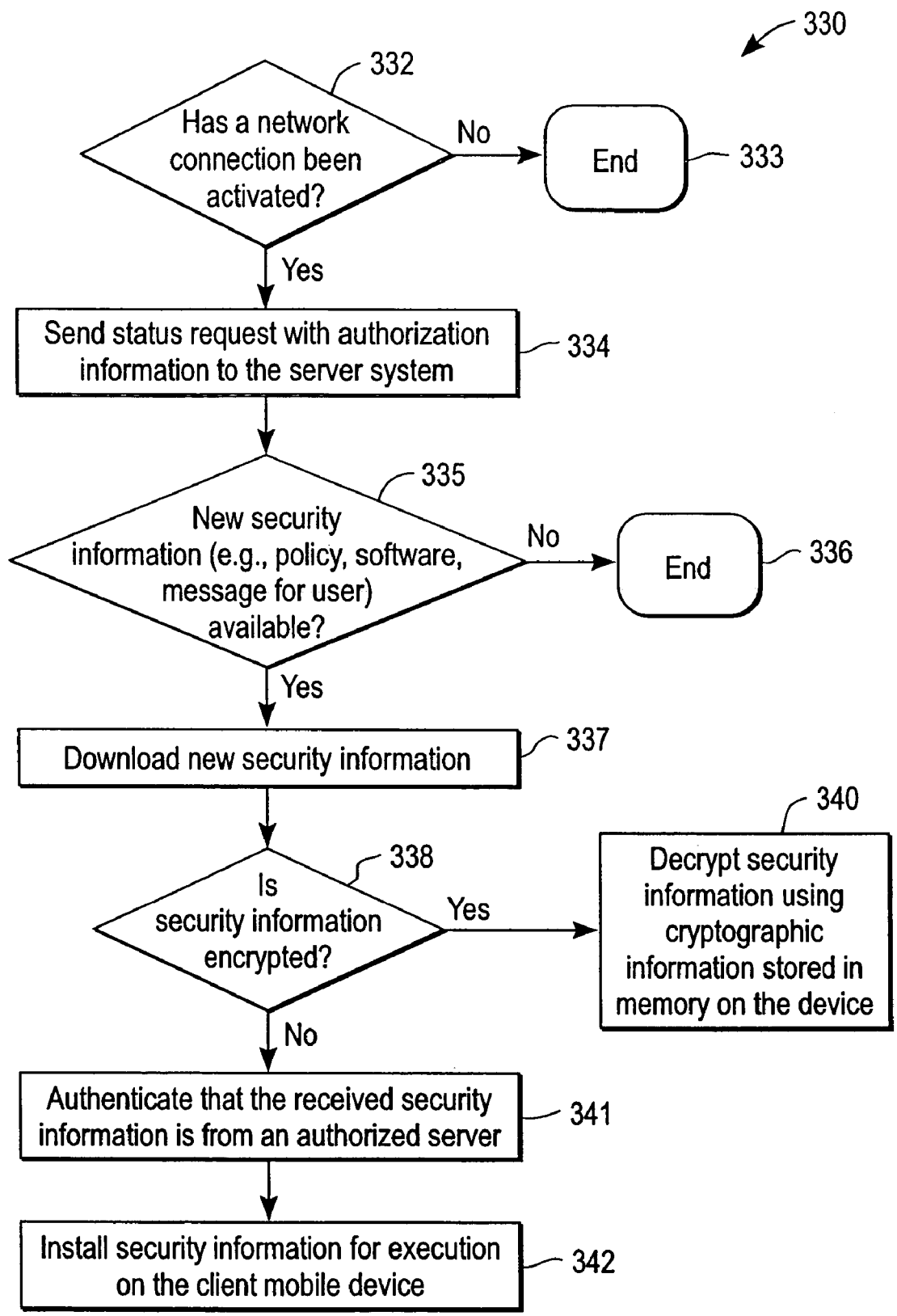
FIG. 3C illustrates a method for obtaining security information by a mobile client device from a server system in accordance with an embodiment of the present invention.

FIG. 3C illustrates a method for obtaining security information by a mobile client device from a server system in accordance with an embodiment of the present invention. In the embodiment of FIG. 2B, the client policy setting module 212 determines whether a network connection has been 332 activated. If not, a communication session with the server is not sought 333. However, responsive to a network connection being activated, the authorization module 245 on the client device sends 334 sends a status request checking if new security information is available along with authorization information to the server system 200.

For authentication purposes, in one embodiment, when the server system is installed, a key is generated and stored in an encrypted file. This encrypted file is copied and distributed to the clients and any other servers in the server system. In one example, the key generation uses a pseudorandom number generator code. This key may be used for two purposes: authentication of clients and authentication of a downloaded security information such as policies by a client as discussed below. Clients installed by some other enterprise will have a different key, and clients installed in an unmanaged mode will not have a key.

Responsive to it being determined 335 that new security information, for example a policy, software, or a message, is available, the new security information is downloaded 337. The client policy setting module 212 determines 338 if the security information is encrypted 338. If so, the security information is decrypted 340 using cryptographic information stored in memory (e.g. 220) that was previously downloaded in a secure session within the enterprise's internal network. For example, on the server side, a SHA1 hash of the file is performed, and the result is appended to the file. In this example, the file data is encrypted with the key for example using the Advanced Encryption Standard (AES). On the client side, a hash is performed with the key, and a comparison of the result made.

After the decryption or if none was needed, the security information is authenticated 341 by the client system, for example by the authorization module 245 in the embodiment of FIG. 2B. In one example, after the client decrypts the security information, which will be a policy in this illustration, a SHA1 hash of the policy is performed, and compared to the SHA1 hash found at the end of the decrypted file. If the comparison succeeds, then the client can safely conclude that the policy was generated on an authorized server, and that the policy has not been corrupted (nor tampered with). Next, the security information is installed 342 for execution on the client mobile device.

In an alternate embodiment, a session may be established between the server system 200 and the client system 201 using protocols. The protocols are designed to be extensible and straightforward to allow addition of new verbs later. An example "Establish Session" protocol that may be used to authenticate the client as a first step in all client-server transactions is illustrated below:

1. c -->s: protocol version, (user identification) UID
2. s -->c: random challenge
3. c -->s: SHA1(random challenge, key)

The server computes the same SHA1 hash, and if it doesn't match what the client sent, then the server drops the connection with no further ado. Otherwise, after this protocol is finished, the server has authenticated the client.

Responsive to a session not being authorized or being established, in this embodiment, the client diagnostics module 246 creates 328 an audit event noting failure to establish the session. Responsive to a session being established, the client policy setting module 212 sends an update query to the server system. Two examples of update query protocols may be used as discussed below:

The "Query Policy Update" protocol is used to find out if a new policy is available for download.

1. c -->s: the "Query Policy Update" verb, policy version
2. s -->c: message indicating either "there is a newer version," or "your version is up-to-date."

The "Query Software Update" protocol can be required as a step in all first connections or periodically as designated by the administrator.

1. c -->s: the "Query Software Update" verb, software version
2. s -->c: message indicating either "there is a newer version," or "your version is up-to-date"

As in FIG. 3C, responsive to it being determined (e.g. 335) that new security information, for example a policy, software, or a message, is available, the new security information is downloaded (e.g. 337). Two examples of download protocols that may be used are illustrated below:

After performing "Establish Session" protocol, and optionally the "Query Policy Update" protocol, then the "Download Policy" protocol may be used to retrieve the software update.

1. c -->s: the "Download Policy" verb
2. s -->c: the encrypted policy file

After performing "Establish Session" protocol, and optionally the "Query Software Update" protocol, then the "Download Software" protocol may be used to retrieve the software update.

1. c -->s: the "Download Software" verb
2. s -->c: the encrypted software update file At times, the server takes the initiative and "pushes" security information to at least one client. In one example, a protocol is used not to actually push a software update or a policy, but to notify clients that a software update is available as illustrated below. In one example, a multicast notification may be transmitted and in another example, a broadcast notification may be transmitted. The transmission may be to all currently connected clients in one instance. In another, the notification may be transmitted to all currently connected clients and to all other clients at that last known locations stored in client device profiles in memory 242.

s -->all c's: protocol version: "Push Software" verb, software version, software update size, total number of clients, max number of simultaneous clients, SHA1(protocol version, software version, software update size, total number of clients, max number of simultaneous clients, key) or for a policy:

s -->all c's: protocol version, "Push Policy" verb, policy version, policy size, total number of clients, max number of simultaneous clients, SHA1(protocol version, policy version, policy size, total number of clients, max number of simultaneous clients, key).

The clients use the "software update size," or the "policy size", "total number of clients," and "max number of simultaneous clients" to calculate a randomized waiting period before attempting to download the software update or policy. An example of a calculation for the randomized waiting period is as follows:
a) Calculate the number of excess users ("total number of clients"–"max number of simultaneous clients").
b) Use the "software update size" or "policy size" to calculate an estimated download time.
c) Calculate a pseudo-random waiting period between zero and the estimated download time.
d) Multiply the waiting period by the number of excess users, and wait for the resulting amount of time.

If more than "max number of simultaneous clients" connect at any one time, the overflow connections are dropped by the server, and the clients calculate another randomized waiting period before attempting to download the software update or policy again.

The interaction between a server system and a client system in administering protection of data can also provide a benefit of decreasing downloads to clients to keep them current. For example, one embodiment of a method in accordance with the present invention provides for anti-virus file scanning between a client and server. A benefit of this embodiment is that this approach decreases the latency typically found in responding to new computer viruses. In this embodiment, a software application on the client mobile device processes all incoming file and email transfers. The software calculates signatures of each file received and forwards these to a centralized server (e.g. corporate server). The server compares incoming signatures against its current database of virus signatures and responds to the client device with its results.

In this way, the client device uses the latest virus signatures with which the server has been updated.

Another aspect of the invention provides for allowing managed mobile clients to do secure "peer to peer" communications and file transfers via an intermediate policy server. One embodiment of a method for allowing managed mobile clients to do secure "peer to peer" communications and file transfers in accordance with the invention is described next. This embodiment illustrates the ability for a client to send a file to another client who may or may not be available on line. In the latter case, the files are transferred and cached to the policy server. When the receiving client comes on line, the files would then be transferred to it. Text messages may be handled in a similar fashion to files and queued where appropriate. This embodiment may provide that communications between clients would be encrypted according to a policy defined by the policy server administrator. This embodiment may also provide that the type, size, format and other attributes of transferred files would be controllable by the policy server administrator. Files transfers and/or user-to-user communications may be subject to other policies. Additionally, files transferred between users may be checked for malicious software by the policy server prior to being forwarded to the recipient. For email between users who are on the same corporate domain, email APIs may be used to redirect email and attachments through an encrypted channel to the policy server to the corporate mail server.

To address the problem of users on the road demanding changes to be made immediately to their policy when the policy server is unavailable from their location, a method for placing a client device temporarily in self-manage mode in accordance with an embodiment of the invention comprises the following:

1. The client generates a random challenge key.
2. A policy management module 236 in the associated server computer system 200 of the client generates a response key as an update flag which is read by an administrator over the phone to the user, who types it in to the client device.
3. The client authorization module 245 stores the update flag. The client system 201 enters a self-managed mode, allowing the user to edit and modify the client's security policies.
4. The client remains in this mode until it enters a location from which the policy server is available.
5. When the client enters a location from which the policy server is available, a new policy is automatically downloaded and the client exits self-manage mode (i.e., becomes managed again).

When the client enters a location tagged with the update flag, a new policy is automatically downloaded and the client becomes managed again.

For illustrative purposes only, the method embodiments illustrated in FIGS. 3D, 3E and 3F are discussed in the context of the system embodiment of FIG. 2B.

FIG. 3D illustrates a method 360 for protecting data accessible by a mobile device based on a location associated with the mobile device in accordance with an embodiment of the present invention. In the system embodiment of FIG. 2B, the location detection module 208 detects 362 a location associated with a network environment in which a mobile device is operating. The policy setting module 212 determines 364 what security policy is to be the currently enforced or current security policy based upon the detected location associated with the mobile device. The policy enforcement module 214 enforces 366 the current security policy.

FIG. 3E illustrates a method 380 for protecting data accessible by a mobile device based on a location associated with the mobile device and a security feature in accordance with another embodiment of the present invention. In the system embodiment of FIG. 2B, the location detection module 208 detects 382 a location associated with a network environment in which a mobile device is operating. Furthermore, in the system embodiment of FIG. 2B, the security features module 210 determines 384 whether one or more security features have an activity status of active or inactive in a communication session between the mobile device and another computer. The policy setting module 212 determines 386 the current security policy based upon the detected location and the activity status of the one or more security features associated with the mobile device. The policy enforcement module 214 enforces 388 the current security policy that has been set by the policy setting module 212.

FIG. 3F illustrates a method 390 for protecting data accessible by a mobile device based on a security feature in accordance with another embodiment of the present invention. In the system embodiment of FIG. 2B, the security features module 210 determines 392 whether one or more security features have an activity status of active or inactive in a communication session between the mobile device and another computer. The policy setting module 212 determines 394 the current security policy based upon the activity status of the one or more security features. The policy enforcement module 214 enforces 396 the current security policy that has been set by the policy setting module 212.

A system embodiment such as that in FIG. 2B may execute one or more of the method embodiments shown in FIGS. 3A, 3B or 3C on a continuous basis such as may be implemented for example using a periodic time setting or a loop. As a user moves through different network environments associated with different locations, the location detection module 208 continues detecting or monitoring the location using one or more location detection methods. Similarly the security module 210 continuously monitors the activity status with respect to one or more security features. With each change in location or security feature or both, the policy setting module 212 determines whether a change in the current security policy is necessary. The policy enforcement module 214 is notified of the change and enforces the new security policy set as the current policy. A notification of a change in policy, location, security feature or a combination of any of these may be sent by the policy setting module 212 or policy enforcement module 214 to the user interface module 218 which may then cause a notification indicating the change to be displayed in order to provide the user an opportunity to intervene in the policy change if he desires and is allowed to do so. Whether a notification is displayed or not, the security policy change in this embodiment is performed automatically without requiring user intervention.

Figure 4B:
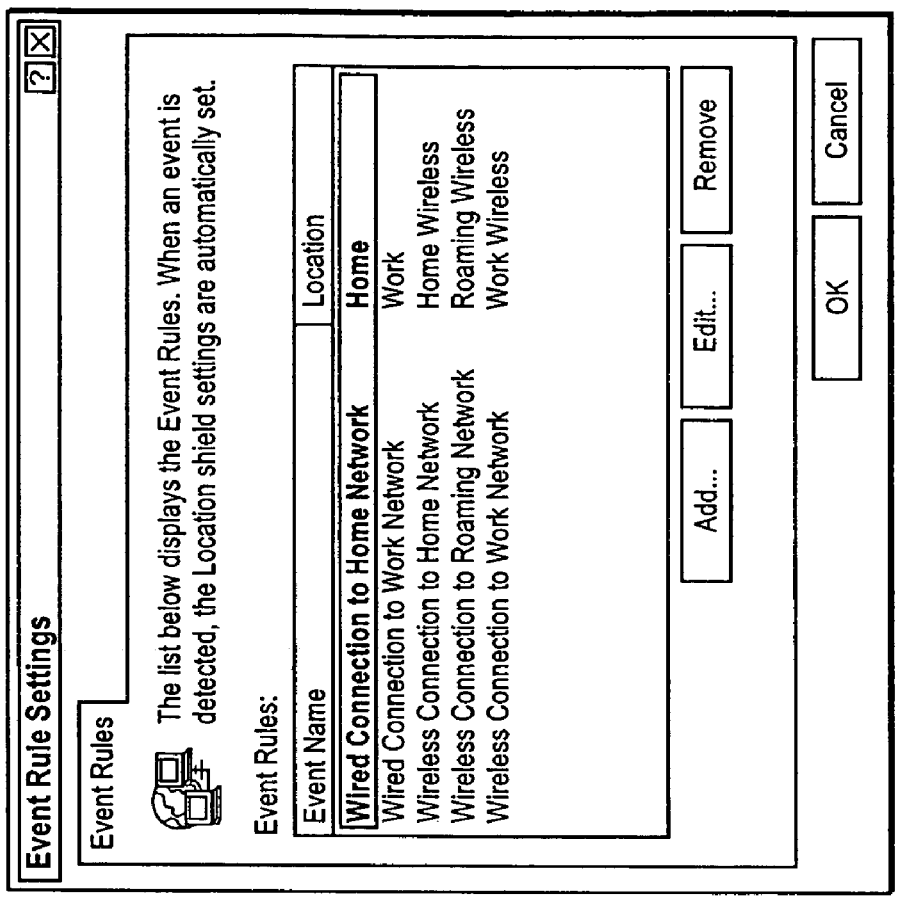
FIG. 4B illustrates an example of a graphical user interface displaying examples of combinations of a location and a security feature, each combination forming the basis of selecting a security policy in accordance with an embodiment of the present invention.
Figure 4A:
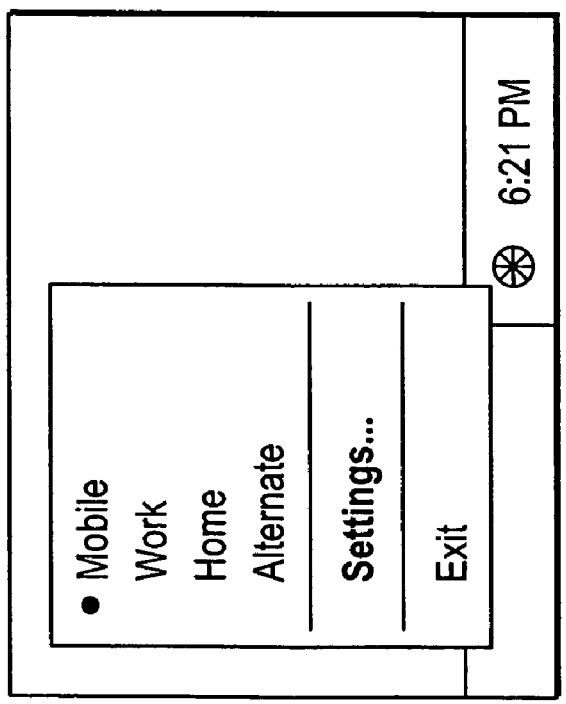
FIG. 4A illustrates an example of a graphical user interface displaying examples of locations in accordance with an embodiment of the present invention.

FIG. 4A illustrates an example of a graphical user interface displaying examples of locations in accordance with an embodiment of the present invention. The examples illustrated correspond to those shown in FIG. 1, "Mobile" 102, "Home" 104, "Work" 106 and "Alternate" 108.

FIG. 4B illustrates an example of a graphical user interface displaying examples of combinations of a location and a security feature, each combination forming the basis of selecting a security policy in accordance with an embodiment of the present invention. In this example, a location and a connection type detected are matched with an indicator. This indicator serves the dual role of a location indicator and a security feature indicator. As illustrated, the combination of having a "Wired connection to Home Network" results in an indicator or category of "Home." A "Wireless Connection to Home Network" results in an indicator or category of "Home Wireless" signifying that the associated policy accounts for security risks associated with a wireless connection.

Security policies may be stored as data objects accessible over a network 242 in FIG. 2A or in resident memory 220 in FIG. 2B. In another example, security policies may be stored as XML documents. A security policy may have associated with it or be associated with more than one location or security feature. For example, a security policy may be defined as a container having an object type of "location" and a data object type of "security feature." In one example, the "location" data object has attributes of "security features" and rules defining the policy associated with the location type. One example in which the security feature of adapter type is included in the location data type definition is illustrated below

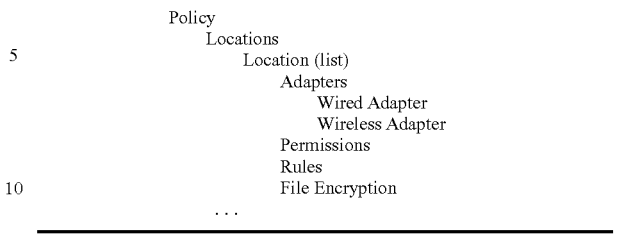

In the illustrated example, network adapters are generalized into the two categories of wired and wireless and when the policy is put into action on the mobile device, whatever adapters exist on the mobile device inherit the properties of these two prototype adapters in the policy object.

FIGS. 5A through 5F are discussed for illustrative purposes only in the context of the policy management module 236 and user interface module 240 of FIG. 2A. However the optional policy setting module 238 of the server system in FIG. 2A may also provide the same functionality as the policy management module 236 in defining an aspect of a policy. Similarly, the policy setting module 212 and user interface module 218 in FIG. 2B may provide similar functionality in defining an aspect of a policy as the policy management module 236 and user interface module 240 as allowed by the permissions set by the policy management module 236.

Figure 5B:
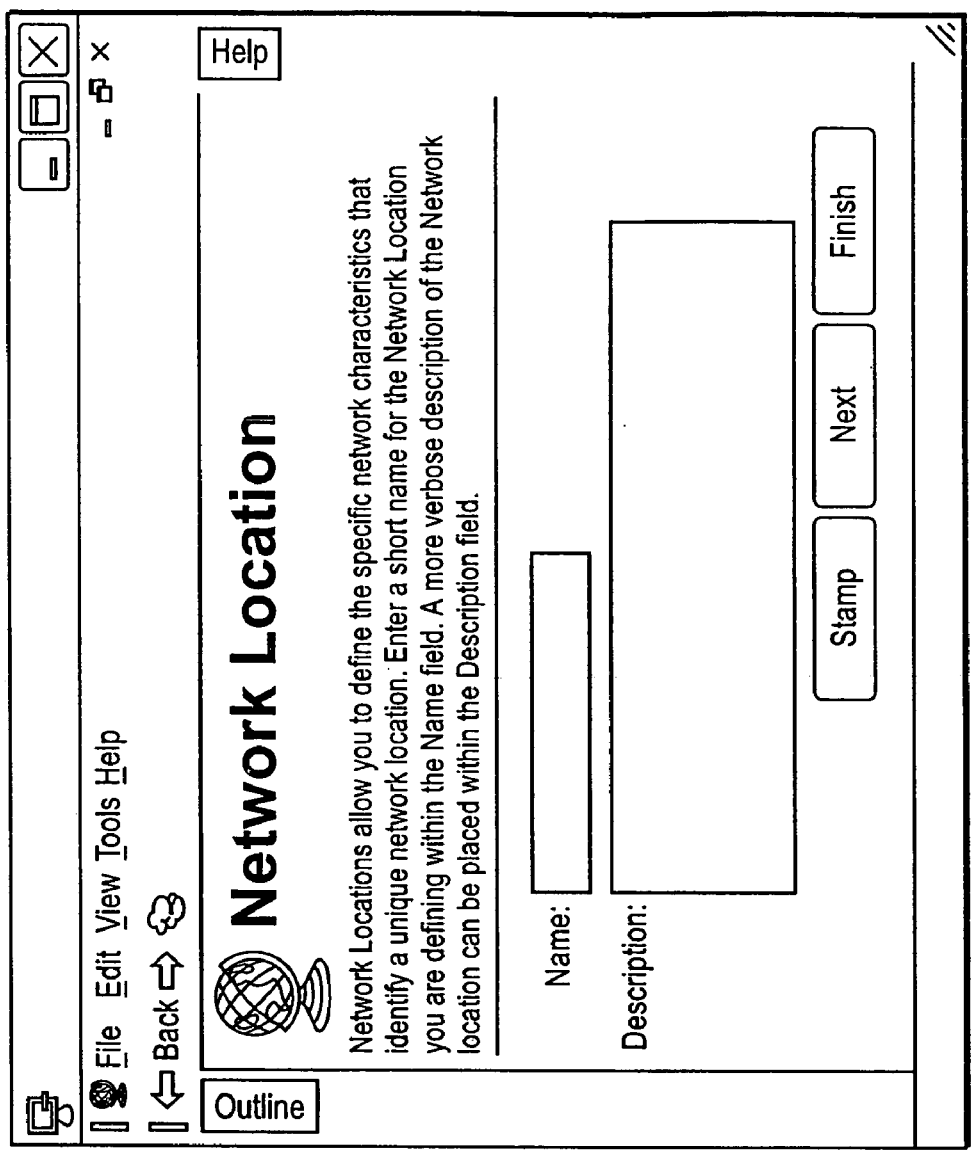
FIG. 5B illustrates a graphical user interface example illustrating a method for defining criteria with respect to environmental network parameters or characteristics to define a location in accordance with an embodiment of the present invention.
Figure 5A:
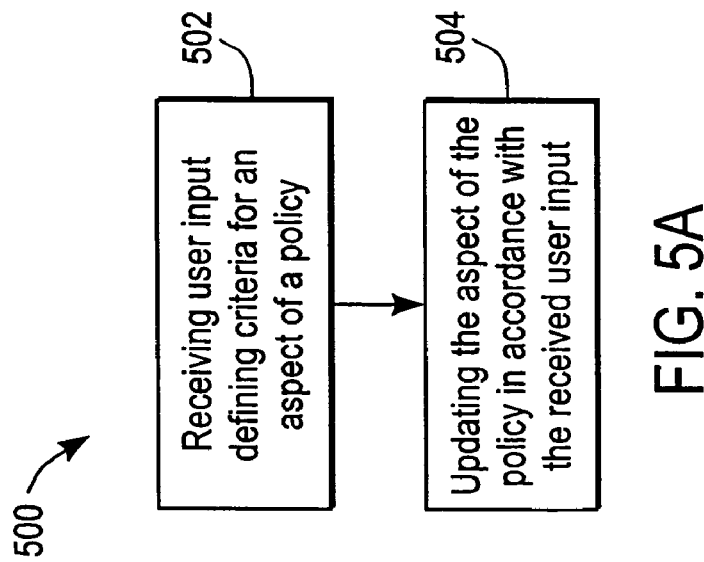
FIG. 5A illustrates a method for defining criteria for an aspect of a security policy in accordance with an embodiment of the present invention.

FIG. 5A illustrates a method 500 for defining criteria for an aspect of a security policy in accordance with an embodiment of the present invention. An example of an aspect of a policy is a location or a security feature. Another example is a component to be monitored such as a port or port group or a file. Some examples of a file are an e-mail, a text message, a TIFF file, or a Word document. For illustrative purposes only, the method embodiment is discussed in the context of the system of FIG. 2A. The policy management module 236 receives 502 user input from the user interface module 240 defining criteria for an aspect of a policy, and the policy management module 236 updates 504 the aspect of the policy in accordance with the received user input. FIGS. 5B, 5C, 5D, 5E and 5F illustrate graphical user interfaces illustrating an example of how an aspect of a policy may be defined.

FIG. 5B illustrates a graphical user interface example illustrating a method for defining criteria with respect to environmental network parameters or characteristics to define alocation in accordance with an embodiment of the present invention. In the embodiment of FIG. 2A, the policy management module 236 may receive from the user interface module 240 a user-selected name for a location to be defined via such a graphical user interface as this illustrated example. A user-provided description may also be received for this location via the illustrated interface. In one example, the network parameters are defined based upon user input received from user interface module 240 for each location to be defined. For additional locations in which the client user is allowed to define a location associated with a network environment or if the device is operating in a standalone mode, responsive to a selection of a button indicating the user wants the location to be defined, a "Stamp" button in this embodiment, one or more network parameters are determined. In the example in the context of FIG. 2B, responsive to the "Stamp" request, the policy setting module 212 requests a snapshot of the current network environment parameters which it receives in the example of FIG. 2B from the layer manager 206. Examples of network parameters are identifications of network services such as Gateways, Domain Name System (DNS) Servers, (Dynamic Host Control Protocol) DHCP and Domain servers. Other examples include identifications for Windows® Internet Naming Service (WINS) servers. Alternatively, the policy management module 236 may receive the "stamped" network parameters from the policy setting module 212 or the location detection module 208 on the client device after a snapshot has been taken in order to define locations.

Figure 5D:
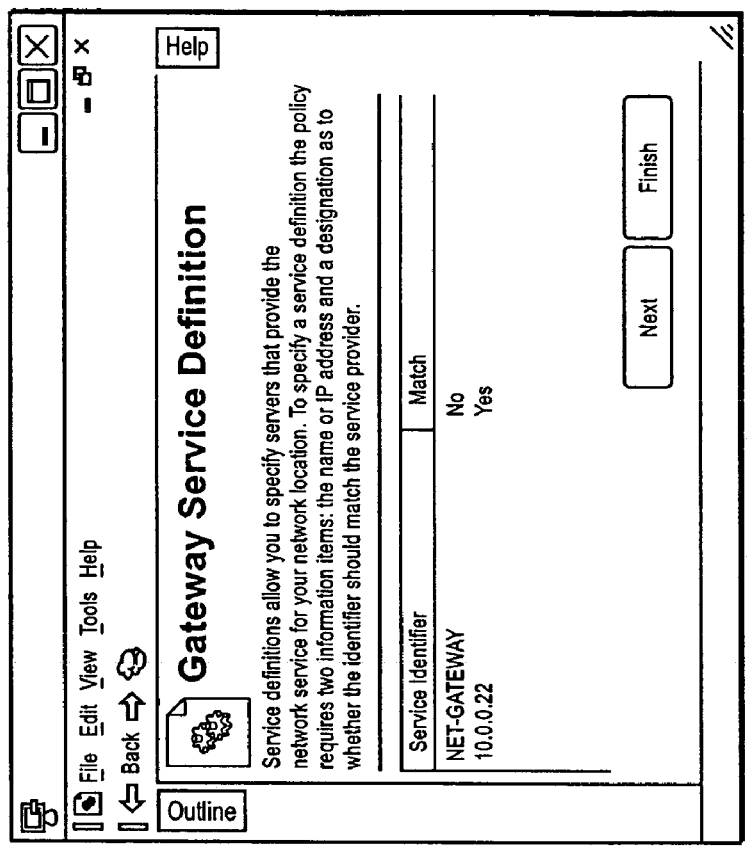
FIG. 5D illustrates a graphical user interface example for configuring parameters associated with one of the selected network services, in this example Gateway services, of the method example described in FIGS. 5B, 5C, 5E and 5F in accordance with an embodiment of the present invention providing for further configuration of the selection of services.
Figure 5C:
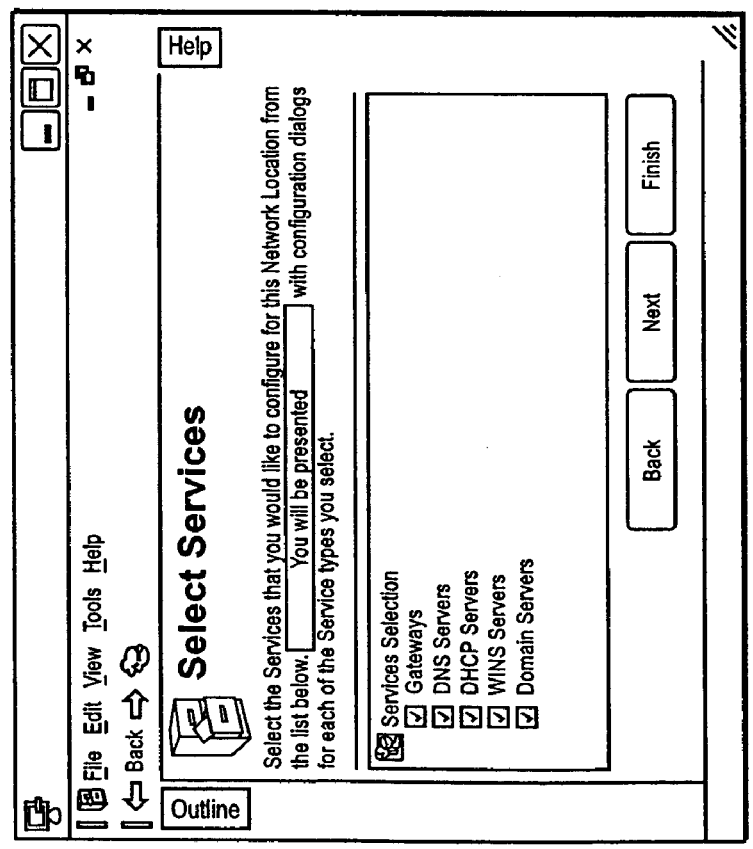
FIG. 5C illustrates a graphical user interface example displaying the network services in further illustration of the method example described in FIGS. 5B, 5D, 5E and 5F.

FIG. 5C illustrates a graphical user interface example displaying the network services identified in a network snapshot in further illustration of the method example described in FIGS. 5B, 5D, 5E and 5F. In the example in the context of FIG. 2A, the policy management module 236 directs the user interface module 240 to display the types of servers, which the user interface module 240 causes to be displayed in such an interface as the illustrated example of FIG. 5C. The displayed user interface example of FIG. 5C illustrates by check marks user input that has been received via an input device identifying those services selected for further configuration.

FIG. 5D illustrates a graphical user interface example for configuring parameters associated with one of the selected network services, in this example Gateway services, of the method example described in FIGS. 5B, 5C, 5E and 5F in accordance with an embodiment of the present invention providing for further configuration of the selection of services. FIG. 5D presents an example user interface for configuring a "Gateway Service Definition." In this embodiment, the service definition specifies the specific servers that provide network service for this location. In this example, for each service provider entry, a service definition may be defined by a service identifier having a value of a NETBIOS name such as "NET-GATEWAY" or an IP address. In the example in the context of FIG. 2A, a service identifier designation is received by the policy management module 236 from the user interface module 240. In the illustrated example of FIG. 5D, the service identifier designation indicates whether or not a particular service identifier provided by a service provider during location detection in operation of the mobile device must match this service identifier by a "Yes" or a "No" input designation. The policy management module 236 stores the service identifiers and their corresponding service identifier designations so that they are associated with the location being defined.

Figure 5F:
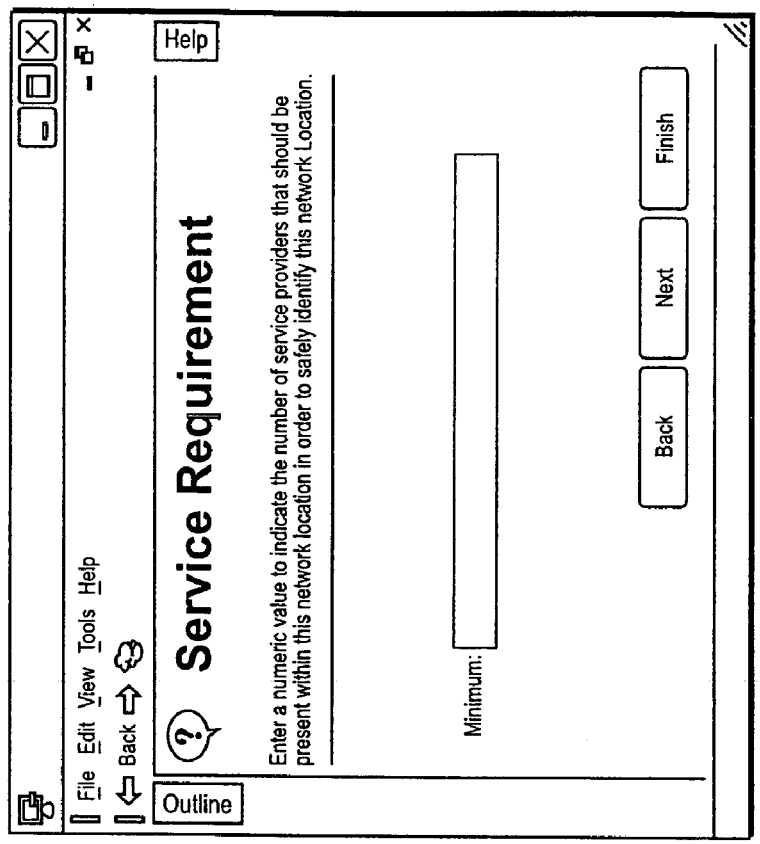
FIG. 5F illustrates an example user interface for indicating a minimum number of network services or service providers to be present within the network environment for a valid location identification in continuing illustration of the example of a method in accordance with an embodiment of the present invention illustrated in FIGS. 5B, 5C, 5D, and 5E.
Figure 5E:
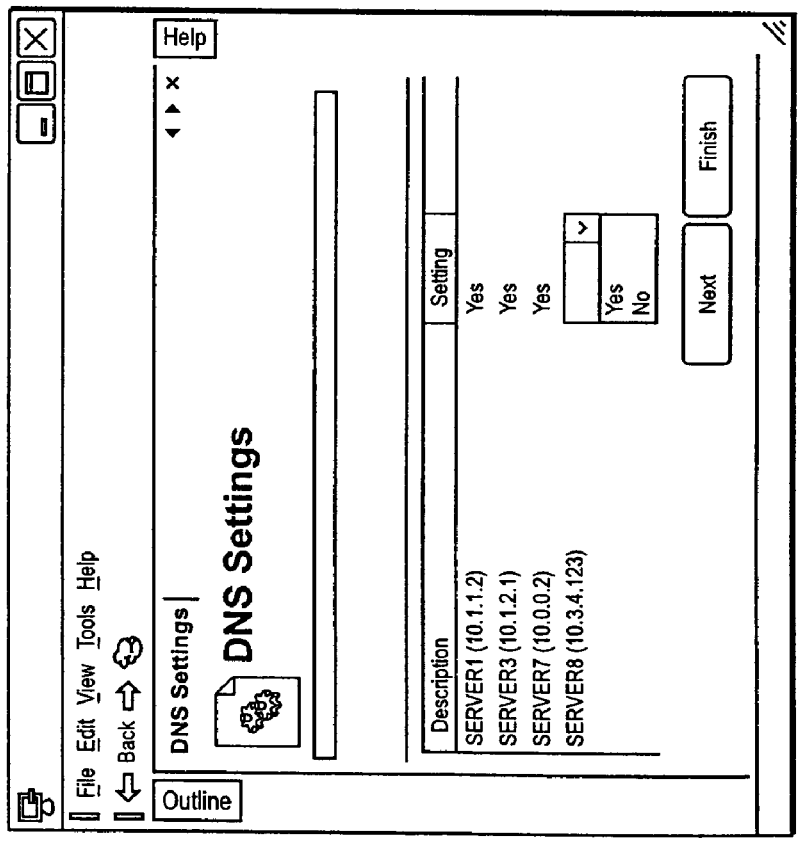
FIG. 5E illustrates another graphical user interface example for configuring parameters associated with one of the selected network services, in this example Domain Name System (DNS) Servers, of the method described in FIGS. 5B, 5C, 5D and 5F in accordance with an embodiment of the present invention providing for further configuration of the selection of services.

FIG. 5E illustrates another graphical user interface example for configuring parameters associated with one of the selected network services, in this example Domain Name System (DNS) Servers, of the method described in FIGS. 5B, 5C, 5D and 5F in accordance with an embodiment of the present invention providing for further configuration of the selection of services. In this example, the parameter associated with each of these identified servers is an IP address, and user input designates by "Yes" or "No" whether the IP Address is a parameter to be associated with the location associated with this network environment.

FIG. 5F illustrates an example user interface for indicating a minimum number of network services or service providers to be present within the network environment for a valid location identification in continuing illustration of the example of a method in accordance with the present invention illustrated in FIGS. 5B, 5C, 5D, and 5E. In the example in the context of FIG. 2A, the minimum number is received by the user interface module 240 and forwarded to the policy management module 236. This minimum number may include the number of service providers whose service identifiers must match plus a number of service providers whose identifiers may optionally match according to a user defined criteria. These one or more network parameters identifying the location are stored in a data object (e.g. look-up table) in memory 242 for the associated client device. Similarly, they may be stored in a data object in resident memory 220, particularly for locations defined by the client system 201.

Figure 6A:
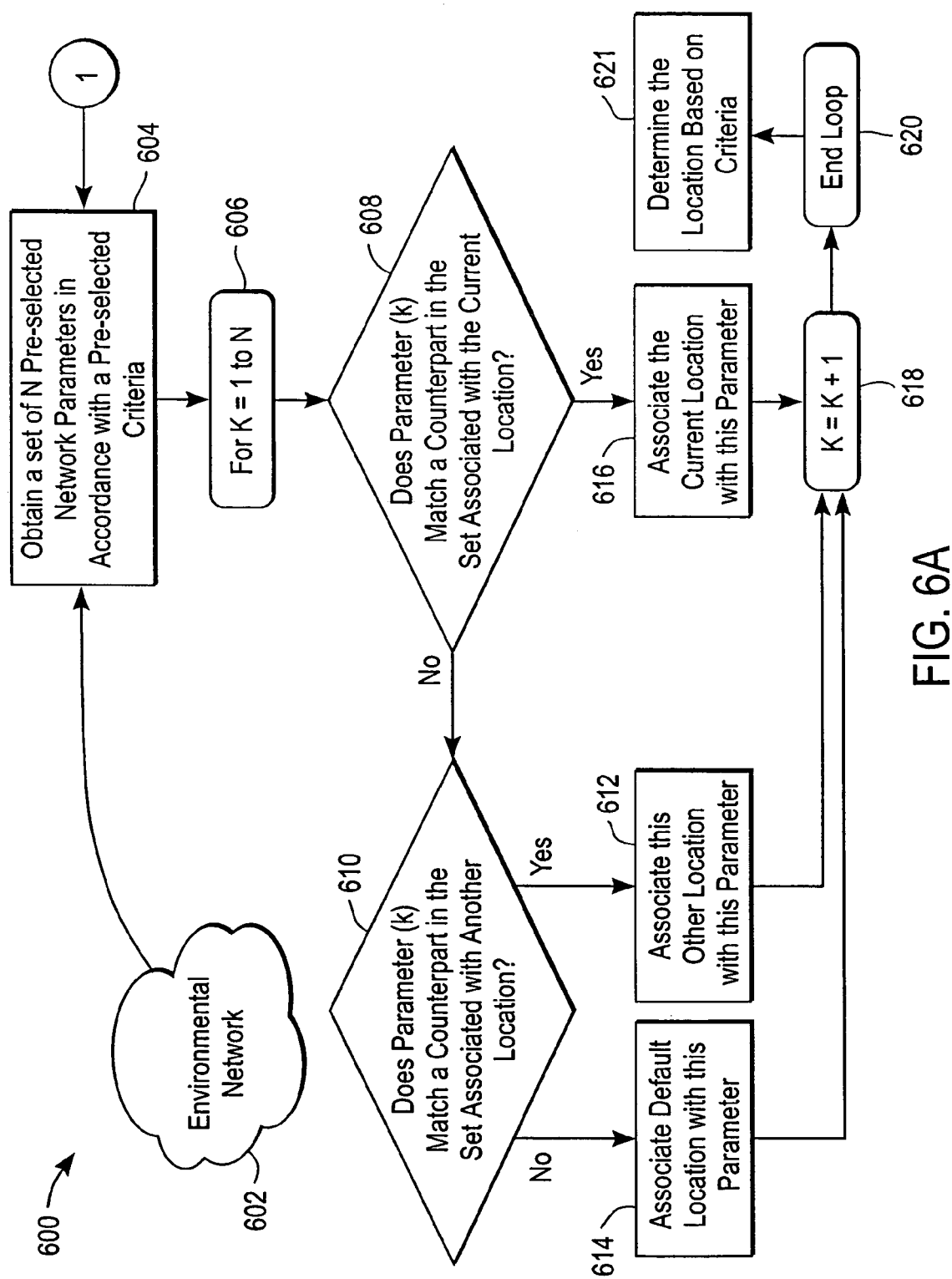
FIG. 6A illustrates a method for detecting location based upon defined criteria in accordance with an embodiment of the present invention.

FIG. 6A illustrates a method 600 for detecting location based upon defined criteria in accordance with an embodiment of the present invention. The defined criteria may be based on network parameters such as the examples of a Domain, Gateway, DHCP, DNS1, DNS2, DNS3, and WINS servers as discussed with reference to FIGS. 5B-5F. Additionally, the criteria may include one network parameter or a combination of network parameters available within the same layer of a communication model or across layers of a communication model. Examples of such parameters include a MAC address associated with the data-link layer of the OSI model or the subnetwork layer of the Internet Protocol Stack (IPS), an IP address typically associated with the network layer of the OSI model and the Internet layer of the IPS model, a port value typically associated with the transport layer in the OSI or IPS models, and an application parameter (e.g. an application identifier or information derived by an application) typically associated with the application layer in the OSI or IPS models.

Figure 6B:
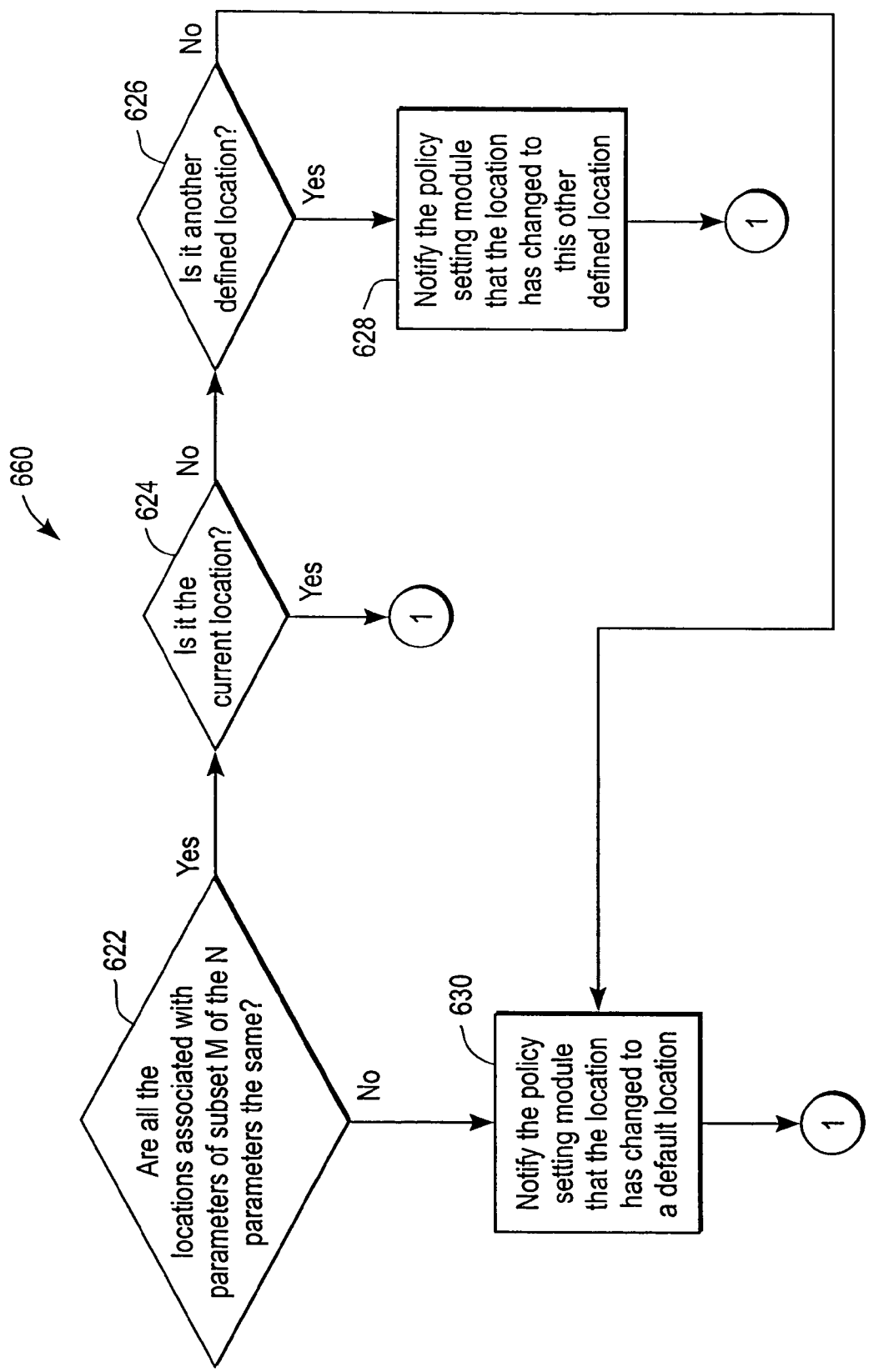
FIG. 6B illustrates one version of the method in accordance with this embodiment of the present invention illustrated in FIG. 6A in which the criteria is a matching criteria.
Figure 6C:
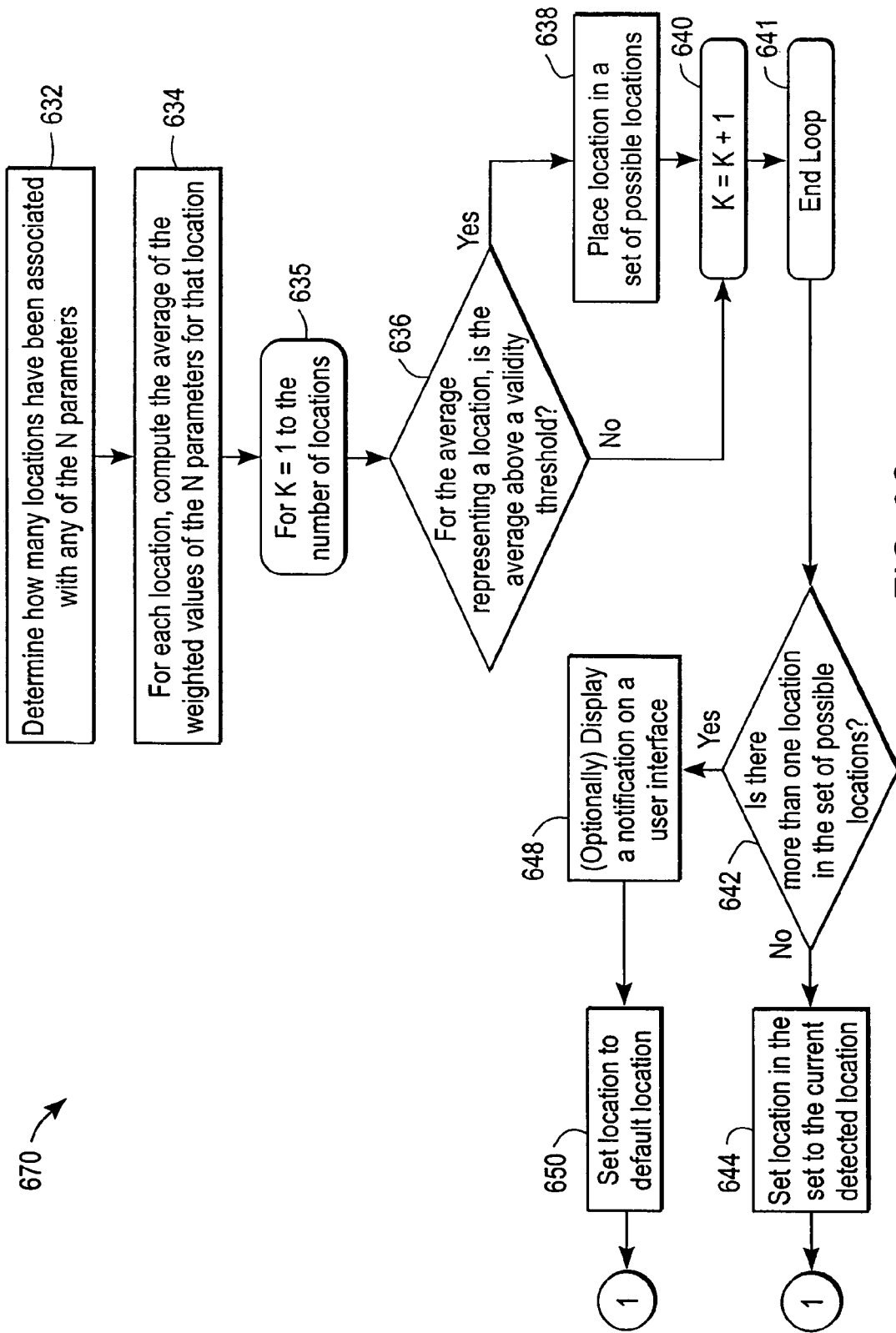
FIG. 6C illustrates one version of the method in accordance with this embodiment of the present invention illustrated in FIG. 6A in which the criteria is a weighted average of N network parameters.

For illustrative purposes only, the method embodiments illustrated in FIGS. 6A, 6B and 6C are discussed in the context of the system embodiment of FIG. 2B. The layer manager 206 obtains 604 a set of N pre-selected network parameters from the network environment 602 to which the mobile device is connected and forwards them to the location detection module 208. The location detection module 208 processes 606 each of the N parameters received. Such processing may be done in a loop 606, 620. For each parameter, it is determined 608 whether it matches a counterpart in the set associated with the current location. If yes, the location detection module 208 associates 616 the current location with this parameter. For example the association may be accomplished using a lookup table. The next parameter is selected 618 for review (e.g. K=K+1). If the parameter value does not match the predefined value for the current location, it is determined 610 if it matches the predefined value for another location. If so, associate 612 this other location with this parameter (e.g. in a lookup table). Otherwise, associate 614 a default location with this parameter in a lookup table. After the N parameters have been processed, the location is determined 621 based on criteria.

FIG. 6B illustrates one version 660 of the method in accordance with this embodiment of the present invention illustrated in FIG. 6A in which the criteria is a matching criteria. It is determined 622 whether all the locations associated with a subset M of the N parameters are the same. If they are, it is determined 624 whether this location is the current location. If it is, then the next set of N parameters is processed (See 604 in FIG. 6A). The following example illustrates a subset M of N parameters that may be used to identify a network.

| (Minimum of 3 matches) | | |
|---|---|---|
| Domain: | AcmeBananas | (Must Match, #1) |
| Gateway: | 10.0.0.254 | (Should Match, #1) |
| DHCP: | 10.0.0.12 | |
| DNS1: | 10.0.123.1 | (One of the DNS's Must Match, #2) |
| DNS2: | 10.0.123.2 | |
| DNS3: | 10.0.132.1 | |
| WINS: | 10.0.0.212 | (Should Match, #2) |

Suppose N=7, and M=3 in order to define this location as "work" for the mobile device of an Acme Bananas employee. The Domain of "AcmeBananas" may be defined as a parameter that is required to match. Additionally, the second required match for the subset M may be that any one of, but at least one of, the three DNS servers' IP addresses must match its counterpart in the defined criteria for this "work" location. For the third required match in this example of M=3, the match may be selected from a set parameters. In the example above, if either of the Gateway IP address or the WINS server IP address matches, the three required matches have been found satisfying the defined criteria for the "work" location.

An event logging module may be helpful in tracking which parameters match successfully on a consistent basis. In the above example, the client user or an administrator may view the event log and see that there has never been a match for DNS3 since the "work" location was defined. This may indicate that a check of the IP address for DNS3 may be in order to verify it was entered correctly. In another example, this trend may be noted by the monitoring module 226 on the server side or the client diagnostics module 246 on the device. If it is not the current location, it is determined 626 if it is another defined location. If so, then the policy setting module is notified 628 that the location has changed to this other defined location, and the next set of N parameters is processed 604.

In different examples, M may have different numbers. For example, it may be one. Perhaps for a home wireless network, the MAC address for a network access point is the only parameter tested to identify the home network environment. All other locations may be assigned a Mobile location designation. M may be the minimum number described with respect to FIG. 5F representing a number of network environment parameters to be examined.

Similarly, a location detection test may detect location based on parameters from different layers in a model for communications between computers in a network. For example, the N parameters in the illustrated Acme Bananas example may also define a MAC address, a layer 2 data-link parameter, a TCP port, a layer 4 transport parameter and a layer 7 application parameter including information derived by the application in the criteria for a location. The two additional terms below illustrate an example.

DNS1: 00-01-03-32-72-AB

POP3: 10.0.0.35:99

Assume for this example, that Acme Bananas operates its POP3 mail service on port 99, a layer 4 parameter, instead of a standard port 110. In this example, the MAC address: 00-01-03-32-72-AB for DNS1 is a layer 2 parameter. Each of these parameters may be required to match or may be a discretionary parameter, such as the Gateway IP address or WINS server IP address in the example above, whose match may be used in a location detection test. For this illustrative example, we refer to the system of FIG. 2B again for purposes of illustration and not limitation. The location detection module 208 may have an application proxy that emulates a POP3 client in order to verify that the POP3 service is actually running on the specified server on port 99 in this example (which is not the standard POP3 port of port 110). This information is a layer 7 or application layer parameter upon which a location detection decision may be based. As seen in this example, different layers can provide additional verification of parameters received at other layers. Here the layer 7 parameter is verifying the layer 4 parameter. Here are other examples of criteria to be used for identifying a location:

1) The Default Gateway IP address and MAC address must both match the stored values, or
2) The DHCP server IP address and MAC address must both match the stored values, or
3) The Default Gateway IP address and the DHCP server IP address must both match the stored values, or
4) The local IP address must match the stored value.

If it was determined 622 that all the locations associated with the M parameters were not the same, the policy setting module is notified 630 that a default location is the current location, and the next set of N parameters is processed 604.

FIG. 6C illustrates another version 670 of the method embodiment in FIG. 6A in which the criteria 621 for determining location is a weighted average of N network parameters. It is determined 632 how many locations have been associated with any of the current set of N parameters. For each location, the average of the weighted values is computed 634 for the N parameters for that location. It is determined 636 for each of the averages associated with a location, if the average is above a valid threshold. If it is, then the location is stored 638 in a set of possible locations. The processing would repeat 640 if there is more than one location associated with any of the N parameters. It is determined 642 whether there is more than one location in the set of possible locations. If not, then the location in the set is set 644 to the current detected location. Responsive to the determination that there are more than one locations in the possible set, optionally, a notification may be displayed 648 on a user interface (e.g. 240 or 218). The location is set 650 to a default location.

In a variation of the method embodiment of FIG. 6C, instead of an average, each of the N parameters may be assigned a confidence or weighted value. Parameters of more significance receive higher confidence values. An average or a sum of the confidence values may be computed to determine location. Consider the example of Acme Bananas again. Assume percentages or percentiles are assigned to each of the seven parameters in accordance with a user-defined location definition for "work." Assume the domain name has a confidence value of 0.4, each of the DNS servers has a value of 0.4, and the WINS server has a confidence value of 0.25. Assuming a threshold of one as a sum of the confidence values is the threshold criteria for associating this network environment with the location "work," if the domain name, at least one of the DNS servers' IP addresses, and the WINS IP address match their predetermined counterparts, the sum of their confidence values exceeds one. "Work" is associated with the mobile device operating in this network environment.

A heuristic approach to location determination based on historical data compiled for variables that are present in snapshots of current network environment parameters provides advantages. In one embodiment, the variables tracked include those defined in the location policy as a basis for location detection and as well as others that consistently appear in the snapshots. One benefit is that, after a period of learning, the historical data can be used to override location detection decisions and improve both security and usability. Location determination based on historical data can improve security by preventing false positives in location detection. For example, a network environment could be set up by an attacker as a trap to try to fool the location detection and get the client device to adopt a relaxed policy in what is actually a hostile environment. Using the learning mechanism and the historical data, even if all of the location requirements that were entered in the policy by the administrator are met, if too few of the usual servers and services are present, then the location decision is overridden and the location is not recognized. Thus, even an attacker possessing all the location detection requirements laid out in the policy does not possess sufficient information to fool the location detection. Similarly, even if all of the location detection requirements that were entered in the policy by the administrator are met, if another parameter, for example, geographical coordinates from which the network location is being accessed are too far from the norm (e.g., the network parameters indicate the client device is located at the Pentagon, but a GPS tracker on the client device indicates it is in Moscow), then the location decision is overridden and the location is not recognized.

This mechanism can also improve usability by preventing false negatives in location detection, because even if not all of the location detection requirements that were entered in the policy by the administrator are met, if enough of the usual servers and services are present in the current snapshot, then the location can be reliably recognized anyway, so the location decision is overridden and the location is recognized. For example, if a NIC in a gateway machine is replaced so that its MAC address no longer matches the required value expressed in the policy, clients can continue normal operations (and the administrators can be notified via a reporting mechanism that the policy should be updated to contain the new gateway MAC address). Note that unlike the case of preventing a false positive, it is not recommended that geographic data be used to override negative location detection. Even if client device is physically present in a user's office, if the client device is connected to a non-work related WLAN, it is not desirable to override the negative detection and set the location to "work."

Figure 6D:
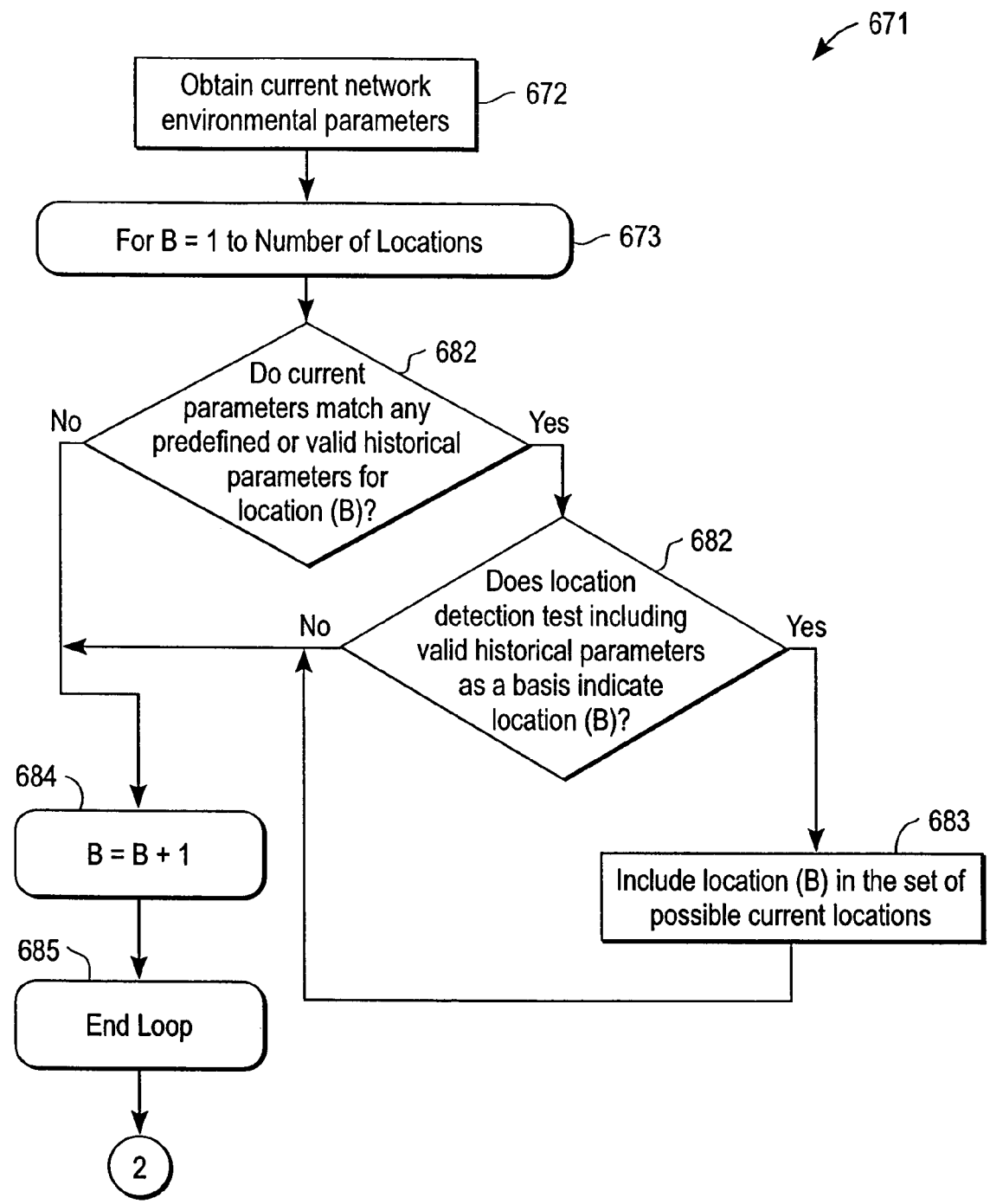
FIGS. 6D, 6E and 6F illustrate another method of location determination using heuristics based on historical data in accordance with an embodiment of the present invention.
Figure 6E:
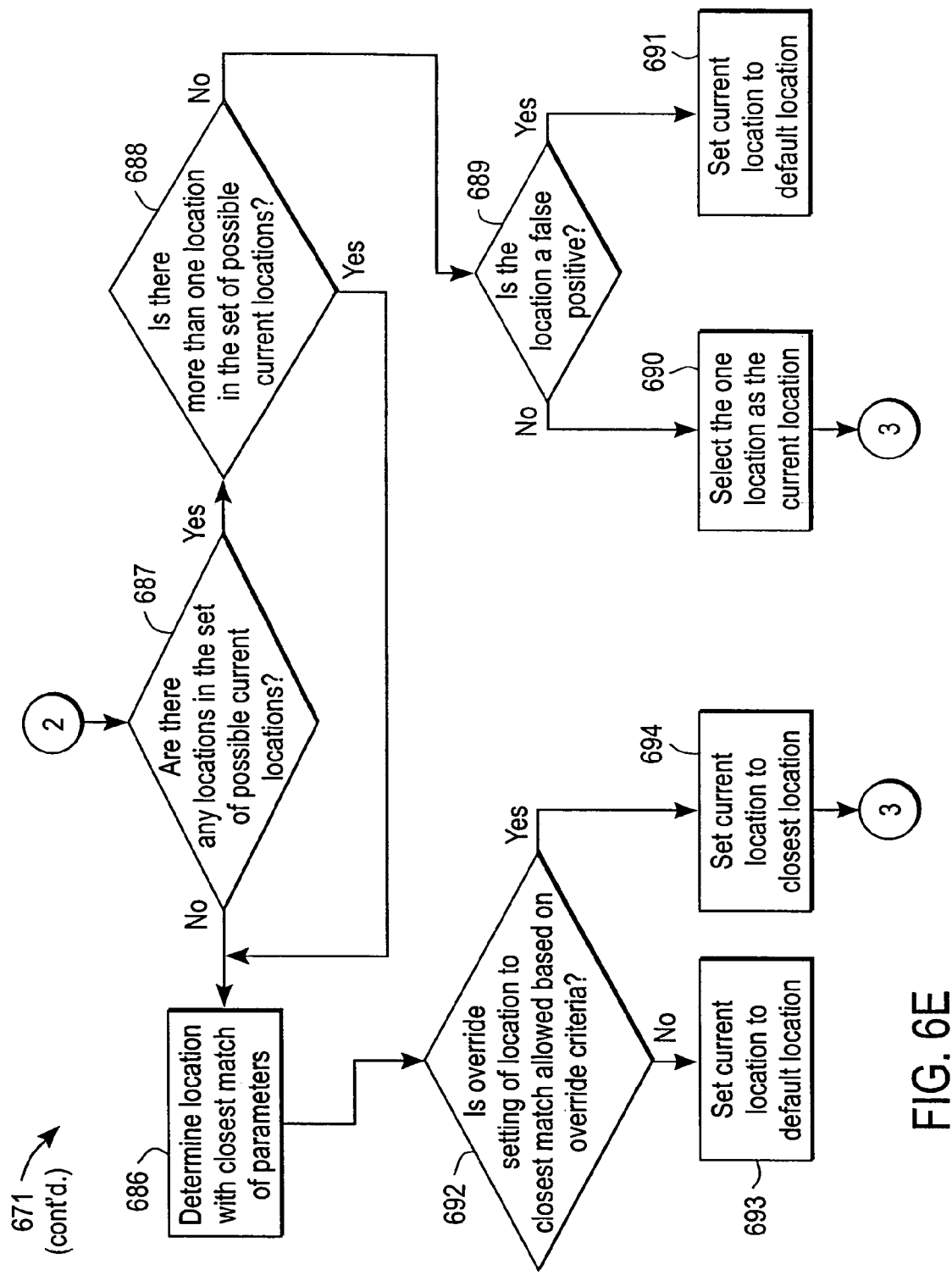
Figure 6F:
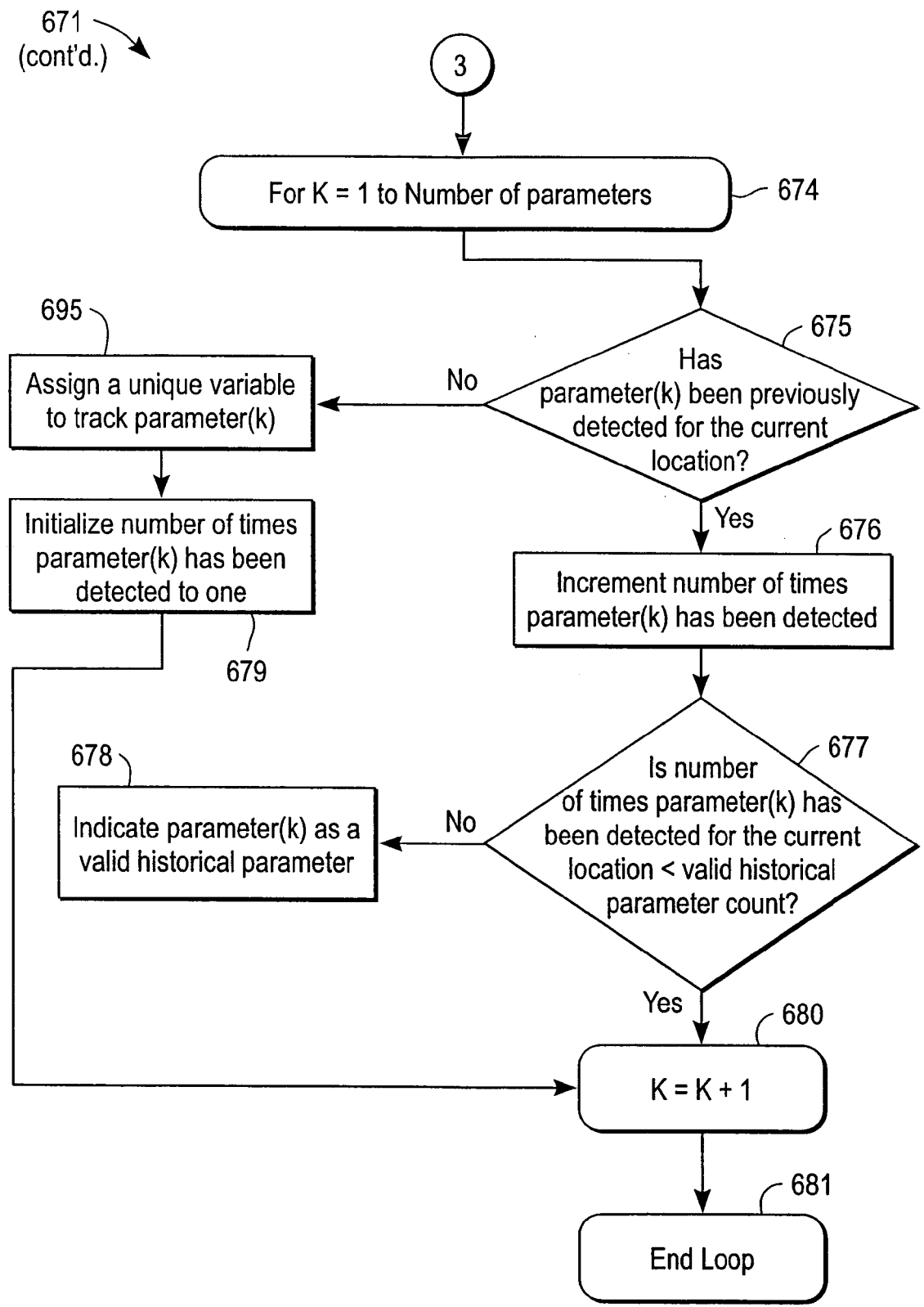

FIGS. 6D, 6E and 6F illustrate another method 671 of location determination using heuristics based on historical data in accordance with an embodiment of the present invention. Again, for illustrative purposes only, the method embodiment 671 is discussed in the context of the system embodiment of FIG. 2B. The layer manager 206 obtains 672 the current network environmental parameters from the network environment (e.g., 602) to which the mobile device is connected and forwards them to the location detection module 208. In this example, for each defined location, the parameters are reviewed to see if they indicate that location. In this example, the location module 208 loops 673 through indices, the values of B, identifying each location. Other examples can be used wherein each location is not checked, for example, stopping after a first successful location detection. The location module 208 determines 682 whether the current obtained parameters match any predefined or valid historical parameters for location (B). For example, location module 208 can compare the obtained parameters with the predefined policy parameters and valid historical parameters stored in a lookup table indexed by location. Responsive to a negative response, the next location's parameters are reviewed by the location module 208. In this example, the location index B is incremented 684. It will be apparent to those of skill in the art that other initial values of loop indices may be used. Responsive to a positive response, the location module 208 determines 682 based on performing a location detection test including valid historical parameters as a basis whether or not the results indicate location (B) is the current location. Responsive to a positive result, the location module 208 includes 683 the location (B) in a set of possible current locations, and the location module 208 increments 684 location index B. Responsive to a negative result, the location module 208 increments the location index B to test if another location has been detected unless the loop ends 685 because the number of defined locations have all been checked. In one example, parameters can be tracked for an undefined location as well. Over time, valid historical parameters can be determined for the undefined location which, responsive to satisfying a definition criteria (e.g., established by an administrator for the enterprise system or the client user in a standalone mode), can change that location to a known defined location.

An example of a location detection test including valid historical parameters as a basis is one in which a composite value of several independent terms are used to define a location threshold. In one aspect, predefined or expected network settings as defined in the policy for a given location form one basis for the location determination. Another component or basis is a historical component that can be applied to both predefined and undefined parameters. In this example, a location threshold (LT) can be defined as the normalized sum of these components as represented below:

$$\frac{\sum c_j y_j v_j + \sum w_i x_i + \sum a_k p_k z_k}{\sum w_i + \sum c_j y_j + \sum a_k p_k}$$

In this example, three parameters vj, xi and zk are used to detect a given location. The variable vj corresponds to a value, for example a numbered index, corresponding to a policy predefined environmental parameter such as an IP or MAC address from which the client device has received traffic while at the given location. A critical weighing factor, cj, is used to add bias to the pre-defined parameter in this example. For example, an administrator can assign factor values (e.g., between 1 and 100) when selecting the parameter for definition for this location. Assigning a higher weighing factor to a parameter deemed mandatory for a location detection, correspondingly increases the likelihood of detection for the location when the mandatory parameter is present. A historical component is included in the sum for parameter vj as well. The variable yj represents the number of times parameter vj has been previously detected in the given location. Some examples of the beginning point for the count of the number of times the parameter vj has been previously detected include from when the parameter definitions for that location were first downloaded to the client device or were last downloaded from the server, or were last changed responsive to user input from the client device in a standalone mode or as permitted by the server.

In this example, let variable xi represent, for example by a numerical value such as an index, a valid historical parameter (e.g., another IP or MAC address from which the client has received traffic while at the given location) that is not defined in the policy but consistently is present in snapshots of network settings when the given location is associated with the client device. Similar to yj, wi represents the historical presence of parameter xi by the number of times network parameter xi has been previously detected in the given location.

Additionally, in this example, a physical parameter is added to the location threshold composite sum calculation to increase the confidence in the determined location. In the example below, a variable zk representing, such as by a numerical index value, a physical parameter component (e.g., a GPS position, a parameter associated with a physical connection, or a parameter associated with a physical location) is used as well. The physical parameter can be defined in the policy or it can be treated as a separate independent reference for location determination. A critical weighing factor, ak, is also used to add bias to this physical parameter in this example, and pk represents the number of times parameter zk has been previously detected in the given location. The denominator $\Sigma w_i + \Sigma c_j y_j + \Sigma a_k p_k$ is used to provide a normalizing function. In one example, the normalized sum of all the component sums is compared with a predetermined location threshold value. The test may require the result to be greater than the predetermined threshold. In another example, the predetermined threshold may be the value of the previous iteration. For example, if the parameters with added weight are present, but not an unweighted historical parameter that is not present a significant number of times, the composite normalized sum can still exceed the predetermined threshold value. Alternatively in another example, if a weighted predefined parameter has not been present in a significant number of previous settings taken while at this location, but the consistently present historical parameters outside the policy have been present throughout, the predetermined threshold can still be exceeded resulting in a location detection.

FIG. 6E continues the illustration of the method 671 of location determination using heuristics based on historical data in accordance with an embodiment of the present invention. The location module 208 determines 687 whether there are any locations in the set of possible current locations. Responsive to a positive determination, the location module 208 determines 688 whether there is more than one location in the set of possible current locations. Responsive to there not being any locations from the determination 687 or there being more than one location, the location module 208 determines 686 the location with the closest matching parameters to the currently obtained network parameters, and determines 692 if override criteria allows an override setting of the current location to the closest location. Responsive to a negative determination, the location module 208 sets 693 the current location to the default location. Responsive to a positive determination, the location module 208 sets 694 the current location to the closest location.

Override criteria can be established by an administrator or client device user as allowed or in standalone mode. For example, override logic can check other parameters not in the policy and independent of the device, such as a GPS location on the device's owner. If the layer module timestamps the parameters, override criteria can be based on the time period since the last time of presence of a missing heavily weighted parameter (e.g., the changed NIC MAC address for the gateway machine) and the number of times other valid historical parameters have been present since the last time stamp for the heavily weighted parameter. Different combinations based on the consistent historical presence of different groups (e.g., predefined and historically present but undefined) or a the historical presence of a certain percentage of parameters in both or either of the groups as indicated by the number of times they have been detected can also be a basis for overriding the default location and setting the current location to the closest location. In another example, the override determination is made responsive to user input. In one example, the user or administrator receives a message from the location module 208 requesting the override and including the K parameter values. Responsive to receiving an authenticated response (e.g., a response with a password) indicating override, the location module 208 sets 694 the current location to the closest location. However, responsive to receiving an unauthenticated or authenticated negative response, the current location is set 693 to the default location.

Responsive to the determination 688 indicating one location in the set of possible current locations, optionally, it is determined 689 whether the location determination is inaccurate, in other words, is the location a false positive, for example as in the hacker example above. The examples of override criteria can also be used as examples of criteria for determining a false positive location determination. Responsive to determining 689 an inaccurate location determination, the current location is set 691 to the default location. Responsive to determining 689 an accurate location determination, the one location in the set of possible current locations is selected 690 as the current location.

FIG. 6F continues the illustration of the method 671 of location determination using heuristics based on historical data in accordance with an embodiment of the present invention. Once the location has been identified, the historical data for the parameters is updated. In this example, the history of a parameter is quantified by the number of times the parameter has been previously detected. Additional information can also be used, for example, the last timestamp on the parameter. The location module 208 loops 674 through indices, the values of K, identifying each parameter in the current snapshot. The location module 208 determines 675 if the parameter (k) has been previously detected for the current location. For example, the lookup table of parameters for the location can contain policy predefined parameters, valid historical parameters, and parameters previously detected as this location as well. Responsive to a positive determination, the location module 208 increments 676 the number of times parameter(k) has been detected. The number of times can be stored in a variable (e.g., yj) associated with parameter (k) (e.g., vj). The location module 208 determines 677 whether the number of times parameter(k) has been detected for the current location is less than a predetermined valid historical parameter count. Again, this value can be user-defined or be calculated. In one example, the valid historical parameter count is updated in accordance with a calculation that windows the number of times detected in a recent time period such as the last 3 months. If the number of times is not less than the valid historical parameter count, then parameter(k) is indicated 678 or marked as a valid historical parameter which can be used in a location detection test. The location module 208 increments 680 the parameter index K and processes the next parameter unless the loop ends 681 because the number of parameters obtained have been processed.

Responsive to a negative determination 675 of previous detection of the parameter (k), the location module 208 assigns 695 a unique variable to track parameter(k), initializes 679 the number of times parameter(k) has been detected to one, and increments 680 the parameter index K so the next parameter, if any, can be processed.

Those of ordinary skill in the art will recognize that in another version, the method embodiments illustrated in FIGS. 6A, 6B, 6C, 6D, 6E and 6F can also be applied in defining criteria for activation state of security features which define or trigger the setting of a particular security policy. Also, in another version, the method embodiment of FIGS. 6A, 6B, 6C, 6D, 6E and 6F can be used to define criteria for setting a policy based on a combination of network parameters for a location and active security features. Another method of location detection involves a cryptographic authentication protocol (CAP) between the mobile device and a server for which a successful exchange identifies the client as being in a known environment. For example, in FIG. 1, one of the mobile devices depicted may exchange a key with the Internet shopping site 110. A custom location of "shopping" may be associated with the mobile device and the policy associated with the "shopping" location may be enforced when communicating with the servers under the control of this Internet shopping site. In another example, a cryptographic authentication protocol (e.g. occurring when a network connection is initiated) may be one of several network characteristics to be verified to establish the location of "work" 106. Types of cryptographic authentication protocol protocols that may be used are those employing private keys, public keys or both (i.e., asymmetric or symmetrical authentication protocols may be used.) Similarly, other cryptographic authentication protocols include Secure Sockets Layer (SSL) certificates. For example, the location detection module 208 of FIG. 2B verifies that the Internet shopping site is the proper or authentic site using the public key. In another example the location detection module 208 determines whether the mobile device is operating in the "work" location network environment. The location detection module 208 sends a random challenge such as a number encrypted using the corporate server's (e.g. 112) public key. The corporate server decrypts the random challenge using its private key. The server performs a hash function (e.g. SHA1) of the random challenge result from its decryption and a random nonce such as a number. The server forwards the hash result and the random nonce back to the location detection module 208. The location detection module 208 performs a hash of the random challenge it originally sent and the random nonce received from the server. It then compares this second hash result with the one received from the server. A match indicates that this is the corporate server 112 of the user's employer, the location detection module 208 associates "work" with the mobile device. Similarly, the authorization module 245 may perform the cryptographic authentication protocol and send a notification to the location detection module 208 of the successful result which indicates the "work" location.

In another embodiment, detection of a location may be based upon identifying one or more Network Access Points (NAP) with which a mobile device is associated or whose range it has roamed within based on the known presence of the one or more NAPs. The presence of the NAPs may be stored in a look-up table accessible by the mobile device. The MAC address of the NAP may be exchanged in an association or authentication protocol between the mobile device and the NAP.

Consider the example, in a workplace of a complex of buildings, that there may be several wireless NAPs. One of the parameters for determining a "work" location (e.g. 106) may be a MAC address which must match one of these wireless NAPs. Furthermore, the MAC address in this example may be used to define sub-locations within the work environment. For example, a particular NAP may be in the software lab while another is in a conference room. The policy for the "software lab" environment allows a mobile device accessing a corporate server to access certain files while a mobile device trying to access the files via the conference room NAP receives a notification that these files cannot be found. In another version of this last scenario, the policy associated with the conference room sub-location may allow the files to be accessed in the conference room if a virtual private network (VPN), as indicated by a port, a layer 2 tunneling parameter, a layer 3 tunneling parameter or an application parameter, is used to access these certain files copied from certain network drives. In addition to or instead of the MAC address, the IP address of each wireless NAP may be used as a basis for location detection as well. Other examples of parameters that may be used as a basis for location detection are known (wired equivalency protection) WEP keys for NAPs, 802.1X protocols, and a Cisco® discovery protocol. Similarly, a Service Set Identifier (SSID) may also be used alone or in combination, for example with the MAC address and IP address of a NAP in its segment, as a basis for location detection as well. Based upon the SSID, the location detection module 208 determines the name of the NAP being used. There can be a policy that defines a set of SSIDs that can be used at a particular location by a given mobile device. As stated above, a location may be detected based on a combination of one or more NAP parameters such as SSID, MAC, IP address, a WBP key and other parameters such as a network gateway identifier. For example, for a mobile device, a list of accessible NAPs may be kept by the server or the client device. Examples of the criteria for access may be the location of the NAPs or it may be the type of NAP, features associated with the NAP or the data accessible via the NAP. When the mobile device attempts to associate with the NAP, the location of the device may be determined from the MAC address and the SSID in one instance. Once the location of the device is noted, the server may download a WEP key to the client or the client may already have the WEP key stored during its configuration or from a previous server update. A security policy may be invoked based on the detected location or a combination of the detected location and a security feature of the NAP such as its operating system or other system security features in use.

In another example, the NAPs or type of NAPs that may be used by a mobile device vary with location. For example, in the HOME location, any NAP or type of NAP may be used. However, in the work environment, a mobile device may only be allowed access to certain NAPs or types of NAPs. This may help alleviate congestion or further enforce security problems.

In another example, based upon the location of a client device, a given view of network resources is provided to that client device. In this example, the client accesses the network through an access mediator, which provides the view of the network to the client device. As clients access the network, the access mediator determines their location and then allows the client access to the network resources allowed for that location in accordance with policies set-up using the policy management module 236 for the enterprise system.

Figure 12:
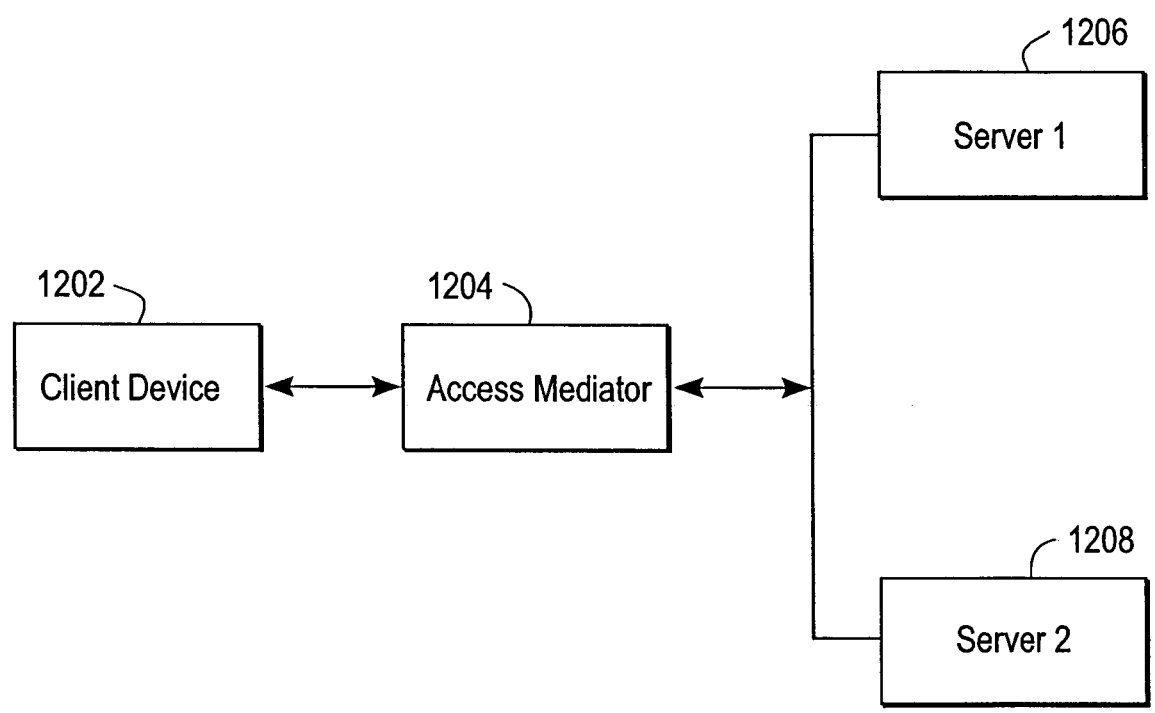
FIG. 12 illustrates an example of a system for providing selective access to data of an enterprise based on the location associated with a client mobile device or a security feature in accordance with an embodiment of the present invention.

FIG. 12 illustrates an example of a system for providing selective access to data of an enterprise based on the location associated with a client mobile device or a security feature in accordance with an embodiment of the present invention. The system 1200 includes an access mediator 1204 communicatively coupled to a client mobile device 1202 and two servers, server 1 1206 and server 2 1208. The access mediator 1204 selectively provides the client device 1202 with access to resources (e.g., server 1 1206 and server 2 1208) within the enterprise system based on location, a security feature of the client device, or both. For example, when the client connects to the access mediator 1204 from a mobile location, the access mediator 1204 allows access to server 11206, but not server 2 1208. However, when the location associated with the client device is a work location, the access mediator 1204 allows the client device 1202 to access both server 11206 and also access server 2 1208. The access mediator 1204 may be implemented either as a stand alone component on a server (e.g., 200), a portion of another software component on a server (e.g., 200) or as a software component of the mobile client device 1202.

Figure 7:
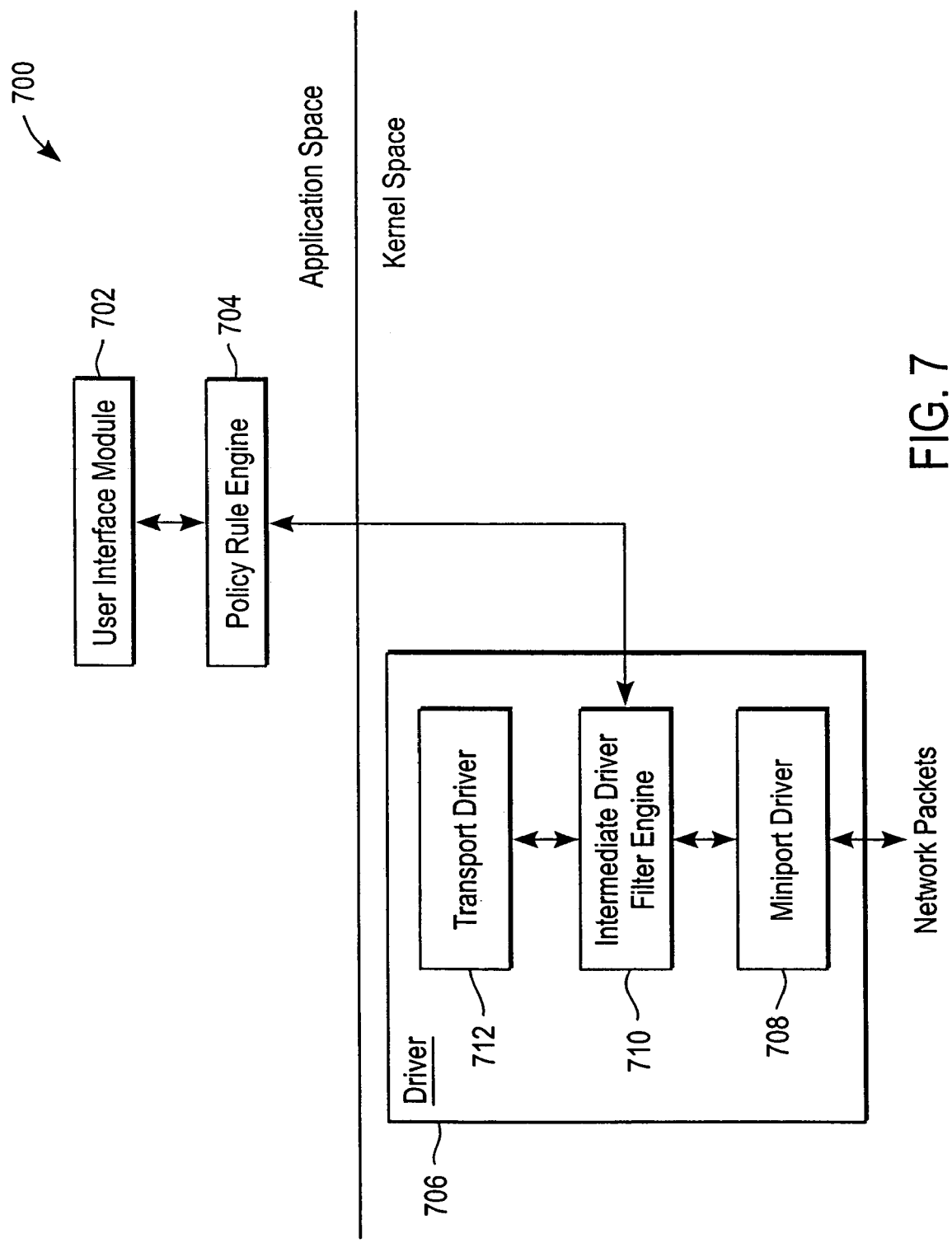
FIG. 7 illustrates a system in a mobile client device for protecting data accessible by a mobile device in accordance with an embodiment of the present invention.

FIG. 7 illustrates a system 700 for protecting data accessible by a mobile device in accordance with an embodiment of the present invention. The system 700 comprises a policy rule engine 704 embodied as a software application that has a communication interface (e.g. a software interface) to a user interface module 702 and a communication interface to a filter engine 710 embodied in a driver software program 706 operating in the kernal space of an operating system. In one example, the filter engine 710 may be embodied within a Network Driver Interface Specification (NDIS) driver 706 typically used in a Windows® operating system.

In this embodiment, the filter engine acts as a layer manager in processing parameters at the network layer in the OSI or IPS models. Network packets from the network interface card (NIC) are received by a Miniport Driver 708. The Miniport Driver 708 has a communication interface to the filter engine 710 and forwards packets to the filter engine 710. The filter engine 710 detects one or more parameters in a packet. For example, the filter engine may detect an IP source address for the packet. Additionally, the MAC address of the server as well as that of the network access point that routed the packet may be detected. Also, the filter engine may read the packet header for a port address or determine the port group with which the packet is associated. The filter engine 710 has a communication interface to a transport driver 712 software program. Information that the transport driver 712 may determine is session information associated with the transport layer in the OSI model. Session information usually defines a session by an IP address and a port address.

In this embodiment, the filter engine 710 also acts by analogy as a policy enforcement module 214 under the control of the policy rule engine 704. The policy rule engine in this embodiment is analogous to the policy setting module 212 in FIG. 2B. The policy rule engine 704 has a communication interface to filter engine 710 from which it receives notification of a detected location or a detected security feature or attribute. An example of a security feature which may have been detected is that a certain port is using a wireless connection. The policy rule engine 704 selects the security policy based on either of the detected location or the detected security feature or both. The filter engine 710 is instructed by the policy rule engine 704 to execute one or more enforcement mechanisms in accordance with the current settings or policy.

For example, if the current security policy does not allow file sharing to be activated for the mobile device, but allows Internet access, the filter engine 710 checks packets for port destination. If the port is associated with file sharing, the packets for that port are dropped. If the packets are for Internet access, they are allowed. The policy rule engine 704 may apply different rules with respect to inbound packets than for outbound packets. For example, if the file sharing request is initiated by the client device in outbound packets, inbound packets responsive to that request as determined by an IP address, a port identifier, IP subnet address, or an application parameter may be forwarded if the policy allows. However, an inbound initial request for file sharing may be dropped and not processed at all.

In another example, the policy rule engine 704 directs the filter engine 710 to drop all packets associated with a port identifier, representing for example, a TCP port, a port group type such as web surfing ports, or a TCP port range, using a wireless connection. The filter engine 710 drops all packets on that port but allows access, for example Internet access and e-mail, over other ports associated with a wired local area network (LAN) connection.

In another example, no communication with other computers may be allowed so that the filter engine 710 drops all packets. In yet another example, the policy allows all packets to be passed through which the filter engine 710 does.

The user interface module 702 is analogous to the user interface module 218 in FIG. 2B. For example, it processes input and output to assist a user in defining a policy aspect or in viewing and responding to notifications.

Figure 8:
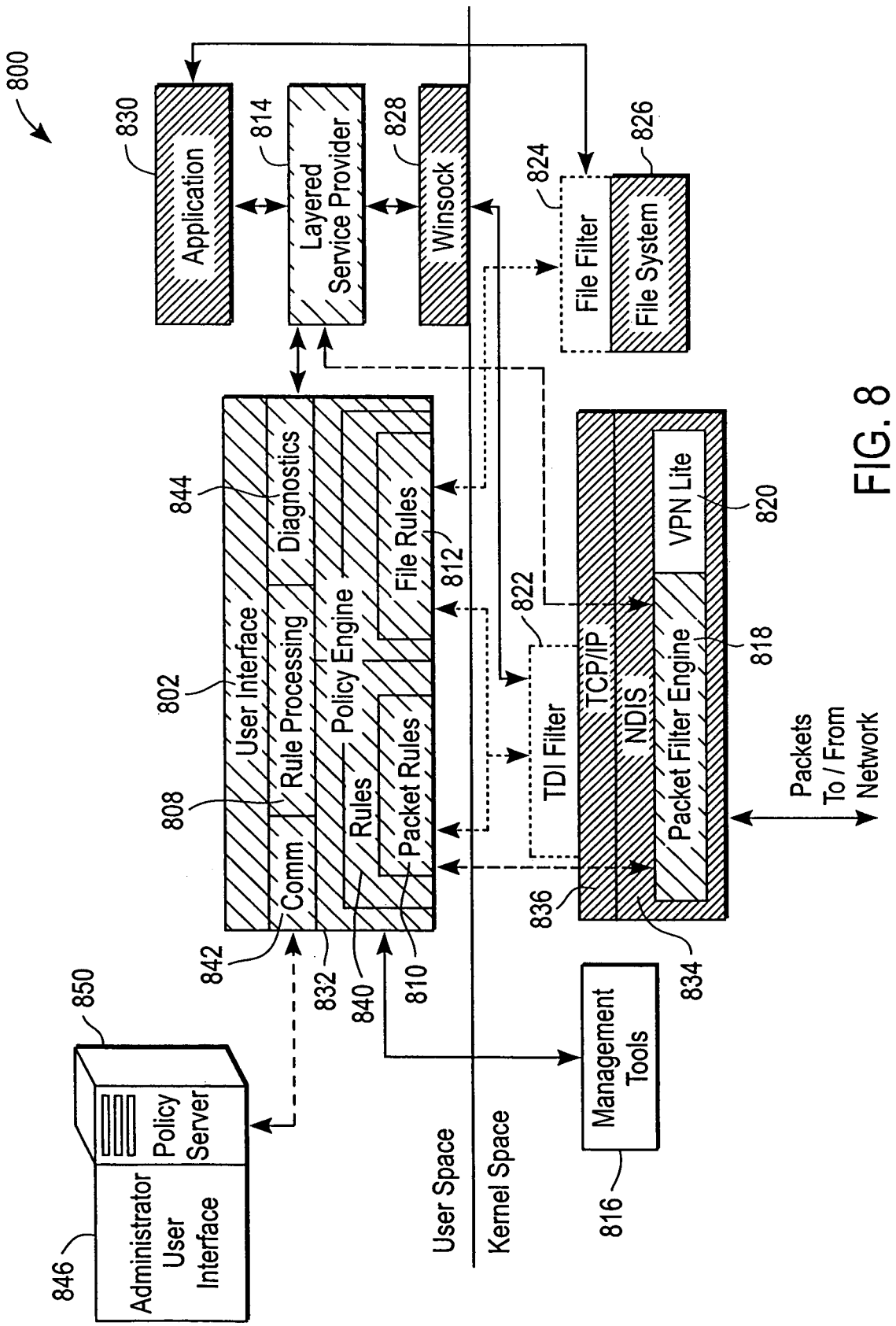
FIG. 8 illustrates a server system embodiment for administering the protection of data accessible by a mobile device in accordance with another embodiment of the present invention interacting with a system in a client mobile device for protecting data accessible by the mobile device in accordance with another embodiment of the present invention.

FIG. 8 illustrates a system 800 in accordance with another embodiment of the invention comprising a server system embodiment for administering the protection of data accessible by a mobile device interacting with a system in a client mobile device for protecting data accessible by a mobile device. The server system allows an administrator to manage and distribute policies and software upgrades, analyze logs, and perform remote diagnostics. As with the other client system embodiments, the client system embodiment obtains policy updates from the policy server, updates a local or working policy in accordance with the updates, monitors changes in the mobile device's network environment associated with different locations, and applies the appropriate policies automatically as the user moves about. Similarly, the client system applies the appropriate policies automatically as the security features of the mobile device or a network environment become active and inactive. The client side system also receives software updates from the server and provides its status, usage and error logs to the server.

As illustrated, the server system embodiment comprises a policy server 850 having an administrator user interface 846. This system is communicatively coupled over a network with the client side system through a communication port 842. Also, as is apparent to those of ordinary skill in the art, the policy server 850 may be implemented in one or more computers or computer systems. For example, it may comprise an authority server executing on one machine for establishing communication sessions and a number of computers with which client devices may communicate in order to obtain their updates and receive diagnostic assistance.

The client side system embodiment comprises a policy engine 832 operating in application space having a communication interface to management tools 816 of the operating system, a communication interface to a file filter 824 operating in the kernel space that controls access to the file system 826, a communication interface to a user interface module 802, a communication interface with the layered service provider (LSP) 814, and also having a communication interface to a packet filter engine 818 operating within a driver 834. In this example, the driver 834 is an NDIS intermediate driver 834 operating within the kernel of the operating system of the mobile device. The packet filter engine 818 has a communication interface with the layered service provider (LSP) 814 operating in application space.

The policy engine 832 further comprises a diagnostics module 844, a rule processing module 808, Rules 840 and representative examples of rules subsets, packet rules 810 and file rules 812. In addition to the packet filter engine 818, the driver 834 further comprises an application filter 822, in this example, implemented as a transport driver interface (TDI) filter 822 and a VPN module 820 embodied here as a VPN Lite 820 implementation discussed below. The TDI filter 822 comprises a communication interface with the packet rules subset 810 and the file rules 812 subset in this example. It also communicates with the packet filter engine 818 as part of the driver 834. The TDI filter 822 further comprises a communication interface with a Windows Socket (Winsock) layer 828 in application space. The Winsock layer communicates with layered service provider 814 implemented in this example as a Windows socket filter, the layered service provider 814 having a communication interface as well with one or more applications 830 in application space.

In this embodiment, network environment location detection is performed by the policy engine 832, in accordance with rules implementing one or more location detection tests in the Rules set 840, based on network parameters obtained by the NDIS driver for OSI layers 2-5, and by the layered service provider for OSI layers 6 and 7. For example, the layered service provider 814 (LSP) captures information about network applications starting and stopping and what ports the applications will be using. This information is provided to the filter 818 and the policy engine 832 to provide application awareness. Furthermore, the policy engine 832, in accordance with the current security policy, provides to the layered service provider 814 rules with respect to applications. For example, the engine 832 may provide a list of which applications can or cannot access the network, as well as the target IP addresses and ports that they are or not allowed to use. The layered service provider 814 then enforces the current policy in accordance with these rules applicable to applications.

In this example, layered service provider 814 is a windows socket filter is used to determine which application (e.g. browser e-mail application such as Outlook Exchange® ) is accessing the network and what networking services the application will be using. An example of an application's network service usage could include Outlook Express opening a specific set of Winsock ports, each using a separate protocol and target I.P. address. The layered service provider 814 will pass this information to the packet filter engine 818, which then informs the policy engine 832 using an event signaling mechanism. An example of an event signaling mechanism is to used named events to signal the policy engine 832 that some event has occurred.

Filtering of specific applications provides further resolution for location detection and enforcement mechanisms. The context of Microsoft® Networking provides an example of the benefits of such a filter. Several applications such as Exchange and Microsoft® File Sharing can and do use the same TCP and UDP ports. The NDIS filter driver 834 cannot determine which application is active based solely on TCP and UDP ports. The NDIS filter driver will act on the low level information i.e. TCP or UDP port numbers. When the packet arrives at the TDI layer 822, the TDI filter driver 822 determines based on one or more application parameters for which Microsoft Networking application a packet is destined and if the packet should be forwarded or filtered. For example, the LSP provides to the driver, via IOCTL calls, "sessions" which provide information about applications opening ports for sending, listening (receiving), and details such as what protocol is being used and the target I.P. address of sent packets. Once the application closes the Winsock port, the LSP can inform the packet driver that the session is now closed. These sessions allow the driver to be able to detect what incoming and outgoing packets should be allowed through the system and which packets should be forwarded or filtered.

A benefit of this embodiment is that it allows the NDIS filter driver to do low level filtering based on port or protocol information and not have the overhead of application specific parsing. A modular approach to packet and application filtering is allowed.

The policy engine 832 also has a communication interface to management tools 816 of the operating system. The management tools 816 provide information to the policy engine 832 such as the types of adapters connected to the mobile device and specific information about each of them such as their brand name. The policy engine 832 also receives from the management tools 816 the local IP address associated with each adapter. Additionally management tools 816 alert the policy engine 832 regarding which applications are running. For example, a process table maintained by the operating system may be monitored and notifications sent by the management tools 816 to the policy engine 832. For example, it may be determined whether 802.11i wired equivalency protection (WEP) software is running on a network adapter card through which wireless data is being sent and received. In this way, the policy engine 832 determines which security features are available in a system.

The Policy Engine 832 may create a security policy that is not inconsistent with the policies downloaded from the policy server 850. Additionally, modification and local management of policies as allowed, for example in accordance with permissions of policies set by the policy server 850. The Policy Engine 832 receives user input and sends output via a communication interface with the user interface module 802 to display and change policy settings responsive to user input.

Rules 840 comprise rules that define one or more security policies to be enforced by the Policy Engine 832. The policy engine 832 comprises a rule processing module 808 which executes tasks in accordance with determinations to be made as set by the rules for the current security policy and for directing the appropriate results dictated by the rules of the current policy.

In one embodiment, rules are pairings of logically grouped conditions with results. The following are examples of conditions, which may be connected by logical operators:

Check for the existence of a registry key
Check for a registry value
Check for the existence of a file
Check for a currently running application
Check for a currently running service
Check for the existence of network environment settings (includes a list of environments)
Verify that specified applications are running
Verify that specified protocols are enabled
Verify that specified VPN is running The following are examples of results:

Can/Can't use the network
Can/Can't use the machine
Locked in to a certain location
Can/Can't access the file
Can/Can't use the application
Only transfer encrypted version of file.

Examples of subsets of rules are illustrated in FIG. 8, packet rules 810 and file rules 812. These subsets illustrate examples of enforcement mechanisms that may work at different layers of a communication model, for example at the network layer and at the application layer.

One example of an enforcement mechanism is referred to as stateful filtering. In one example, a security policy is called a type of shield or is referred to as a particular type of shield level. The state may hereafter be referred to as the shield state or shield.

If the filtering is performed on a packet basis, it is referred to as stateful packet filtering. In stateful packet filtering, a packet filter such as the packet filter engine 818 as it name suggests filters packets based on a state set by the currently enforced policy with respect to a parameter. Examples of such a parameter include source I.P. addresses (for received packets) or target I.P. addresses (for sent packets), port numbers, port types or a port group. A port group is a list of ports that are used by a particular application, network service or function. For example, a port group can be created that includes all the ports for a particular instant messaging application, or for all supported instant messaging applications, or for all applications used internally at a company. Examples of port groups that may be selected for processing by a policy include web surfing ports, gaming ports, FTP and SMTP ports, file sharing and network ports, and anti-virus updates and administration ports. A port group can contain individual port items or other port groups.

In this example, we discuss a version of stateful filtering called adaptive port blocking. In this example, there are rules comprising a mapping between a set of ports, port types, and actions. The ports are the actual port numbers, the port types enumerate the possible port types e.g. UDP, TCP, IP, or Ethertype, and the actions are what is to be done with this particular port e.g. filter, forward, or inform. The inform action will post an event to the policy engine 832 when a packet is sent or received on the specified port. Filter and forward action control the sending and receiving of packets on the specified port.

In one example, a policy is in effect that each port is in one of three modes: open, closed, or stateful. When the port is open, all traffic (both incoming and outgoing) on that port is permitted to flow through the packet filter. When the port is closed, all traffic on that port is blocked (both incoming and outgoing). When the port is stateful, all outgoing traffic on that port is permitted to flow through the packet filter, and incoming responses to that outgoing traffic are allowed back through, but unsolicited incoming traffic is blocked. In another example, incoming and outgoing traffic may be blocked on a basis, examples of which are a network service or an application.

In the system embodiment illustrated in FIG. 8, components such as the policy engine 832, the packet filter engine 818, the layered service provider 814 and the TDI filter 822 may be employed for supporting stateful filtering. In one example, a session is created when a mobile device initiates communications with a particular remote or a specified set of remote computing devices. The stateful filtering, as may be performed by the packet filter engine 818 and/or the TDI filter 822 in accordance with rules 840, for example rules in the subset of the packet rules 810, applicable to the current policy, may use the transport protocol to determine when a session is starting and the address of the remote device. Forward and filter decisions in accordance with rules in the set of rules 840 or the subset of the packet rules 810 may be based upon the session information obtained at session startup. Additionally, forward and filter decisions may be based on application parameters received via the layered service provider 814. This provides the benefit of more refined application filtering as illustrated in the example discussed above.

The policy engine will pass the rules to the packet filter engine as commands using the existing IOCTL interface. In one example, the policy engine determines based upon its current rules which ports or range of ports should do stateful filtering. These rules are then passed to the packet filter engine 818 by an IOCTL command. In another example, the policy engine 832 determines that rules of the current security policy do not support certain applications accessing a network. These rules are passed to the packet filter engine as well as the TDI filter 822 for application specific filtering. The policy engine 832 may also pass rules about application-specific network access to the layered service provider 814 via an IOCTL interface.

Each component of the system may also provide health checks on the others. For example, the policy engine 832, the layered service provider 814, the file filter 824, and the packet filter engine 818 report whether any of the other services have been disabled or removed from the system to the diagnostics module 844. This information may be relayed to the policy server 850 as it indicates a possible compromise of the protective system. The policy server 850 in that case provides diagnostic support information to the diagnostics module 844.

Stateful packet filtering deals with packets with different types of address. Outgoing packets have three different types of addresses: directed, multicast, or broadcast. Directed addresses are specific devices. Broadcast packets are typically used to obtain network configuration information whereas multicast packets are used for group applications such as NetMeeting.®

To establish session state information with a directed address is straightforward. The IP address and the port number are recorded in a session control block. When the remote responds the receive side of the filter engine will forward the packet because a session control block will exist for that particular session.

When the outgoing packet is a multicast packet there is a problem. Multicast packets are sent to a group; however, a multicast address is not used as a source address. Hence any replies to the outgoing multicast will have directed addresses in the source IP address. In this case the filter engine will examine the port to determine a response to a given multicast packet. When a response to the specified port is found session control block will be completed i.e. the source address of this incoming packet will be used as the remote address for this particular session. However, more than one remote may respond to a given multicast packet, which will require a session control block be created for that particular remote. The broadcast packets may be handled in the same manner as the multicast.

The file rules subset 812 have a communications interface such as an IOCTL interface with a file filter 824 having a communication control interface with a file system 826. The file filter 824 may implement one or more filter related enforcement mechanisms. A policy may protect files based on the location in which they are created and/or modified as well as the location in which the mobile device is operating. The policy specifies a set of locations in which the files are to be made available, and whenever the mobile device is not operating in one of those locations, those files are unavailable. In another embodiment, policies may require that files be encrypted only if they were copied from certain network drives.

One reason for requiring that all files created and/or modified in one of the specified locations is so that copies of sensitive files or data derived from the sensitive files are also protected. Specific mechanisms for protecting the files include file hiding and file encryption.

When the mobile device is operating in one of the specified locations, the files can be located (e.g., they are not hidden). When the mobile device is operating in some other location, the files are hidden. One purpose of this mechanism is to prevent the user from accidentally revealing the contents of sensitive files while in locations where access to those files is not authorized.

One mechanism for hiding the files is to simply mark them "hidden" in their Windows properties pages, and to cache the access control list (ACL) on the file and then modify the permissions to deny all access by non-administrators. Other versions may use the file-system filter to more effectively render the files unavailable.

In one embodiment, files that are subject to location-based protection by the policy are always stored encrypted. When the mobile device is associated with one of the specified locations, the files can be decrypted. When the mobile device is associated with some other location, the files cannot be decrypted. This mechanism provides a benefit of preventing unauthorized persons who may have stolen the device from gaining access to sensitive files.

One mechanism for encrypting the files is to simply mark them "encrypted" in their properties pages, and to rely on the file hiding feature (see above) to stop the files from being decrypted in an unauthorized location. Other versions may use the file-system filter to more effectively encrypt the files in a way that does not depend on the operating system to prevent them from being decrypted in an unauthorized location.

Policies can have rules controlling the use of VPNs. For example, a rule can require that when the VPN is in use, all other ports are closed. This prevents hackers near the user from co-opting the user's device and coming in to the corporate network over the user's VPN connection. In one embodiment, a lightweight web-based VPN is used that allows traffic from selected applications (e.g., email) to be encrypted with Transport Layer Security (TLS).

In one embodiment, a VPN Lite 820 having a communication interface with the packet filter engine 818 establishes a TLS-encrypted, authenticated connection with the server, and then sends and receives traffic over this connection. The layered service provider 814 diverts the outgoing traffic from the application to a VPN client piece, and incoming traffic from the VPN client piece to the application.

In one implementation example in accordance with the present invention a layer is inserted into the Winsock environment, which opens up a Transport Layer Security (TLS) or Secure Socket Layer (SSL) socket to the VPN server, and tunnels all application network traffic through that connection to the VPN server. The applications are unaware that the VPN is active. The VPN has a very small footprint, since TLS is included in Windows.® In this example, using the Winsock Environment, all communication between client and server is routed through a secure channel. Unlike current clientless VPNs, all existing applications are supported As seen in the embodiment of FIG. 8, the packet filter engine 818 and the layered service provider 814 comprise implementation examples of functionality analogous to that of layer manager 206 in FIG. 2B. The policy engine 832 performs implementation examples of functions of determining location analogous to those of the location detection module 208, of determining policies analogous to those of the policy setting module 212 and of identifying active security features analogous to those of the security features determination module 210. Furthermore, the packet filter engine 818, the TDI Filter 822, and the layered service provider 814 also perform implementation examples of enforcement mechanisms that the policy enforcement control module 214 may analogously perform.

The diagnostics module 844 of the policy engine 832 performs similar functions discussed with respect to the client diagnostics module 246 of FIG. 2B. For example, it provides status, configuration, error logs, audit logs, and debug information to the server system. Similarly, it would assist a server side remote diagnostics module such as module 224 in FIG. 2A in debugging an error, for example in a method such as that described in FIG. 11.

In one embodiment, policy documents are XML documents. XML allows great flexibility in design, usage, and enhancement of policies. Using the flexibility of XML as the means to distribute enterprise wide policies simplifies the complex problem of distributing and enforcing enterprise wide policies. Policies are defined by the enterprise including but not limited to program usage, network access, hardware restrictions, VPN access, data access, and many other policies. The definition of these polices is performed at the enterprise level using XML Schemas and documents. The policies may then be distributed to the enterprise clients via various forms of data transfer. Furthermore, the policies may also be protected from hacking by encryption or signatures (i.e. XKMS, XMLDSIG, XMLENC, or proprietary encryptions). The policy is then enforced on the client by a process that can interpret the policy distributed by the enterprise. This approach allows a policy to be extensible and easily changed by the administrator. Furthermore, policy management, compilation and interpretation is performed by policy aware application interfaces. Also, the administrator can configure elements of the policy such that they are configurable by the end user. In one example, the XML schema or XSD is derived from the standard XML schema http://www.w3.org/2001/XMLSchema (May 2001). In this example, a schema defines one set of types that is used by both the server (group) and the client policies. Policies may be signed to ensure integrity. Additionally individual policy elements will be signed to ensure integrity of policy enforcement.

In one embodiment, a very thin client host application resides on a client mobile device. For example, it may be part of the policy setting module 212 for the embodiment of FIG. 2B or part of the policy engine 832 in FIG. 8. The central policy server or server system pushes execution instructions to the client, described by XML. As a result, a small relatively stable execution environment is available as part of the client device. When additional or different functionality is needed on the client, this new functionality is pushed to the client in an XML format.

For example, assume version vX.01 of a product supports two types of security policies. For version X.02 it is necessary to implement a third type of security policy. The implementation and associated behaviors of the policy would be described within XML and published to the clients via the policy server. Clients running vX.01 would then effectively be upgraded without user intervention. In another example, this approach could be used for instantiating portions of an application to clients in a cafeteria style—e.g. they want feature 1, 2, 3, 6, 8 and not 4, 5, 7. If the client requires a change to their implementation, they change their menu selections and implementation and behaviors are pushed to their respective client instances.

For illustrative purposes only, the illustrated method embodiments illustrated in FIGS. 9A, 9B and 9C are discussed in the context of the system embodiment of FIG. 8.

FIG. 9A illustrates an example of a method 900 for determining whether the security feature of a connection type of wireless or wired is in effect for a communication session between the mobile device and another computer in accordance with an embodiment of the present invention. The policy engine 832 determines 902 whether a connection is associated with a wired or wireless adapter based on one or more characteristics of the network adapter obtained from the operating system on the mobile device. For example, the management tools 816 of the operating system may retrieve these network characteristics from a look-up table in memory (e.g. a registry in a Windows(& operating system) responsive to a query from the policy engine 832. The policy engine 832 associates 904 the connection with an adapter type value of wired or wireless in an adapter data object associated with each policy. In a similar manner, the policy engine 832 may also determine 906 from the operating system the class (e.g. 802.11b, 802.3, 802.11a, 802.11g, GSM, GPRS, 3G) of the network adapters on the mobile device, and assign 908 a value to an adapter class field in the adapter data object associated with each policy. Furthermore, the policy engine 832 may determine 910 from the operating system the hardware brand of the network adapters on the mobile device, and assign 912 a value to an adapter brand field in the adapter data object associated with each policy.

FIG. 9B illustrates an example of a method 920 for determining whether the security feature of a security software program is currently executing on a mobile device for a communication session between the mobile device and another computer in accordance with an embodiment of the present invention. In one example, the policy engine 832 determines 922 from the operating system of the mobile device which security software programs (e.g. anti-virus, intrusion detection, VPN driver, 802.11i enhanced cryptography) are currently running on the mobile device. For example, the management tools 816 operating in the operating system space may identify which security programs are running based on process tables the operating system maintains for each running software program responsive to a query from the policy engine 832. The policy engine 832 then assigns 924 a value in a field corresponding to the security software in a data object associated with each policy.

FIG. 9C illustrates an example of a method 930 for determining one or more security features of a network access point with which the mobile device is communicating in accordance with an embodiment of the present invention. In one example for determining the security features of the access point, network management software such as Simple Network Management Protocol (SNMP) is used to query the access point to obtain its operational characteristics.

It is determined 932 whether one or more security features of the network access point are operational in a communication session with the mobile device. For example, the policy engine 832 may determine whether the security feature of a security software program is currently executing on a network access point for a communication session in accordance with an embodiment of the present invention. In one instance, the policy engine 832 determines 932 from the operating system of the mobile device the security software associated with a network access point. One manner in which this may be done is that the management tools 816 operating in the operating system space may identify processes executing on the mobile device in cooperation with security programs running on a wired or wireless network access point based on the process tables again responsive to a query from the policy engine 832. In another manner, the operating system management tools 816 may query the network access point regarding security software running in its LAN. The policy engine 832 assigns 934 a value in a field corresponding to the security feature such as the security software, in a data object associated with each policy.

Figure 9D:
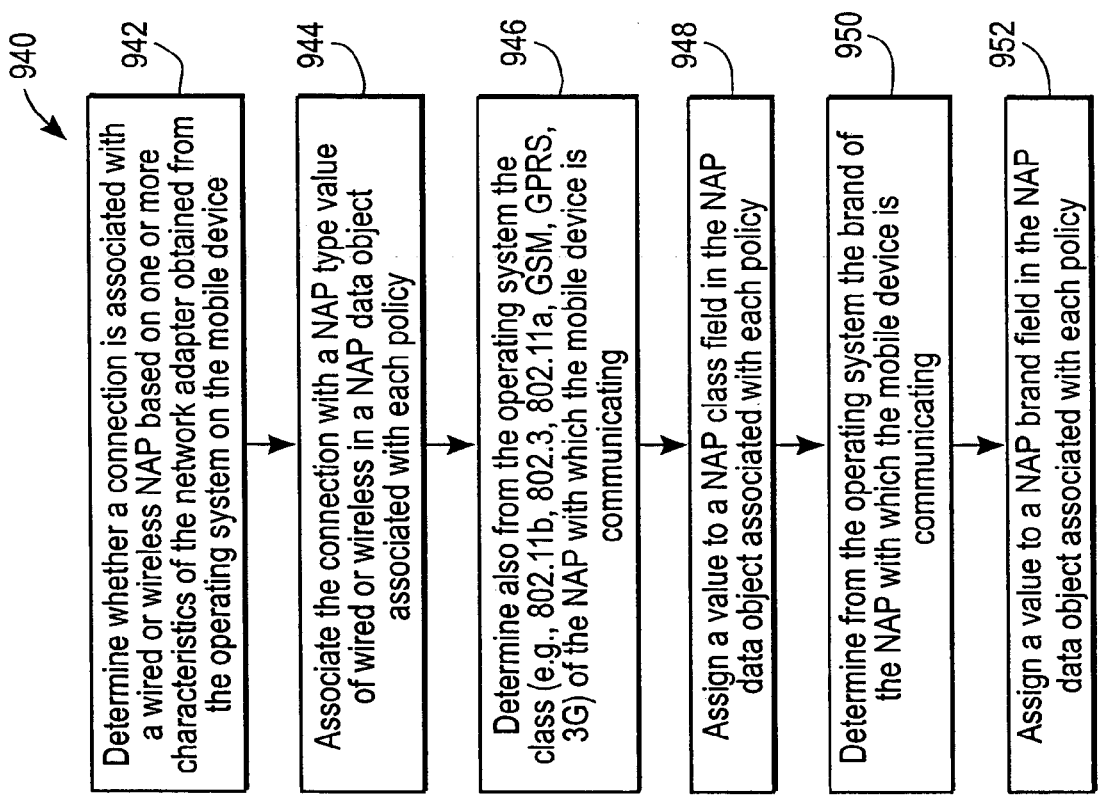
FIG. 9D illustrates an example of a method for determining whether the security feature of a connection type of wireless or wired is in effect for a communication session between the mobile device and another computer in accordance with an embodiment of the present invention.

FIG. 9D illustrates an example of a method 940 for determining whether the security feature of a connection type of wireless or wired is in effect for a communication session between the mobile device and another computer in accordance with an embodiment of the present invention. The policy engine 832 determines 942 whether a connection is associated with a wired or wireless NAP based on one or more characteristics of the network adapter obtained from the operating system on the mobile device. For example, the management tools 816 of the operating system may retrieve these network characteristics from a look-up table in memory (e.g. a registry in a Windowsg operating system) responsive to a query from the policy engine 832. The policy engine 832 associates 944 the connection with a NAP type value of wired or wireless in a NAP data object associated with each policy. In a similar manner, the policy engine 832 may also determine 946 from the operating system the class (e.g. 802.11b, 802.3, 802.11a, 802.11g, GSM, GPRS, 3G) of the NAP with which the mobile device is communicating, and assign 948 a value to a NAP class field in the NAP data object associated with each policy. Furthermore, the policy engine 832 may determine 950 from the operating system the brand of the NAP with which the mobile device is communicating, and assign 952 a value to a NAP brand field in the NAP data object associated with each policy.

Figure 10A:
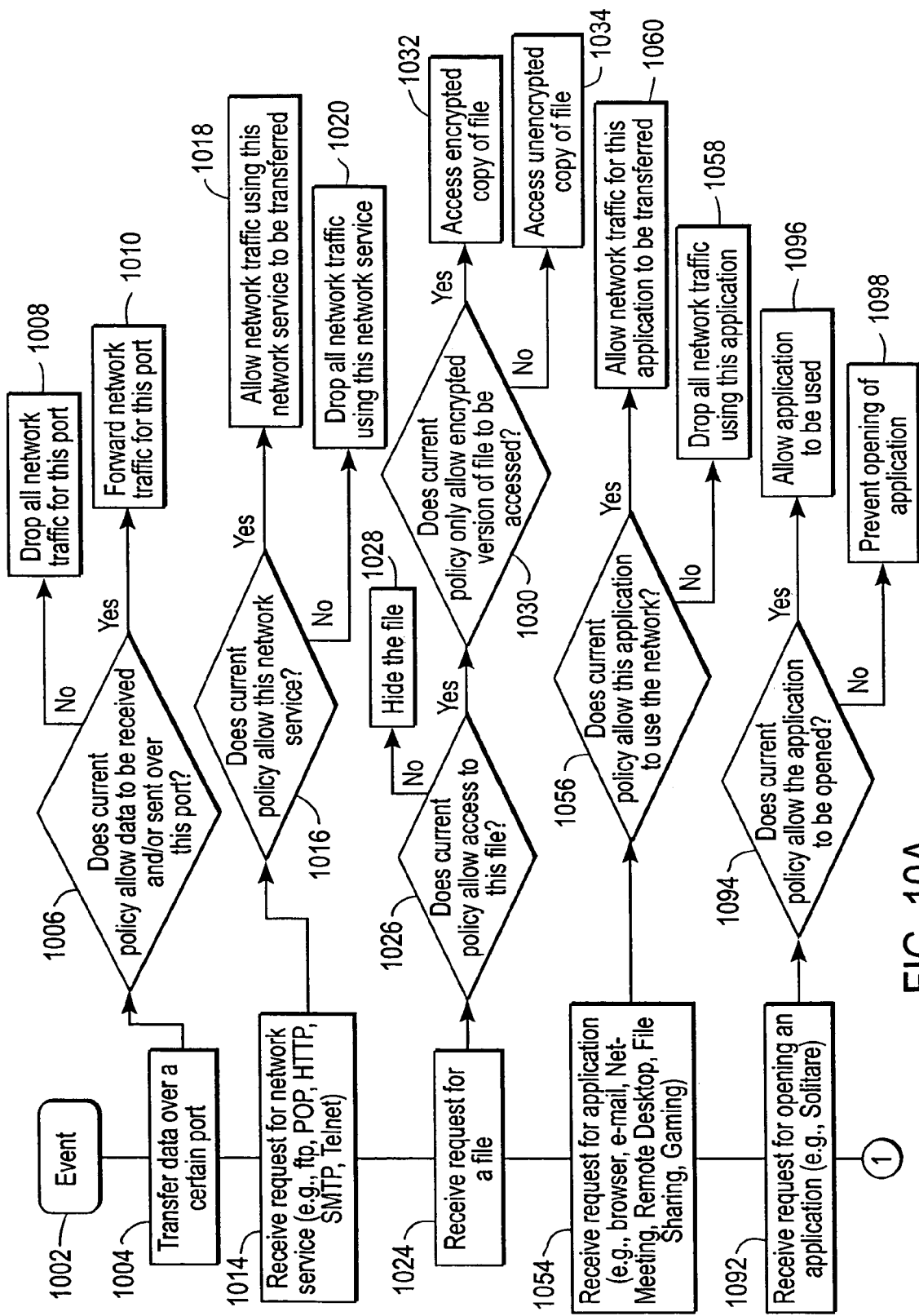
FIGS. 10A and 10B illustrates a method of enforcing a security policy using illustrative examples of events in accordance with an embodiment of the present invention.
Figure 10B:
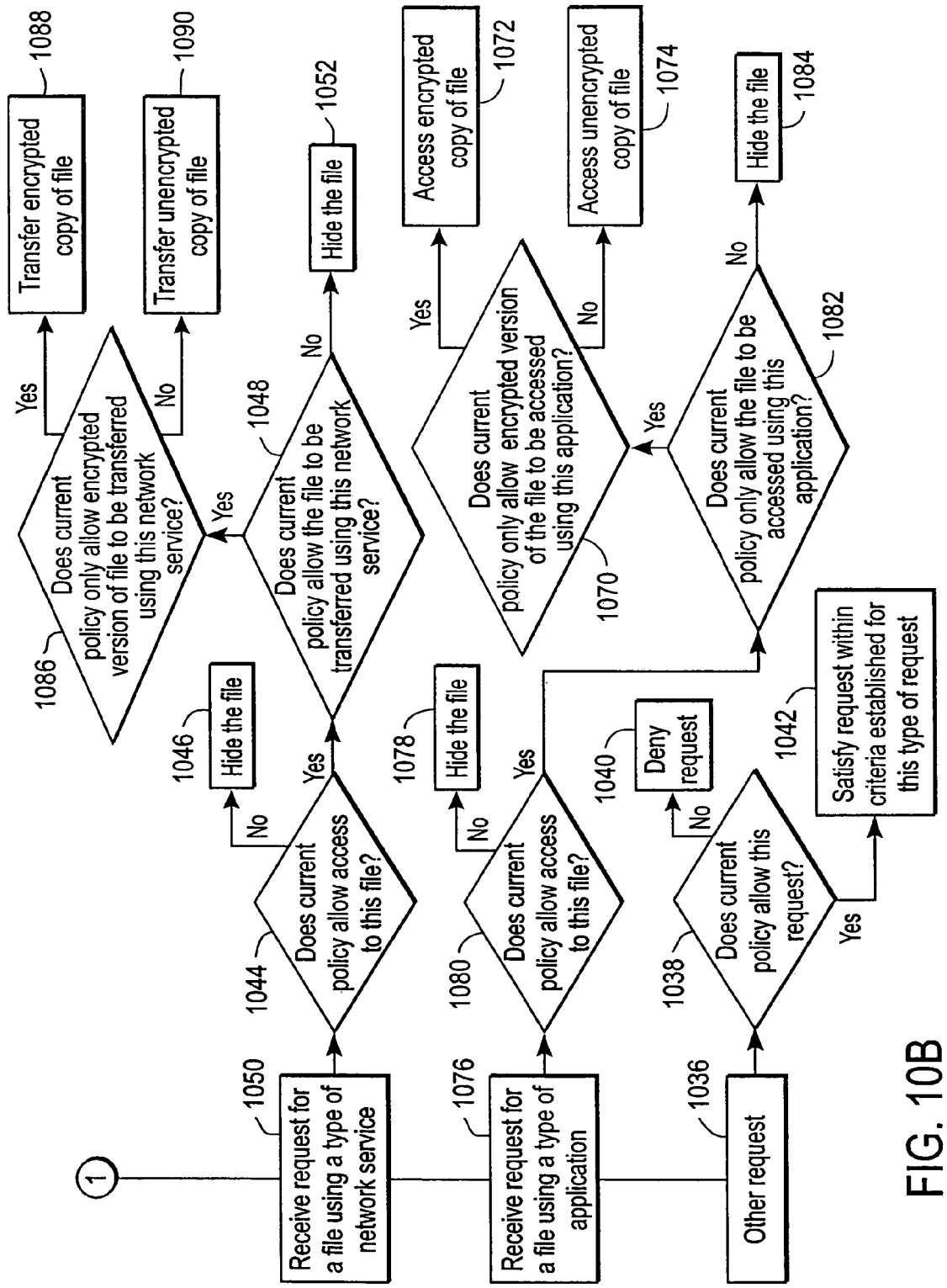

FIGS. 10A and 10B illustrate a method of enforcing a security policy using illustrative examples of events in accordance with an embodiment of the present invention. For discussion purposes only, the illustrated method embodiment illustrated in FIGS. 10A and 10B is discussed in the context of the system embodiment of FIG. 8. In the event 1002 that data is to be transferred 1004 over a certain port, it is determined 1006 whether the current policy allows data to be received and/or sent over this port. Responsive to a determination that the current policy does not allow data transfer over this port, drop 1008 all network traffic, in this example embodied as packets, for this port. Responsive to a determination that the current policy does allow data transfer over this port, forward 1010 all network traffic, again in the form of packets in this example, for this port.

The type of network service being used may be monitored. An example of a type of network service is a service protocol for transferring data over a network. In the event 1002 that a request is received 1014 for processing data using a network service (e.g. File Transfer Protocol (FTP), Post Office Protocol (POP), Internet Mail Access Protocol (IMAP), Virtual Private Network (VPN), HTTP, HTTPS, SMTP, Telnet, etc.), the policy engine 832 determines 1016 whether the current policy allows this network service or a specific version of it, to execute. Responsive to a determination that the current policy, as defined in the embodiment of FIG. 8 above in the packet rules 810, allows this network service, the packet filter engine 818 allows network traffic embodied in packets using this network service to be transferred 1018. Responsive to a determination that the current policy, as defined in the embodiment of FIG. 8 above in the packet rules 810, does not allow or prohibits this network service, the packet filter engine 818 blocks 1020 all network traffic embodied in the example in packets for this network service.

In the event 1002 that a request is received 1024 for a file, the policy engine 832 determines 1026 whether the current policy allows access to this file. As defined in the embodiment of FIG. 8, the file rules 812 may define this aspect of the current policy. The file may be located in resident memory (see 220) or be accessible over a network (see 242). Responsive to a determination that the current policy allows access to this file, the policy engine 832 determines 1030 further whether only an encrypted version of the file is allowed to be accessed. Again, in FIG. 8, the file rules 812 may define this aspect of the current policy. Responsive to a determination that only an encrypted file is allowed to be accessed, the file filter 824 allows access to 1032 an encrypted copy of the file. Responsive to a determination that encryption of the file is not required, the file filter 824 allows access to 1034 an unencrypted copy of the file. Responsive to a determination that the current policy does not allow or prohibits access to this file, the policy engine 832 hides 1028 the file. The file may be hidden in various ways known to those of ordinary skill in the art. Examples include sending a notification that the file was not found instead of the file descriptor.

In the event 1002 that a request is received 1054 for processing data for an application (e.g. a browser, e-mail, NetMeeting, Remote Desktop, File Sharing or games), the policy engine 832 determines 1056 whether the current policy allows this application or a specific version of it, to execute. Responsive to a determination that the current policy, as defined in the embodiment of FIG. 8 above in the packet rules 810, allows this application, the packet filter engine 818 allows 1060 network traffic embodied in packets using this application to be transferred. Furthermore, the TDI filter 822 also monitors application parameters and allows the traffic associated with this application to be forwarded for further processing by the mobile device. Responsive to a determination that the current policy, as defined in the embodiment of FIG. 8 above in the packet rules 810, does not allow or prohibits this application, the packet filter engine 818 blocks 1058 all network traffic embodied in the example in packets for this application. Furthermore, in the embodiment of FIG. 8, the TDI filter 822 also monitors application parameters to block any network traffic at the upper layers for the prohibited application that may have bypassed the packet filter engine 818.

In the event 1002 that a request is received 1092 for opening an application (e.g. a game such as solitaire or minesweeper), the policy engine 832 determines 1094 whether the current policy allows this application or a specific version of it, to be opened. Responsive to a determination that the current policy, as defined in the embodiment of FIG. 8 above in the packet rules 810, allows this application to be opened, the file filter 824 allows 1096 the application to be opened. Responsive to the policy rules not allowing this application to be opened, the file filter 824 prevents 1098 the application from being opened.

In the event 1002 of a request 1050 for a file using a type of network service for transfer, it is determined 1044 whether the current policy allows access to this file. If no, hide 1046 the file. If yes, it is determined 1048 whether the file may be transferred using this type of network service. If not, the policy engine 832 again hides 1046 the file. If access to the file is allowed for this network service type, it is determined 1086 whether the current policy only allows an encrypted version of the file to be transferred using this type of network service. If an encrypted version is required, transfer 1088 the encrypted copy or version. Otherwise, transfer 1090 an unencrypted copy of the file.

In the event 1002 of a request 1076 for a file using a type of application for transfer, it is determined 1080 whether the current policy allows access to this file. If no, hide 1078 the file. If yes, it is determined 1082 whether the file may be accessed using this type of application. If not, the policy engine 832 again hides 1084 the file. If access to the file is allowed for this application type, it is determined 1070 whether the current policy only allows an encrypted version of the file to be accessed. If an encrypted version is required, access 1072 the encrypted copy or version. Otherwise, access 1074 an unencrypted copy of the file.

In the event 1002 of any other request 1036, the policy engine 832 performs the task of determining 1038 whether the current policy allows the request or prohibits it. Based on the outcome of this determination, the appropriate version of a policy enforcement module 214 such as the packet filter engine 818, the layered service provider 814, the file filter 824 either alone or in combination, enforce the policy by denying 1040 the request or satisfying 1042 the request with the criteria established by the current policy for this type of request.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. In a mobile computing device, a computer-implemented system for providing protection of data accessible by a mobile computing device comprising:
a location detection module for detecting a location associated with the network environment in which the mobile device is operating;
a policy setting module being communicatively coupled with the location detection module for communication of the detected location and being communicatively coupled over a network to a policy management module, the policy setting module configured to determine at least a connection type, a network class, and a hardware brand of a network adapter on the mobile device and a current security policy from one or more security policies received from the policy management module, the current policy being set as a function of which of a plurality of pre-defined locations the detected location appears, the pre-defined locations being set by the policy management module, and further being set as a function of the connection type, the network class, and the hardware brand of the network adapter on the mobile device; and
a policy enforcement control module being communicatively coupled with the policy setting module for communication of the current security policy to be enforced, the enforcement control module comprising one or more enforcement mechanism modules for enforcing the current security policy.

2. The system of claim 1 wherein the policy setting module sends an update request to the policy management module, the update request requesting any new versions of the one or more security policies.

3. The system of claim 1 further comprising
a security features module for determining whether one or more security features have an activity status of inactive or active in a communication session between the mobile device and another computer; and
the policy setting module having a communication interface with the security features module for communication of the activity status of the one or more security features, the policy setting module determining the current security policy from the one or more security policies received from the policy management module based upon criteria further including the activity status of the one or more security features.

4. The system of claim 3, wherein at least one of the security features is a security software program.

5. The system of claim 1 wherein the policy selling module when setting the current policy periodically or responsive to a notification message reads from memory a location indicator representative of a stored said detected location.

6. The system of claim 1, wherein the connection type is one from the group of: wired and wireless.

7. The system of claim 1 wherein the network class is one from the group of: a type of mobile communications system, a type of wireless communications system, 802.3, 802.15, 802.16, a variation of 802.11 and 3G.

8. The system of claim 1 wherein the location detection module continuously detects the location in which the mobile device is operating;
   responsive to a new location being detected, notifying the policy setting module via a communication interface of the new detected location;
   responsive to the notification of the new detected location, the policy setting module determining whether the current security policy is to be changed to another policy; and
   responsive to the change in policy being indicated, automatically making the other policy the current security policy; and
   responsive to the other policy being made the current security policy, the policy enforcement module automatically enforcing the other policy as the current policy.

9. The system of claim 1 wherein the location detection module determines location by comparing a criterion of operation of the mobile device to a set of criteria associated with locations.

10. The system of claim 1 wherein the location detection module monitors at least one criterion of operation of the mobile device for the current location and compares the criterion to that associated with locations.

11. The system of claim 1 wherein the location detection module monitors criteria of operation of the mobile device for a current location and compares the criteria to that associated with locations.

12. The system of claim 11 wherein the criteria of operation of the mobile device are a weighted average of one or more network parameters.

13. The system of claim 11 wherein location detection module creates a weighted average of one or more network parameters for each location.

14. The system of claim 11 wherein the location detection module determines whether there is more than one location in a set of possible locations that match the criteria of operation of the mobile device, and sets the location to the current detected location if there is not more than one location.

15. The system of claim 11 wherein the location detection module determines whether there is more than one location in a set of possible locations that match the criteria of operation of the mobile device, and sends a notification to the policy setting module to change the security policy to a default setting.

16. The system of claim 1 wherein the location detection module sends a notification to the policy setting module if criteria of operation of the mobile device for the current location are different from criteria associated with a location set by the policy setting module.

17. The system of claim 1 wherein the location detection module sends a notification to the policy setting module to change the security policy to that for a second location if criteria of operation of the mobile device for the current location match criteria associated with the second location.

18. The system of claim 1, wherein the policy management module designates the mobile computing device applicable to a particular class of users.

* * * * *

UNITED STATES PATENT AND TRADEMARK OFFICE
CERTIFICATE OF CORRECTION

PATENT NO. : 7,526,800 B2
APPLICATION NO. : 10/897060
DATED : April 28, 2009
INVENTOR(S) : Wright et al.

Page 1 of 1

It is certified that error appears in the above-identified patent and that said Letters Patent is hereby corrected as shown below:

Column 44, Claim 5, line 64, change "selling" to --setting--.

Signed and Sealed this

Ninth Day of June, 2009

JOHN DOLL
*Acting Director of the United States Patent and Trademark Office*